(12) United States Patent
Pesale

(10) Patent No.: US 8,851,020 B2
(45) Date of Patent: Oct. 7, 2014

(54) ENVIRONMENTALLY-FRIENDLY, FORM-FITTING CANINE GARMENT FOR URINE MARKING, INCONTINENCE AND HEAT-INDUCED FEMALE MENSTRUATION

(75) Inventor: Catherine M. Pesale, Shelton, CT (US)

(73) Assignee: Cat Roberts, LLC, Shelton, CT (US)

( * ) Notice: Subject to any disclaimer, the term of this patent is extended or adjusted under 35 U.S.C. 154(b) by 17 days.

(21) Appl. No.: 13/567,231

(22) Filed: Aug. 6, 2012

(65) Prior Publication Data
US 2013/0036989 A1 Feb. 14, 2013

Related U.S. Application Data

(60) Provisional application No. 61/574,929, filed on Aug. 10, 2011.

(51) Int. Cl.
*A01K 23/00* (2006.01)
(52) U.S. Cl.
CPC ...................................... *A01K 23/00* (2013.01)
USPC ....................................................... 119/869
(58) Field of Classification Search
CPC ..... A01K 13/006; A01K 23/00; A01K 29/00; A61D 9/00
USPC ........... 119/850, 854, 867, 868, 869; 54/79.1, 54/79.2, 79.3, 79.4; D30/144, 145; 604/393, 358, 385.03, 385.04, 385.05, 604/385.14, 385.19, 386, 387, 3, 53
See application file for complete search history.

(56) References Cited

U.S. PATENT DOCUMENTS

| | | | |
|---|---|---|---|
| 9,629 | A | 4/1853 | Tripp |
| 102,381 | A | 4/1870 | Eager |
| 352,470 | A | 11/1886 | Logan |
| 429,386 | A | 6/1890 | Parrish |
| 1,188,223 | A | 6/1916 | Kuyeda |
| 1,595,834 | A | 8/1926 | Griffiths |
| 1,772,827 | A | 8/1930 | Caster-Udell |
| 2,103,109 | A | 12/1937 | De Mar |
| 2,222,705 | A | 11/1940 | Conlon |
| 2,283,178 | A | 5/1942 | Brown |

(Continued)

OTHER PUBLICATIONS

Yo Yo's Pet Wear Ltd.; Dog Diaper Coats; web site: www.yoyopetwear.ca/the_product/default.htm (Dec. 2004).

(Continued)

*Primary Examiner* — Trinh Nguyen
(74) *Attorney, Agent, or Firm* — Ware, Fressola, Maguire & Barber LLP

(57) ABSTRACT

The present invention is directed to a canine garment that can be used to control and/or contain canine fluids, such as fluids related to canine urine marking, incontinence and heat-induced female menstruation. The canine garment may have a liner that is configured to wrap around the interior of the canine garment to prevent the flow of canine fluids onto the other portions of the canine garment and/or from escaping from the garment. The canine garment may also include a removable pad containing absorbent lining to prevent the flow of canine fluids, where the removable pad may be washable and reusable, and being made of wicking, odor-resistant fabrics. The canine garment may also be capable of accommodating a disposable pad that can be used to prevent the flow of canine fluids. The canine garment according to the present invention may also be comfortable when worn on the canine user's body.

20 Claims, 43 Drawing Sheets

(56) References Cited

U.S. PATENT DOCUMENTS

| | | | |
|---|---|---|---|
| 2,400,781 | A | 5/1946 | Priour |
| 2,406,575 | A | 8/1946 | Young et al. |
| 2,417,803 | A | 3/1947 | De Mar |
| 2,443,831 | A | 6/1948 | Miller |
| 2,539,606 | A | 1/1951 | Bailey |
| 2,545,761 | A | 3/1951 | Brink |
| 2,636,494 | A | 4/1953 | Hon |
| 2,974,635 | A | 3/1961 | McDowell |
| 3,050,063 | A | 8/1962 | Margraf |
| 3,101,696 | A | 8/1963 | Lipman |
| 3,141,443 | A | 7/1964 | Huey |
| 3,162,196 | A | 12/1964 | Salk |
| 3,211,132 | A | 10/1965 | Hersh |
| 3,247,846 | A | 4/1966 | Fansler |
| 3,395,708 | A | 8/1968 | Hervey et al. |
| 3,603,290 | A | 9/1971 | O'Rork |
| 3,738,330 | A | 6/1973 | Alofsin |
| 3,742,679 | A | 7/1973 | Jordan |
| 3,792,687 | A | 2/1974 | Ehrman |
| 3,817,217 | A | 6/1974 | Matuka et al. |
| 3,895,628 | A | 7/1975 | Adair |
| 3,943,930 | A | 3/1976 | Schaar |
| 3,971,371 | A | 7/1976 | Bloom |
| 4,095,562 | A | 6/1978 | Graham |
| 4,226,386 | A | 10/1980 | Rubi |
| 4,290,386 | A | 9/1981 | Eiriksson |
| 4,355,600 | A * | 10/1982 | Zielinski ........................ 119/850 |
| 4,444,152 | A | 4/1984 | Berardo |
| 4,510,887 | A | 4/1985 | Lincoln et al. |
| 4,527,991 | A | 7/1985 | Msarsa |
| 4,547,165 | A | 10/1985 | Scheurer et al. |
| 4,560,380 | A | 12/1985 | Tharel |
| 4,577,591 | A | 3/1986 | Wesseldine |
| 4,615,695 | A | 10/1986 | Cooper |
| 4,623,341 | A | 11/1986 | Roeder |
| 4,747,846 | A | 5/1988 | Boland et al. |
| 4,769,023 | A | 9/1988 | Goebel et al. |
| 4,801,298 | A | 1/1989 | Sorenson et al. |
| 4,813,949 | A | 3/1989 | O'Rourke |
| 4,838,886 | A | 6/1989 | Kent |
| 4,893,587 | A | 1/1990 | Bailey, Jr. |
| 4,917,683 | A | 4/1990 | Thompson |
| 4,955,880 | A | 9/1990 | Rodriquez |
| 4,969,419 | A | 11/1990 | Fong |
| 5,005,525 | A | 4/1991 | Stanton |
| 5,019,068 | A | 5/1991 | Perez et al. |
| 5,135,522 | A | 8/1992 | Fahrenkrug et al. |
| 5,146,874 | A | 9/1992 | Vidal |
| 5,187,817 | A | 2/1993 | Zolner |
| 5,196,240 | A | 3/1993 | Stockwell |
| 5,226,386 | A | 7/1993 | Thoma |
| 5,234,421 | A | 8/1993 | Lowman |
| 5,315,960 | A | 5/1994 | Lamp |
| 5,359,963 | A | 11/1994 | Jesse, Jr. et al. |
| 5,386,801 | A | 2/1995 | Chinn et al. |
| 5,447,124 | A | 9/1995 | Pollock et al. |
| 5,458,094 | A | 10/1995 | Proshan |
| 5,463,985 | A | 11/1995 | Shover |
| D368,338 | S | 3/1996 | Levengood |
| D372,563 | S | 8/1996 | Waugh, Jr. |
| 5,555,847 | A | 9/1996 | Kelly |
| D374,315 | S | 10/1996 | Caditz |
| 5,569,234 | A | 10/1996 | Buell et al. |
| D379,686 | S | 6/1997 | Caditz |
| 5,662,640 | A | 9/1997 | Daniels |
| 5,738,047 | A | 4/1998 | McNamara |
| 5,769,030 | A | 6/1998 | Acoff |
| D406,410 | S | 3/1999 | Pasqua |
| 5,934,226 | A | 8/1999 | Moore et al. |
| 5,954,015 | A | 9/1999 | Ohta |
| 6,058,890 | A | 5/2000 | Harrell |
| 6,070,557 | A | 6/2000 | Hibbert |
| 6,142,105 | A | 11/2000 | McKnight |
| 6,234,117 | B1 | 5/2001 | Spatt |
| 6,368,313 | B1 | 4/2002 | Howard |
| 6,557,497 | B1 | 5/2003 | Milligan |
| 6,651,649 | B2 | 11/2003 | Spencer |
| 6,895,901 | B1 | 5/2005 | Howard |
| 7,195,618 | B2 | 3/2007 | Ikegami |
| 7,464,668 | B2 | 12/2008 | Brewington |
| 7,887,527 | B2 * | 2/2011 | Hayashi et al. .......... 604/385.28 |
| 2003/0066495 | A1 | 4/2003 | Soares et al. |

OTHER PUBLICATIONS

Pet Diapers; Washable Pet Diapers; web site: www.petdiapers.com/washable-diapers.html (Jun. 2010).

Tinkle Trousers; The Ultimate Dog Diaper; web site: www.tinkletrousers.com/index.html (Oct. 2005).

Poochie Pants; Male Fancy; web site: www.poochiepants.com/shopping-mainmenu-2/productshc/browse/10-male-fancy.html (May 2010).

Poochie Pants; Casual Male; web site: www.poochiepants.com/shopping-mainmenu-2/productshc/browse/9-casual-male.html (May 2010).

Pet Diapers; Pet Diaper Suspenders for Disposable Diapers; web site: www.petdiapers.com/suspenders.html (Jul. 2010).

Happy Jack Dog Diapers; Best Dog Diapers; web site: www.bestdogdiapers.com/instructions.html (Sep. 2008).

* cited by examiner

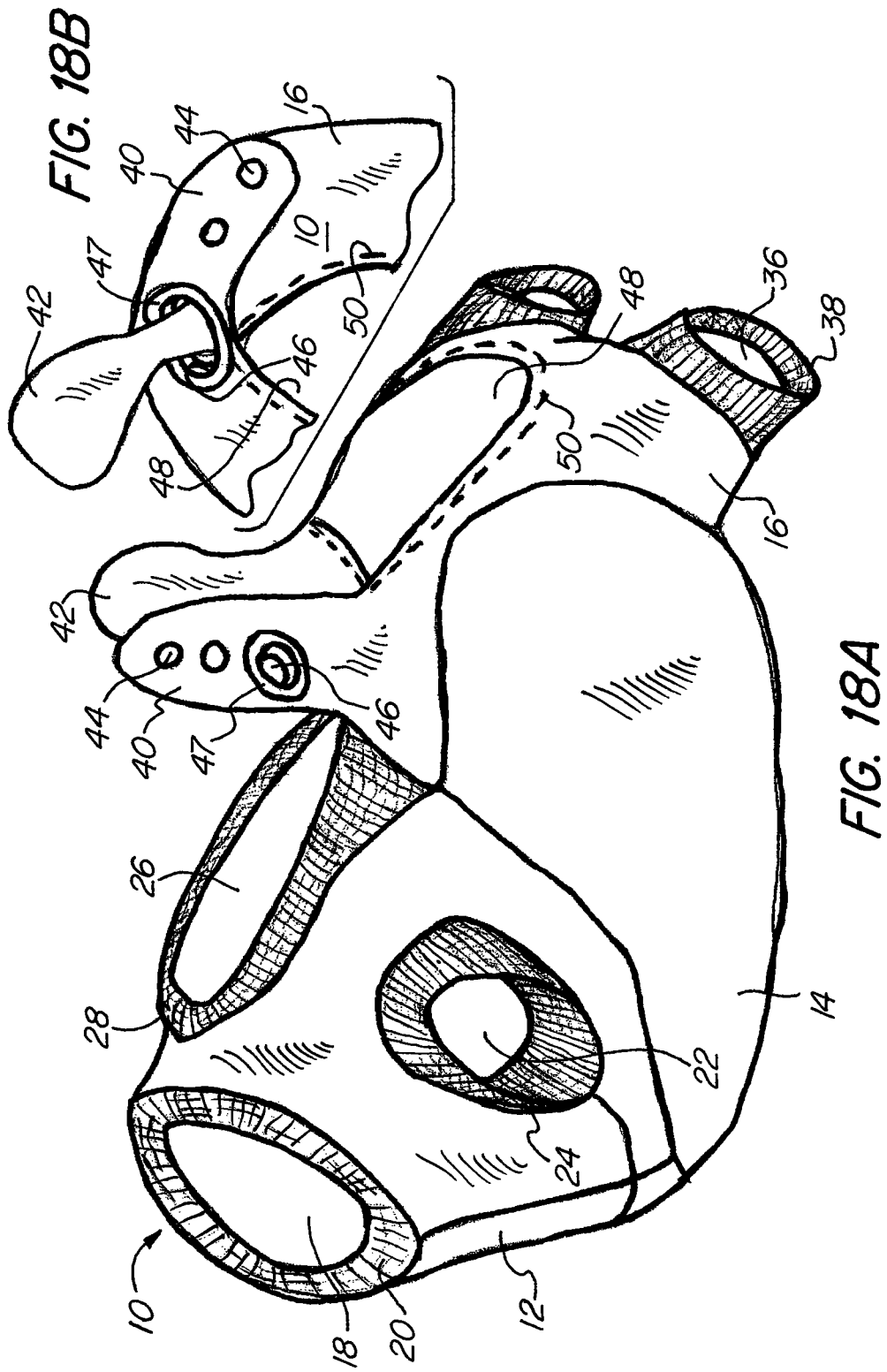

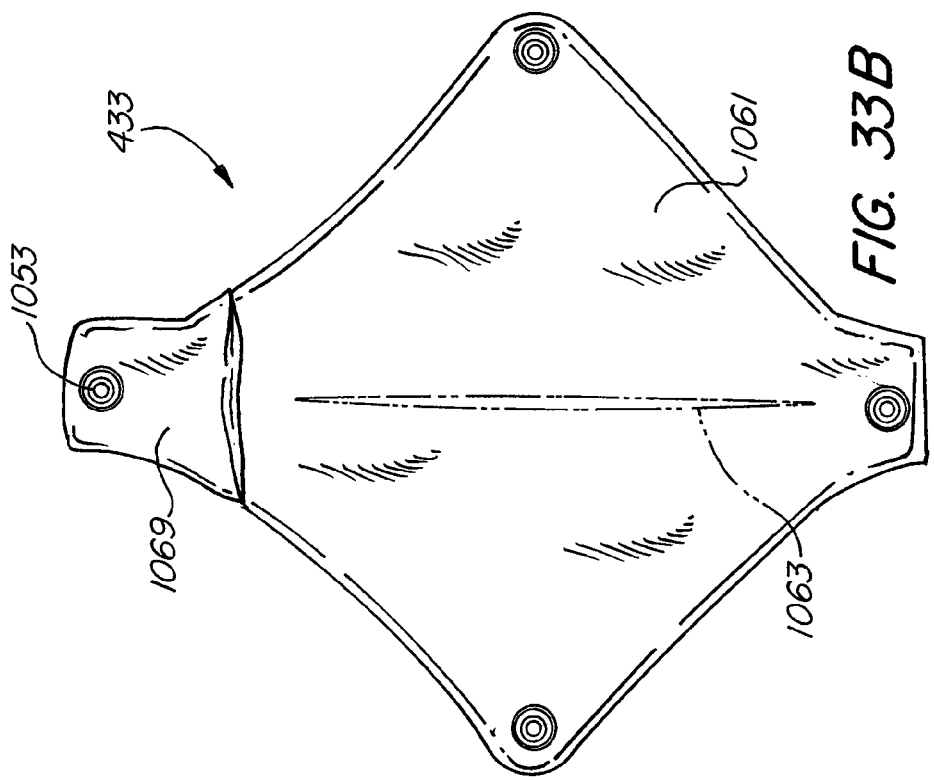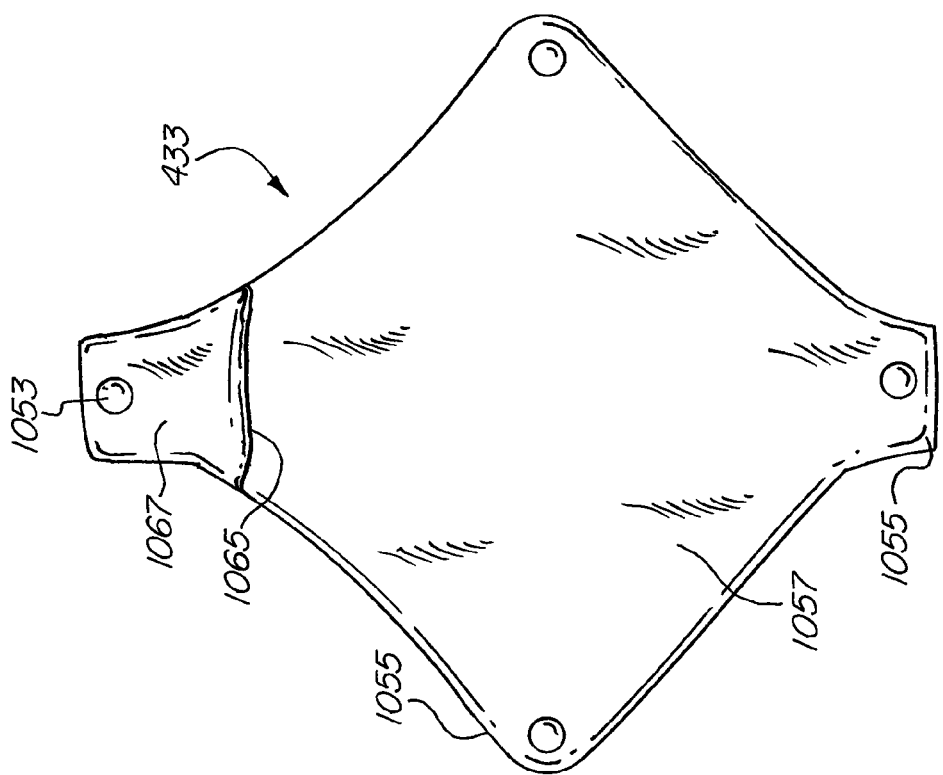

ENVIRONMENTALLY-FRIENDLY, FORM-FITTING CANINE GARMENT FOR URINE MARKING, INCONTINENCE AND HEAT-INDUCED FEMALE MENSTRUATION

CROSS-REFERENCE TO RELATED APPLICATION

This application claims priority to U.S. Provisional Appl. No. 61/574,929 filed Aug. 10, 2011, which is hereby incorporated by reference in its entirety.

BACKGROUND OF THE INVENTION

1. Field of the Invention

The present invention relates to domestic animal garments, and more particularly canine garments that are designed to control and/or contain a variety of fluids that may be excreted by canines.

2. Description of Related Art

Domestic animals, such as cats and dogs, usually spend substantially periods of time indoors due to the nature of their and/or their owner's lifestyles. Despite the time spent indoors the domestic animals still have a need to pass fluids and other wastes, and as a result of being indoors the domestic animals may be unable to do this in an appropriate manner and/or in appropriate locations. As a result, the domestic animals may cause soiling and/or damage to items, such as floors, carpets and furniture, that are indoors and not intended to come into contact with the fluids from the domestic animals. Therefore, it is desirable to provide a device that can assist in the containment and/or control of fluids from domestic animals in order to prevent and/or reduce the likelihood that the fluids come into contact with inappropriate surfaces. Conventional devices may compress the anatomy of the domestic animals, and as a result may either irritate the domestic animals so that they are not inclined to remain in the devices, or cause shifting of the devices so that they do not serve their purposes. Furthermore, conventional devices may include straps and/or buckles, which can constrain and/or irritate the domestic animals, also causing at least some of the above noticed limitations of conventional devices. Accordingly, what is needed is a garment for domestic animals, for example a canine garment, that overcomes these limitations of conventional domestic animal garments.

SUMMARY OF THE INVENTION

The present invention is designed to overcome the above noted limitations that are attendant upon the use of conventional canine garments and, toward this end, it contemplates the provision of a novel canine garment that can be used to control and/or contain canine fluids, such as fluids related to canine urine marking, incontinence and heat-induced female menstruation.

Accordingly, it is an object of the present invention to provide a canine garment having a liner that is configured to wrap around the interior of the canine garment in order to prevent the flow of canine fluids onto the other portions of the canine garment and/or from escaping from the garment.

It is another object of the present invention to provide a canine garment that includes a removable pad containing absorbent lining to prevent the flow of canine fluids, where the removable pad may be washable and reusable, and being made of wicking, odor-resistant fabrics.

It is yet another object of the present invention to provide a canine garment that is capable of accommodating a disposable pad that can be used to prevent the flow of canine fluids.

It is still another object of the present invention to provide a canine garment that is comfortable when worn on the canine user's body, in particular it is desirable that the canine garment should not obstruct the canine user's tail.

It is yet another object of the present invention to provide a canine garment made from fabric having ease so as to allow the canine user to comfortably change positions without the canine garment obstructing the movement of the canine user or coming off of the canine user.

It is still another object of the present invention to provide a canine garment that is adjustable in order to securely fit to the body of a canine user.

It is still another object of the present invention to provide a canine garment that has an open region positioned to surround the hind quarters of the canine user so as to allow the canine user to pass feces without staining and/or soiling the canine garment.

It is yet another object of the present invention to provide a canine garment that is free of straps and/or buckles that may cause discomfort for a canine user of the canine garment.

It is still another object of the present invention to provide a canine garment that is machine washable and machine dryable.

It has now been found that the foregoing and related objects can be readily attained in a canine garment in accordance with an exemplary embodiment of the present invention that is configured for use by a canine having a pair of front legs and a pair of hind legs, and includes a piece of material dimensioned to at least partially cover at least a portion of the canine, and a pad configured for attachment to the piece of material, and configured to absorb a quantity of fluid released from the canine.

In accordance with the exemplary embodiment of the present invention, the piece of material may include at least a pair of first openings positioned in the piece of material so as to be configured to receive the pair of front legs of the canine, a pair of second openings positioned relative to the pair of first openings in the piece of material so as to be configured to receive the pair of hind legs of the canine, and at least one securing mechanism having a first part and a second part, where the first part and the second part of the securing mechanism are configured to operatively engage in order to secure the piece of material to the portion of the canine.

In accordance with the exemplary embodiment of the present invention, the pad may include a first layer made at least partially of waterproof or water resistant material, and a second layer made at least partially of an absorbent material.

In accordance with the exemplary embodiment of the present invention, the piece of material may include a belly section configured to at least partially cover a belly section of the canine, and the pad is configured for attachment to the belly section of the piece of material.

In accordance with the exemplary embodiment of the present invention, the piece of material is configured to form a neck opening configured to extend around a neck of the canine, and dimensioned so as to allow a head of the canine to be inserted through the neck opening.

In accordance with the exemplary embodiment of the present invention, when the piece of material at least partially covers the portion of the canine at least a part of a hind portion of the canine is exposed.

In accordance with the exemplary embodiment of the present invention, the at least one securing mechanism is a zipper, and the first part is a first half of the zipper and the second part is a second half of the zipper.

In accordance with the exemplary embodiment of the present invention, the first part of the at least one securing mechanism is a first fastening tab, and the second part of the at least one securing mechanism is a second fastening tab configured for operative engagement with the first fastening tab.

In accordance with the exemplary embodiment of the present invention, the first fastening tab may include at least one fastening device, and the second fastening tab may include at least one fastening device corresponding to the at least one fastening device of the first fastening tab and configured for operative engagement with the at least one fastening device on the first fastening tab, and the first fastening tab may include a pass-though hole configured to receive the second fastening tab and permit securing of the garment to the canine.

In accordance with the exemplary embodiment of the present invention, the at least one securing mechanism may include two securing mechanisms, and the first part of each of the two securing mechanisms is a first fastening tab, and the second part of each of the two securing mechanisms is a second fastening tab configured for operative engagement with the first fastening tab.

In accordance with the exemplary embodiment of the present invention, the first fastening tab may include at least one fastening device, and the second fastening tab may include at least one fastening device corresponding to the at least one fastening device of the first fastening tab and configured for operative engagement with the at least one fastening device on the first fastening tab, and the first fastening tab may include a pass-though hole configured to receive the second fastening tab and permit securing of the garment to the canine.

In accordance with the exemplary embodiment of the present invention, the canine garment may also include a waterproof or water resistant liner covering at least a portion of the piece of material.

In accordance with the exemplary embodiment of the present invention, the piece of material made at least partially be made of a stretchable fabric.

In accordance with the exemplary embodiment of the present invention, the pad may also include a third layer made at least partially of a moisture-wicking material, and the pad is configured so that the first layer is positioned closest to the piece of material, the second layer is positioned between the first layer and the third layer, and the third layer is positioned farthest away from the piece of material when the pad is attached to the piece of material.

In accordance with the exemplary embodiment of the present invention, the pad is further configured for removable attachment to the piece of material by at least one fastening device, wherein the at least one fastening device is selected from a snap or hook-and-loop fasteners.

In accordance with the exemplary embodiment of the present invention, the pad is further configured for substantially fixed attachment to the piece of material.

In accordance with the exemplary embodiment of the present invention, the first layer of the pad is a liner configured to substantially contain the second layer of the pad, the first layer of the pad may include at least one pocket formed from the waterproof or water resistant material and positioned so as to cover at least a portion of the second layer of the pad when the second layer of the pad is contained within the first layer of the pad.

In accordance with the exemplary embodiment of the present invention, the second layer of the pad is an absorbent pad configured for removable attachment to the first layer of the pad; and wherein the second layer of the pad may include at least one pocket formed from the absorbent material.

In accordance with the exemplary embodiment of the present invention, the liner may include a perimeter and at least a portion of the perimeter is surrounded by an elastic material.

In accordance with the exemplary embodiment of the present invention, the absorbent pad may include a perimeter and at least a portion of the perimeter is surrounded by an elastic material.

In accordance with the exemplary embodiment of the present invention, the absorbent pad may include at least one fastening device configured for removable attachment to a corresponding fastening device positioned on the liner.

BRIEF DESCRIPTION OF THE SEVERAL
VIEWS OF THE DRAWINGS

For a fuller understanding of the nature and object of the present invention, reference should be had to the following detailed description taken in connection with the accompanying drawings, in which:

FIG. 18A is a left side view of an exemplary canine garment according to the present invention;

FIG. 18B is a close up view of fastening tabs of the exemplary canine garment shown in FIG. 18A in a closed orientation;

FIG. 33A is a top plan view of an exemplary pad that may be used with a canine garment according to the present invention;

FIG. 33B is a bottom plan view of the exemplary pad from FIG. 33A that may be used with a canine garment according to the present invention;

DETAILED DESCRIPTION OF THE INVENTION

Figure 1:
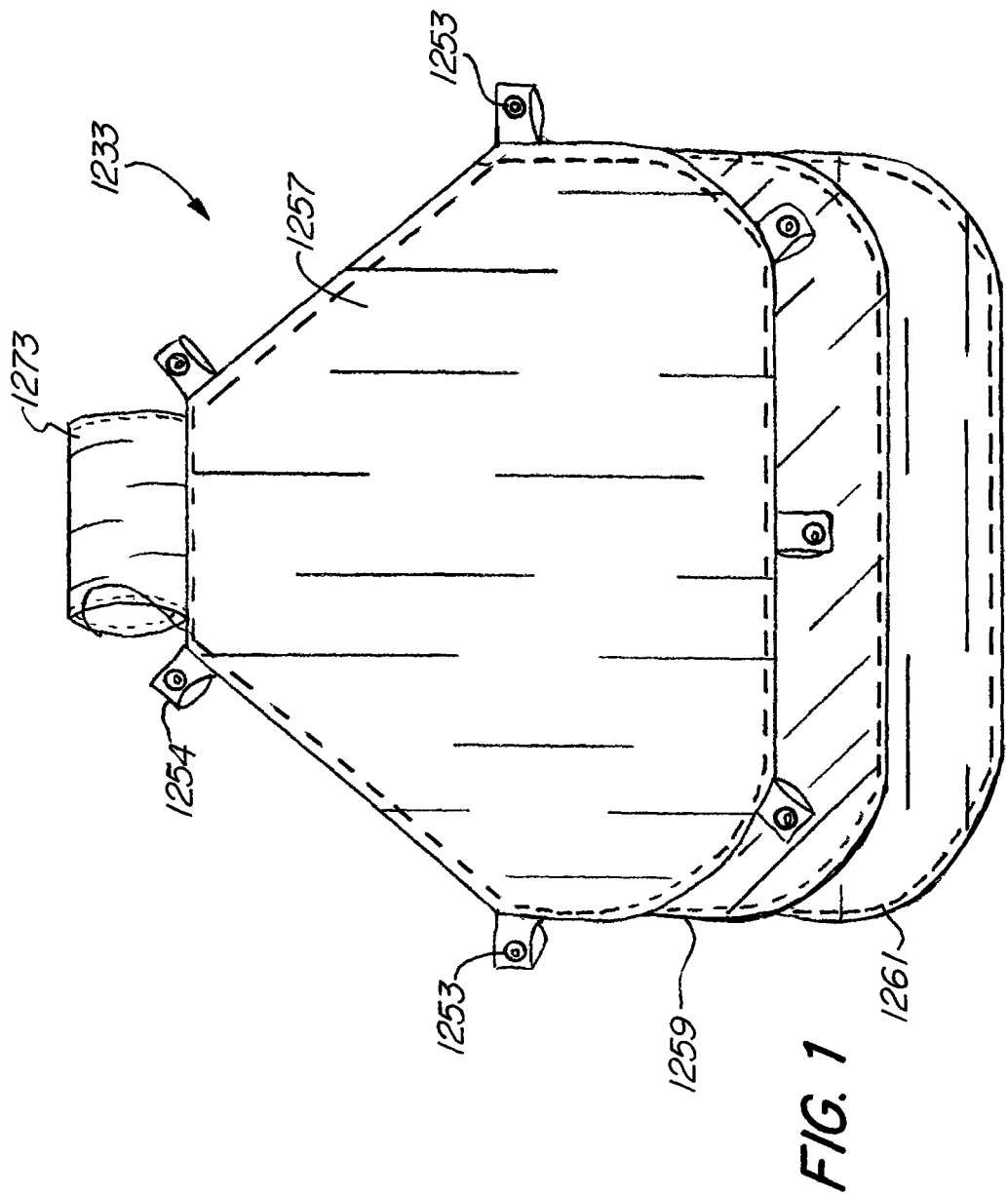
FIG. 1 is a bottom plan exploded view of an exemplary pad that may be used with a canine garment according to the present invention.
Figure 1A:
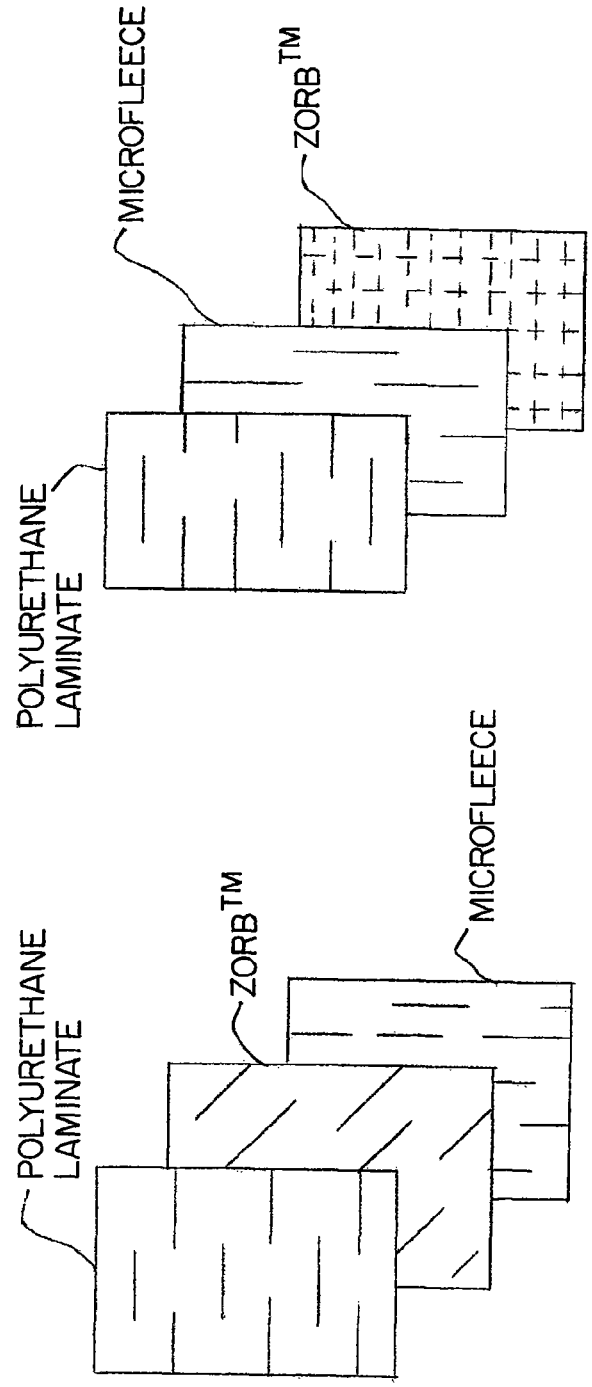
FIG. 1A is a pair of keys identifying the drawing symbols used to represent the types of fabrics that may be used in accordance with exemplary embodiments of the present invention, the key on the left side refers to FIGS. 1-21 and the key on the right side refers to FIGS. 22-27.

The present invention now will be described more fully hereinafter with reference to the accompanying figures, in which exemplary embodiments of the invention are shown. The invention may, however, be embodied in many different forms and should not be construed as limited to the embodiments set forth herein. Like reference numerals refer to like elements throughout, and elements of alternative exemplary embodiments that correspond to similar elements from other alternative exemplary embodiments are identified by a reference numeral increased by 100 from the reference numeral used to identify the similar element from the previously discussed exemplary embodiment.

Referring first to FIGS. 3, 4A, 4B, 5-6 and 20A, therein illustrated is an exemplary embodiment of a form-fitting canine garment, generally indicated by the numeral 10, according to the present invention that can be used to contain and/or control male canine territorial marking habits, canine incontinence and female canine menstruation cycles. As used herein, the terms "marking," "mark" and "leg-lifting" refer to any and all behavior exhibited by both male and female canines that involve the canines emitting small amounts of urine for circumstantial, hormonal and behavioral reasons, including but not limited to, territorial and stress-induced marking. As used herein, the term "incontinence" refers to at least partial emptying of urine from a canine's bladder, whether controlled or uncontrolled. Accordingly, the canine garment 10 according to the present invention is generally directed to the containment and/or control of fluids that may be excreted, secreted and/or expelled from a canine wearer 11 of the canine garment 10. The canine garment 10 may include a front section 12 designed to be secured around the neck and/or front legs of a canine wearer 11. The canine garment 10 may also include a belly section 14 attached to the front section 12 and designed to at least partially cover the underside of the canine wearer's 11 torso. Attached to the belly section 14 is a hind section 16 that is designed to be secured to the hind quarters of the canine wearer 11. It is understood that while the canine garment 10 is depicted as having the front section 12, the belly section 14 and the hind section 16 as being made from separate pieces of material, the canine garment 10 may have two or more of these components formed from the same piece of material.

Referring now to FIGS. 3, 5-6 and 20A, the front section 12 of the canine garment 10 may include a neck hole 18 that is configured and dimensioned to go around the canine wearer's 11 head and fit around the canine wearer's neck. The neck hole 18 may be surrounded by stretch ribbing 20, or other suitable elastic type material, that allows the neck hole 18 to be expanded and contracted in order to meet the needs of placing the canine garment 10 on the canine wearer 11, and permit comfortable fit of the canine garment 10 on the canine wearer 11. The front section 12 may also include a pair of front leg holes 22, and each of the front leg holes 22 may be surrounded by stretch ribbing 24, or other suitable elastic type material. Each of the front leg holes 22 is configured and dimensioned so that the front legs of the canine wearer 11 may be placed through the appropriate front leg hole 22, and the stretch ribbing 24 around each of the front leg holes 22 facilitates placing the canine garment 10 on the canine wearer 11, and permits comfortable fit of the canine garment 10 on the canine wearer 11. The front section 12 of the canine garment 10 may also include a cut-out portion 26 in order to provide an opening on the canine garment 10 along the canine wearer's 11 back. The cut-out portion 26 may have an elastic 28, or other stretchable material, along the cut-out portion's 26 perimeter in order to facilitate secure fitting of the canine garment 10 to the canine wearer 11.

Figure 3:
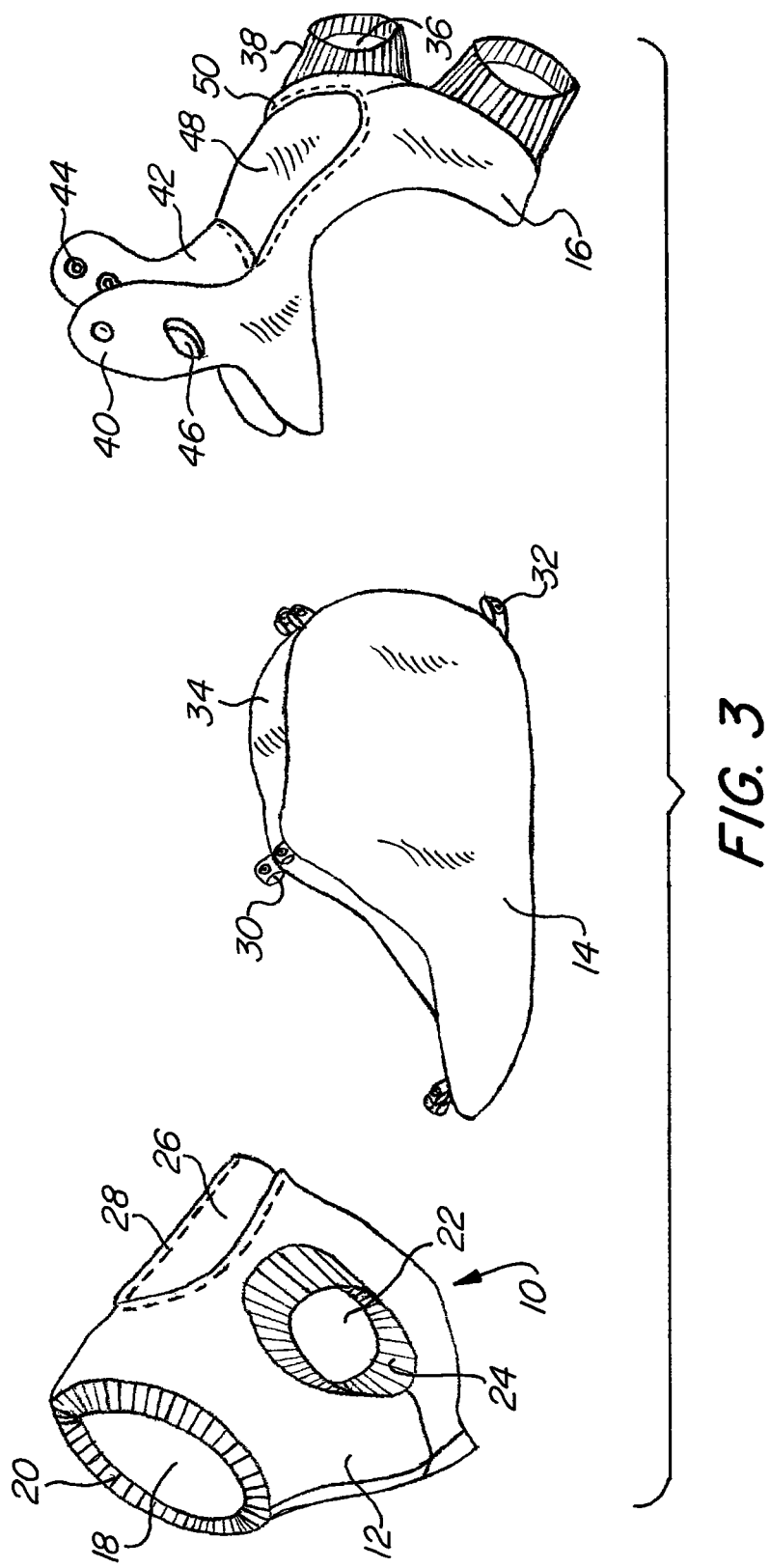
FIG. 3 is an exploded side view of an exemplary canine garment according to the present invention.
Figure 4A:
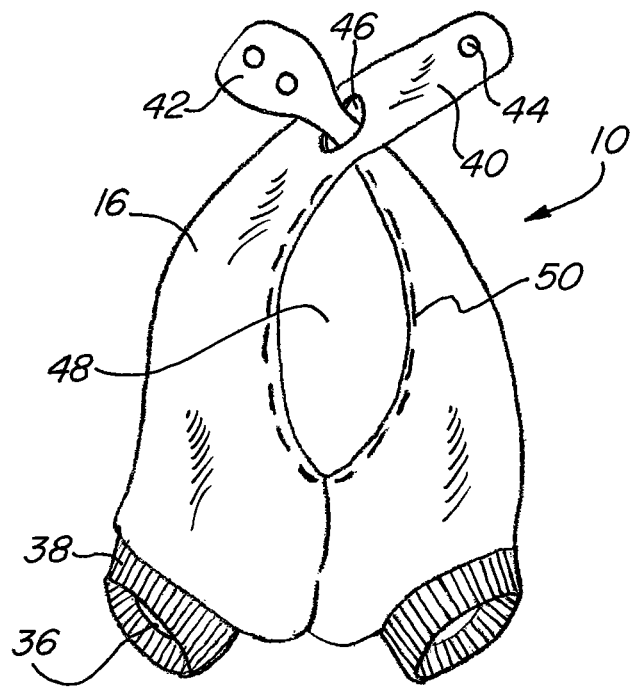
FIG. 4A is a rear view of an exemplary canine garment according to the present invention.
Figure 4B:
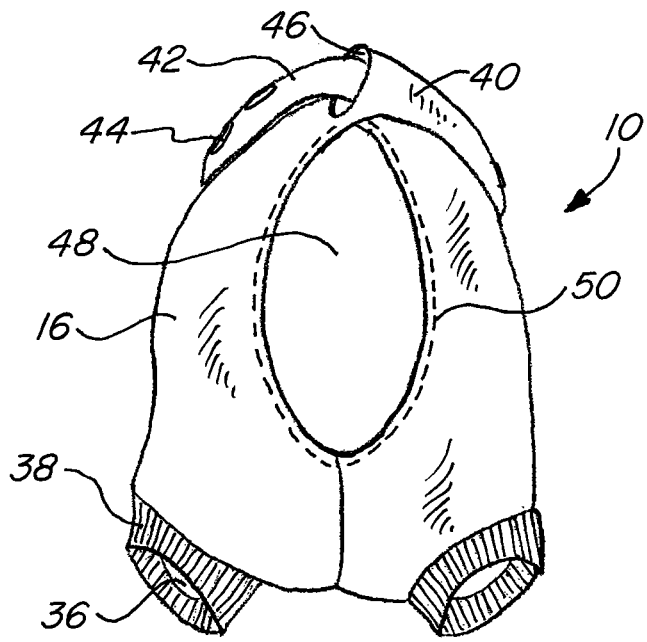
FIG. 4B is a rear view of an exemplary canine garment according to the present invention.

Referring now to FIG. 3, the belly section 14 of the canine garment 10 may include one or more tabs 30, and each of the one or more tabs 30 may have a fastener 32, for example a snap fastener, positioned thereon. The one or more tabs 30 on the belly section 14 are positioned so as to allow a removable pad (not shown) to be removably secured to the canine garment 10. The belly section 14 may also include a belly liner 34 positioned on the interior side of the belly section 14 that will face towards the canine wearer (not shown). The belly liner 34 may be made from a suitable waterproof or water resistant material, such as polyurethane laminate. Exemplary embodiments of the removable pad that may be used with the exemplary embodiments of the canine garment according to the present invention will be discussed further below. It is understood that while the belly section 14 of the canine garment 10 may include one or more tabs 30 with fasteners 32 positioned thereon, it is also contemplated that the fasteners 32 may be positioned directly on the belly section 14. Furthermore, it is also understood that instead of having a removable pad (not shown), a pad may be attached directly to the belly section 14 by sewing the pad to the belly section 14 or by other appropriate attachment mechanisms. If the pad (not shown) is attached to the belly section 14, the pad may have substantially the same shape as the belly section 14 in order to create a cupped, well-like shape that prevents the canine fluids from flowing into other portions of the canine garment 10 and onto other surfaces that the canine wearer (not shown) may come into contact with. If the pad (not shown) is attached to the belly section 14, it may have a number of layers, for example a top layer (not shown) positioned on the interior side of the belly section 14 that may be made from the same material as the belly section 14. The sewn in pad (not shown) may also include a second layer (not shown) positioned between the first layer (not shown) and the belly section 14 made from a moisture wicking material, such as micro-fleece fabric, a third layer (not shown) positioned between the second layer (not shown) and the belly section 14 made from an absorbent material, such as a hybrid fabric made from bamboo, cotton, viscose and polymicrofibers, and example of such hybrid fabric is ZORB™ fabric available from Wazoodle Fabrics of 2-9 Heritage Road, Markham, Canada. The sewn in pad (not shown) may also include a fourth layer (not shown) positioned between the third layer (not shown) and the belly section 14 made of water proof or water resistant material, such as polyurethane laminate. It is understood that if the belly section 14 already includes a belly liner 34 then it may not be necessary that the sewn in pad (not shown) to also include a fourth layer (not shown) made of water proof or water resistant material.

Referring now to FIGS. 3, 4A, 4B, 5-6, 18A, 18B and 20A, the hind section 16 of the canine garment 10 may include a pair of hind leg holes 36, and each of the hind leg holes 36 may be surrounded by stretch ribbing 38, or other suitable elastic material. The hind section 16 may also include a first fastening tab 40 and a second fastening tab 42 that are configured to operatively engage with each other in order to allow the canine garment 10 to be removably fastened to the canine wearer 11. The first fastening tab 40 and the second fastening tab 42 may include fastening elements 44 that are each configured to removably secure the first fastening tab 40 and the second fastening tab 42 to the canine garment 10. The fastening elements 44 may be for example snaps or other removably engaging fastening devices. The first fastening tab 40 may include a pass-through hole 46 that is configured to allow the second fastening tab 42 to be passed through the first fastening tab 40, as shown for example in FIG. 4A in order to allow for secure positioning of the fastening tabs 40, 42 when in the closed position, as shown for example in FIG. 4B. The pass-through hole 46 may be formed as a result of a hole in the material that forms the hind section 16. As shown for example in FIGS. 18A and 18B, the pass-through hole 46 may include a grommet 47 or created as a result of button-hole stitching (not shown). The hind section 16 also includes a hind-quarters opening 48 positioned so that the canine wearer 11 may pass feces while wearing the canine garment 10 without staining or soiling the canine garment 10. The hind-quarters opening 48 may be at least partially surrounded by an elastic 50 in order to permit a snug fit of the canine garment 10 on the canine wearer 11.

The canine garment 10 may be made from any suitable fabric, preferably a stretchable, form-fitting fabric, and even more preferably a fabric that is lightweight and breathable in order to ensure that the canine wearer 11 of the canine garment 10 remains cool in temperature. The canine garment 10 made from a suitable fabric allows the canine wearer 11 to change positions comfortably without being restricted by the canine garment 10. For example, the canine garment 10 can be made from such fabrics as cotton knit, nylon, mesh and/or fleece. It is understood that the canine garment 10 may be made from any combination of suitable fabrics.

Referring now to FIGS. 7-11, which show another exemplary canine garment 110 adorned on exemplary canine wearers 111. The canine garment 110 according to the present invention is generally directed to the containment and/or control of fluids that may be excreted, secreted and/or expelled from a canine. The canine garment 110 may include a front section 112 designed to be secured around the neck and/or front legs of the canine wearer 111. The canine garment 110 may also include a belly section 114 attached to the front section 112 and designed to at least partially cover the underside of the canine wearer's 111 torso. Attached to the belly section 114 is a hind section 116 that is designed to be secured to the hind quarters of the canine wearer 111. It is understood that while the canine garment 110 is depicted as having the front section 112, the belly section 114 and the hind section 116 as being made from separate pieces of material, the canine garment 110 may have two or more of these components formed from the same piece of material.

Still referring to FIGS. 7-11, the front section 112 of the canine garment 110 may include a neck hole 118 that is configured and dimensioned to go around the canine wearer's 111 head, and fit around the canine wearer's 111 neck. The neck hole 118 may be surrounded by stretch ribbing 120 that allows the neck hole 118 to be expanded and contracted in order to meet the needs of placing the canine garment 110 on the canine wearer 111, and permit comfortable fit of the canine garment 110 on the canine wearer 111. The front section 112 may also include a pair of front leg holes 122, and each of the front leg holes 122 may be surrounded by stretch ribbing 124. Each of the front leg holes 122 is configured and dimensioned so that the front legs of the canine wearer 111 may be placed through the appropriate front leg hole 122, and the stretch ribbing 124 around each of the front leg holes 122 facilitates placing the canine garment 110 on the canine wearer 111, and permits comfortable fit of the canine garment 110 on the canine wearer 111. The front section 112 of the canine garment 110 may also include a cut-out portion 126 in order to provide an opening on the canine garment 110 along the canine wearer's 111 back. The cut-out portion 126 may have an elastic 128 along the cut-out portion's 126 perimeter in order to facilitate secure fitting of the canine garment 110 to the canine wearer 111.

Still referring to FIGS. 7-11, the belly section 114 of the canine garment 110 may include one or more tabs (not shown) positioned on the inside region, i.e. the region facing the canine wearer 111, of the canine garment 110, and each of the one or more tabs may have a fastener (not shown), for example a snap fastener, positioned thereon. The one of more tabs (not shown) on the belly section 114 are positioned so as to allow a removable pad (not shown) to be removably secured to the canine garment 110. The belly section 114 may also include a belly liner (not shown) positioned on the interior side of the belly section 114 that will face towards the canine wearer 111. The belly liner (not shown) may be made from a suitable waterproof or water resistant material, such as polyurethane laminate. Exemplary embodiments of the removable pad that may be used with the exemplary embodiments of the canine garment according to the present invention will be discussed further below. It is understood that while the belly section 114 of the canine garment 110 may include one or more tabs (not shown) with fasteners (not shown) positioned thereon, it is also contemplated that the fasteners may be positioned directly on the belly section 114. Furthermore, it is also understood that instead of having a removable pad (not shown), a pad may be attached directly to the belly section 114 by sewing the pad to the belly section 114 or by other appropriate attachment mechanisms. If the pad (not shown) is attached to the belly section 114, the pad may have substantially the same shape as the belly section 114 in order to create a cupped, well-like shape that prevents the canine fluids from flowing into other portions of the canine garment 110 and onto other surfaces that the canine wearer 111 may come into contact with. If the pad (not shown) is attached to the belly section 114, it may have a number of layers, for example a top layer (not shown) positioned on the interior side of the belly section 114 that may be made from the same material as the belly section 114. The sewn in pad (not shown) may also include a second layer (not shown) positioned between the first layer (not shown) and the belly section 114 made from a moisture wicking material, such as micro-fleece fabric, a third layer (not shown) positioned between the second layer (not shown) and the belly section 114 made from an absorbent material, such as a hybrid fabric made from bamboo, cotton, viscose and polymicrofibers. The sewn in pad (not shown) may also include a fourth layer (not shown) positioned between the third layer (not shown) and the belly section 114 made of water proof or water resistant material, such as polyurethane laminate. It is understood that if the belly section 114 already includes a belly liner (not shown) then it may not be necessary that the sewn in pad (not shown) to also include a fourth layer (not shown) made of water proof or water resistant material.

Still referring to FIGS. 7-11, the hind section 116 of the canine garment 110 may include a pair of hind leg holes 136, and each of the hind leg holes 136 may be surrounded by stretch ribbing 138. The hind section 116 may also include a first fastening tab 140 and a second fastening tab 142 that are configured to operatively engage with each other in order to allow the canine garment 110 to be removably fastened to the canine wearer 111. The first fastening tab 140 and the second fastening tab 142 include fastening elements 145 that are each configured to removably secure the first fastening tab 140 and/or the second fastening tab 142 to the canine garment 110. The fastening elements 145 may be for example hook-and-loop fasteners. The first fastening tab 140 may include a pass-through hole 146 that is configured to allow the second fastening tab 142 to be passed through the first fastening tab 140, as shown for example in FIG. 4A in order to allow for secure positioning of the fastening tabs 140, 142 when in the closed position, as shown for example in FIG. 10. It is understood that the pass-through hole 146 may also be positioned in the second fastening tab 142, as shown for example in FIG. 9. The pass-through hole 146 may be formed as a result of a hole in the material that forms the hind section 116 and may include a grommet (not shown) or created as a result of button-hole stitching (not shown). The hind section 116 also includes a hind-quarters opening 148 positioned so that the canine wearer 111 may pass feces while wearing the canine garment 110 without staining or soiling the canine garment 110. The hind-quarters opening 148 may be at least partially surrounded by an elastic 150 in order to permit a snug fit of the canine garment 110 on the canine wearer 111.

The canine garment 110 may be made from any suitable fabric, preferably a stretchable, form-fitting fabric, and even more preferably a fabric that is lightweight and breathable in order to ensure that the canine wearer 111 of the canine garment 110 remains cool in temperature. The canine garment 110 made from a suitable fabric allows the canine wearer 111 to change positions, for example the various positions of the canine wearer 111 depicted in FIGS. 7-11, in a comfortable manner without being restricted by the canine garment 110. For example, the canine garment 110 can be made from such fabrics as cotton knit, nylon, mesh and/or fleece. It is understood that the canine garment 110 may be made from any combination of suitable fabrics.

Figure 20C:
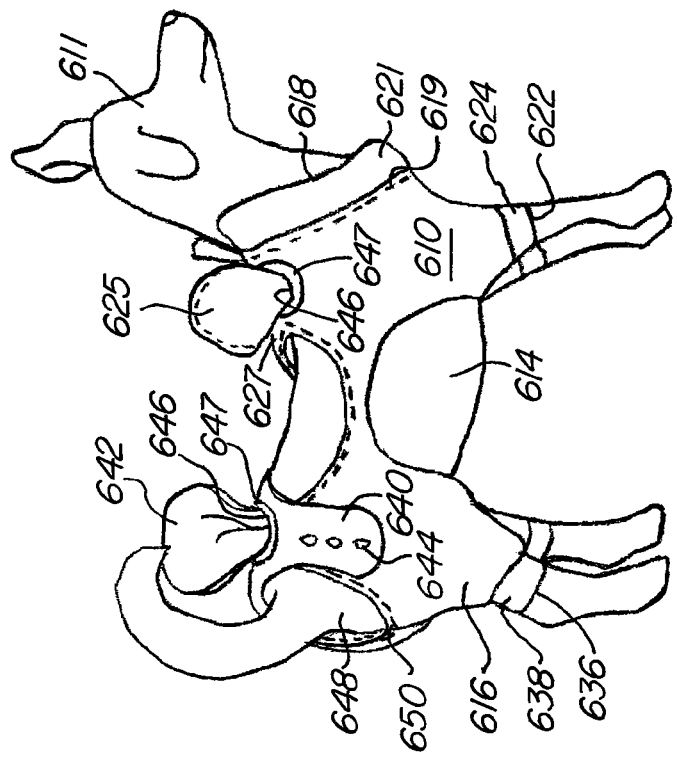
FIG. 20C is a right side view of a canine adorned with an exemplary canine garment according to the present invention.
Figure 20A:
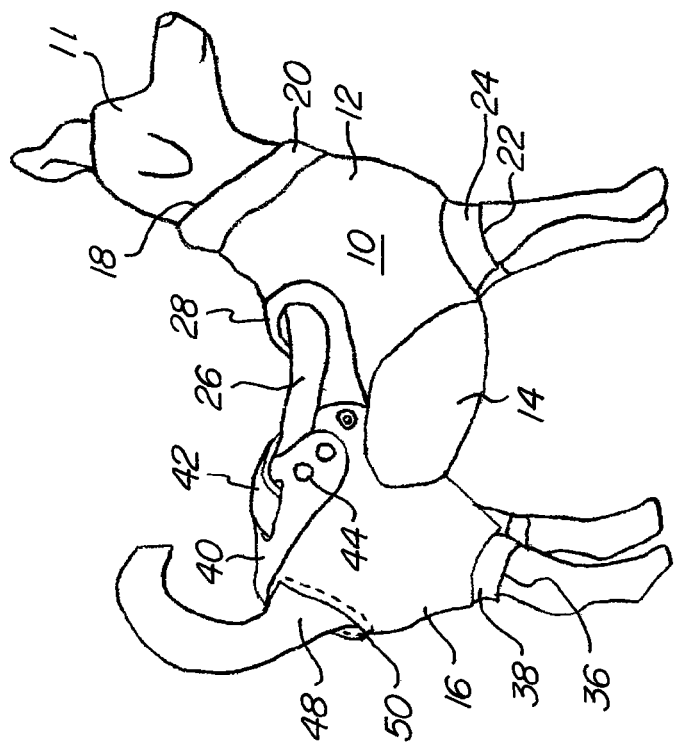
FIG. 20A is a right side view of a canine adorned with an exemplary canine garment according to the present invention.
Figure 20B:
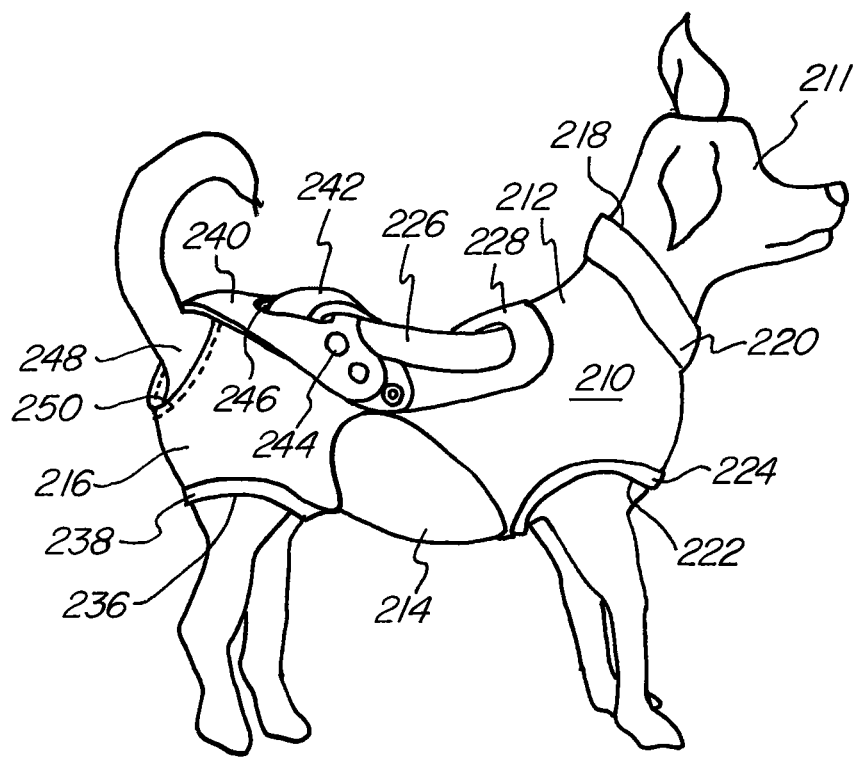
FIG. 20B is a right side view of a canine adorned with an exemplary canine garment according to the present invention.

Referring now to FIG. 20B, which show another exemplary canine garment 210 adorned on an exemplary canine wearer 211. The canine garment 210 according to the present invention is generally directed to the containment and/or control of fluids that may be excreted, secreted and/or expelled from the canine wearer 211. The canine garment 210 may include a front section 212 designed to be secured around the neck and/or front legs of the canine wearer 211. The canine garment 210 may also include a belly section 214 attached to the front section 212 and designed to at least partially cover the underside of the canine wearer's 211 torso. Attached to the belly section 214 is a hind section 216 that is designed to be secured to the hind quarters of the canine wearer 211. It is understood that while the canine garment 210 is depicted as having the front section 212, the belly section 214 and the hind section 216 as being made from separate pieces of material, the canine garment 210 may have two or more of these components formed from the same piece of material.

Still referring to FIG. 20B, the front section 212 of the canine garment 210 may include a neck hole 218 that is configured and dimensioned to go around the canine wearer's 211 head, and fit around the canine wearer's 211 neck. The neck hole 218 may be surrounded by stretch ribbing 220 that allows the neck hole 218 to be expanded and contracted in order to meet the needs of placing the canine garment 210 on the canine wearer 211, and permit comfortable fit of the canine garment 210 on the canine wearer 211. The front section 212 may also include a pair of front leg holes 222, and each of the front leg holes 222 may be surrounded by stretch ribbing 224. Each of the front leg holes 222 is configured and dimensioned so that the front legs of the canine wearer 211 may be placed through the appropriate front leg hole 222, and the stretch ribbing 224 around each of the front leg holes 222 facilitates placing the canine garment 210 on the canine wearer 211, and permits comfortable fit of the canine garment 210 on the canine wearer 211. The front section 212 of the canine garment 210 may also include a cut-out portion 226 in order to provide an opening on the canine garment 210 along the canine wearer's 211 back. The cut-out portion 226 may have an elastic 228 along the cut-out portion's 226 perimeter in order to facilitate secure fitting of the canine garment 210 to the canine wearer 211.

Still referring to FIG. 20B, the belly section 214 of the canine garment 210 may include one or more tabs (not shown) positioned on the inside region, i.e. the region facing the canine wearer 211, of the canine garment 210, and each of the one or more tabs may have a fastener (not shown), for example a snap fastener, positioned thereon. The one of more tabs (not shown) on the belly section 214 are positioned so as to allow a removable pad (not shown) to be removably secured to the canine garment 210. The belly section 214 may also include a belly liner (not shown) positioned on the interior side of the belly section 214 that will face towards the canine wearer 211. The belly liner (not shown) may be made from a suitable waterproof or water resistant material, such as polyurethane laminate. Exemplary embodiments of the removable pad that may be used with the exemplary embodiments of the canine garment according to the present invention will be discussed further below. It is understood that while the belly section 214 of the canine garment 210 may include one or more tabs (not shown) with fasteners (not shown) positioned thereon, it is also contemplated that the fasteners may be positioned directly on the belly section 214. Furthermore, it is also understood that instead of having a removable pad (not shown), a pad may be attached directly to the belly section 214 by sewing the pad to the belly section 214 or by other appropriate attachment mechanisms. If the pad (not shown) is attached to the belly section 214, the pad may have substantially the same shape as the belly section 214 in order to create a cupped, well-like shape that prevents the canine fluids from flowing into other portions of the canine garment 210 and onto other surfaces that the canine wearer 211 may come into contact with. If the pad (not shown) is attached to the belly section 214, it may have a number of layers, for example a top layer (not shown) positioned on the interior side of the belly section 214 that may be made from the same material as the belly section 214. The sewn in pad (not shown) may also include a second layer (not shown) positioned between the first layer (not shown) and the belly section 214 made from a moisture wicking material, such as micro-fleece fabric, a third layer (not shown) positioned between the second layer (not shown) and the belly section 214 made from an absorbent material, such as a hybrid fabric made from bamboo, cotton, viscose and polymicrofibers. The sewn in pad (not shown) may also include a fourth layer (not shown) positioned between the third layer (not shown) and the belly section 214 made of water proof or water resistant material, such as polyurethane laminate. It is understood that if the belly section 214 already includes a belly liner (not shown) then it may not be necessary that the sewn in pad (not shown) to also include a fourth layer (not shown) made of water proof or water resistant material.

Still referring to FIG. 20B, the hind section 216 of the canine garment 210 may include a pair of hind leg holes 236, and each of the hind leg holes 236 may be surrounded by stretch ribbing 238. The hind section 216 may also include a first fastening tab 240 and a second fastening tab 242 that are configured to operatively engage with each other in order to allow the canine garment 210 to be removably fastened to the canine wearer 211. The first fastening tab 240 and the second fastening tab 242 include fastening elements 244 that are each configured to removably secure the first fastening tab 240 and/or the second fastening tab 242 to the canine garment 210. The fastening elements 244 may be for example snaps. The first fastening tab 240 may include a pass-through hole 246 that is configured to allow the second fastening tab 242 to be passed through the first fastening tab 240. It is understood that the pass-through hole 246 may also be positioned in the second fastening tab 242. The pass-through hole 246 may be formed as a result of a hole in the material that forms the hind section 216 and may include a grommet (not shown) or created as a result of button-hole stitching (not shown). The hind section 216 also includes a hind-quarters opening 248 positioned so that the canine wearer 211 may pass feces while wearing the canine garment 210 without staining or soiling the canine garment 210. The hind-quarters opening 248 may be at least partially surrounded by an elastic 250 in order to permit a snug fit of the canine garment 210 on the canine wearer 211.

The canine garment 210 may be made from any suitable fabric, preferably a stretchable, form-fitting fabric, and even more preferably a fabric that is lightweight and breathable in order to ensure that the canine wearer 211 of the canine garment 210 remains cool in temperature. The canine garment 210 made from a suitable fabric allows the canine wearer 211 to change positions in a comfortable manner without being restricted by the canine garment 210. For example, the canine garment 210 can be made from such fabrics as cotton knit, nylon, mesh and/or fleece. It is understood that the canine garment 210 may be made from any combination of suitable fabrics.

Figure 12:
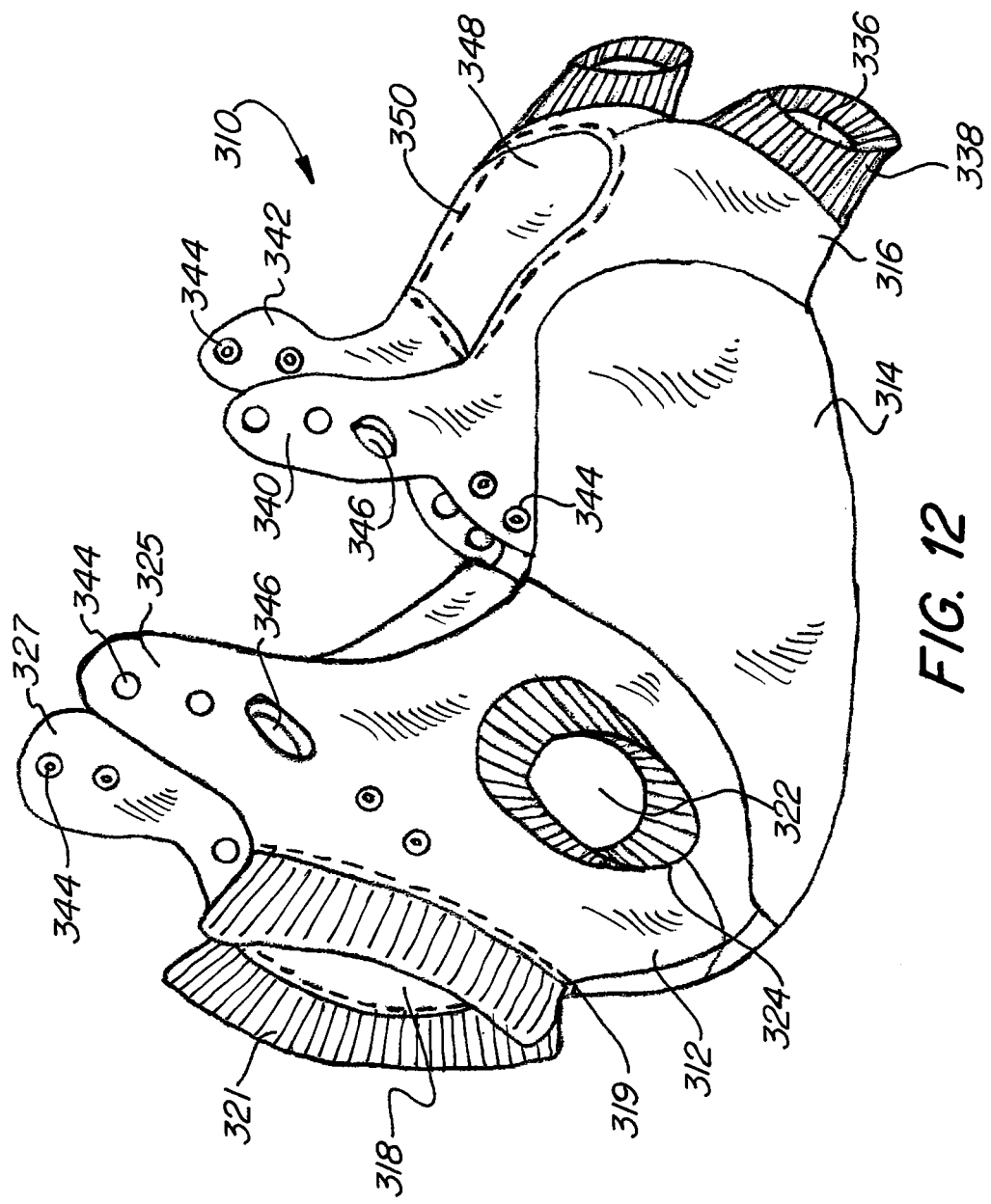
FIG. 12 is a left side view of an exemplary canine garment according to the present invention.

Referring now to FIG. 12, which shows another exemplary canine garment 310 according to the present invention. The canine garment 310 according to the present invention is generally directed to the containment and/or control of fluids that may be excreted, secreted and/or expelled from a canine wearer (not shown). The canine garment 310 may include a front section 312 designed to be secured around the neck and/or front legs of the canine wearer (not shown). The canine garment 310 may also include a belly section 314 attached to the front section 312 and designed to at least partially cover the underside of the canine wearer's (not shown) torso. Attached to the belly section 314 is a hind section 316 that is designed to be secured to the hind quarters of the canine wearer (not shown). It is understood that while the canine garment 310 is depicted as having the front section 312, the belly section 314 and the hind section 316 as being made from separate pieces of material, the canine garment 310 may have two or more of these components formed from the same piece of material.

Still referring to FIG. 12, the front section 312 of the canine garment 310 may include a neck hole 318 that is configured and dimensioned to go around the canine wearer's (not shown) neck. The neck hole 318 may be surrounded by an elastic 319 that allows the neck hole 318 to be expanded and contracted in order to meet the needs of placing the canine garment 310 on the canine wearer, and permit comfortable fit of the canine garment 310 on the canine wearer. The front section 312 may further include a bifurcated collar 321 positioned on either side of the neck hole 318 and extending from the front section 312. The front section 312 may also include a pair of front leg holes 322, and each of the front leg holes 322 may be surrounded by stretch ribbing 324. Each of the front leg holes 322 is configured and dimensioned so that the front legs of the canine wearer (not shown) may be placed through the appropriate front leg hole 322, and the stretch ribbing 324 around each of the front leg holes 322 facilitates placing the canine garment 310 on the canine wearer, and permits comfortable fitment of the canine garment 310. The front section 312 of the canine garment 310 may also include a first neck tab 325 and a second neck tab 327 extending from the front section 312, and allowing the front section 312 to be wrapped around the neck of a canine wearer (not shown) in order to facilitate putting on and taking off of the canine garment 310 from the canine wearer.

Still referring to FIG. 12, the belly section 314 of the canine garment 310 may include one or more tabs (not shown) positioned on the inside region, i.e. the region facing the canine wearer (not shown), of the canine garment 310, and each of the one or more tabs may have a fastener (not shown), for example a snap fastener, positioned thereon. The one of more tabs (not shown) on the belly section 314 are positioned so as to allow a removable pad (not shown) to be removably secured to the canine garment 310. The belly section 314 may also include a belly liner (not shown) positioned on the interior side of the belly section 314 that will face towards the canine wearer. The belly liner (not shown) may be made from a suitable waterproof or water resistant material, such as polyurethane laminate. Exemplary embodiments of the removable pad that may be used with the exemplary embodiments of the canine garment according to the present invention will be discussed further below. It is understood that while the belly section 314 of the canine garment 310 may include one or more tabs (not shown) with fasteners (not shown) positioned thereon, it is also contemplated that the fasteners may be positioned directly on the belly section 314. Furthermore, it is also understood that instead of having a removable pad (not shown), a pad may be attached directly to the belly section 314 by sewing the pad to the belly section 314 or by other appropriate attachment mechanisms. If the pad (not shown) is attached to the belly section 314, the pad may have substantially the same shape as the belly section 314 in order to create a cupped, well-like shape that prevents the canine fluids from flowing into other portions of the canine garment 310 and onto other surfaces that the canine wearer (not shown) may come into contact with. If the pad (not shown) is attached to the belly section 314, it may have a number of layers, for example a top layer (not shown) positioned on the interior side of the belly section 314 that may be made from the same material as the belly section 314. The sewn in pad (not shown) may also include a second layer (not shown) positioned between the first layer (not shown) and the belly section 314 made from a moisture wicking material, such as micro-fleece fabric, a third layer (not shown) positioned between the second layer (not shown) and the belly section 314 made from an absorbent material, such as a hybrid fabric made from bamboo, cotton, viscose and polymicrofibers. The sewn in pad (not shown) may also include a fourth layer (not shown) positioned between the third layer (not shown) and the belly section 314 made of water proof or water resistant material, such as polyurethane laminate. It is understood that if the belly section 314 already includes a belly liner (not shown) then it may not be necessary that the sewn in pad (not shown) to also include a fourth layer (not shown) made of water proof or water resistant material.

Still referring to FIG. 12, the hind section 316 of the canine garment 310 may include a pair of hind leg holes 336, and each of the hind leg holes 336 may be surrounded by stretch ribbing 338. The hind section 316 may also include a first fastening tab 340 and a second fastening tab 342 that are configured to operatively engage with each other in order to allow the canine garment 310 to be removably fastened to the canine wearer (not shown). The first fastening tab 340 and the second fastening tab 342 include fastening elements 344 that are each configured to removably secure the first fastening tab 340 and/or the second fastening tab 342 to the canine garment 310. The fastening elements 344 may be for example snaps. Likewise, the first neck tab 325 and the second neck tab 327 may also include fastening elements 344 that are positioned and configured to engage with fastening elements 344 positioned on either the corresponding neck tab or the front section 312, or both. The first fastening tab 340 may include a pass-through hole 346 that is configured to allow the second fastening tab 342 to be passed through the first fastening tab 340. It is understood that the pass-through hole 346 may also be positioned in the second fastening tab 342. Likewise, the first neck tab 325 or the second neck tab 327 may also include a pass-through hole 346. The pass-through hole 346 may be formed as a result of a hole in the material that forms the hind section 316 or the front section 312 and may include a grommet (not shown) or created as a result of button-hole stitching (not shown). The hind section 316 also includes a hind-quarters opening 348 positioned so that the canine wearer (not shown) may pass feces while wearing the canine garment 310 without staining or soiling the canine garment 310. The hindquarters opening 348 may be at least partially surrounded by an elastic 350 in order to permit a snug fit of the canine garment 310 on the canine wearer.

The canine garment 310 may be made from any suitable fabric, preferably a stretchable, form-fitting fabric, and even more preferably a fabric that is lightweight and breathable in order to ensure that the canine wearer (not shown) of the canine garment 310 remains cool in temperature. The canine garment 310 made from a suitable fabric allows the canine wearer to change positions in a comfortable manner without being restricted by the canine garment 310. For example, the canine garment 310 can be made from such fabrics as cotton knit, nylon, mesh and/or fleece. It is understood that the canine garment 310 may be made from any combination of suitable fabrics.

Figure 19B:
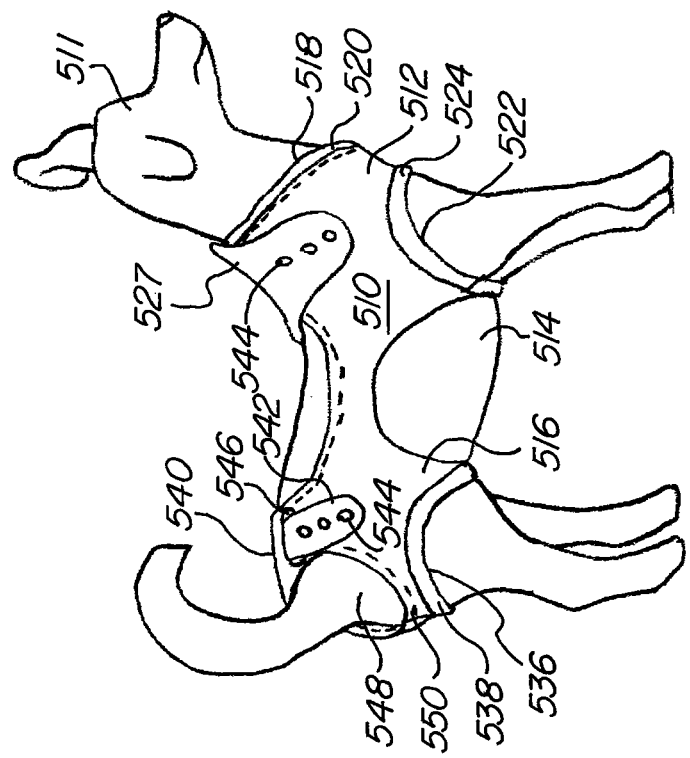
FIG. 19B is a right side view of a canine adorned with an exemplary canine garment according to the present invention.
Figure 19A:
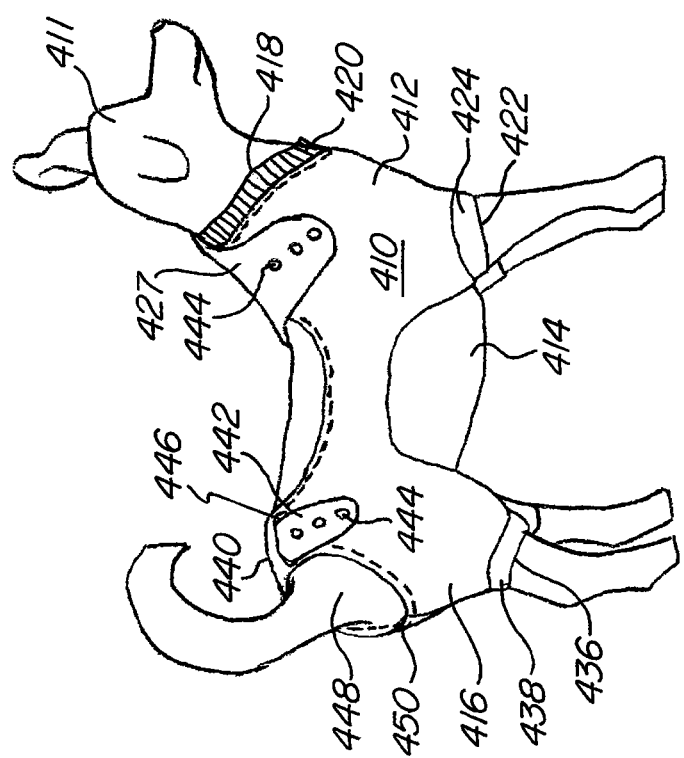
FIG. 19A is a right side view of a canine adorned with an exemplary canine garment according to the present invention.
Figure 32:
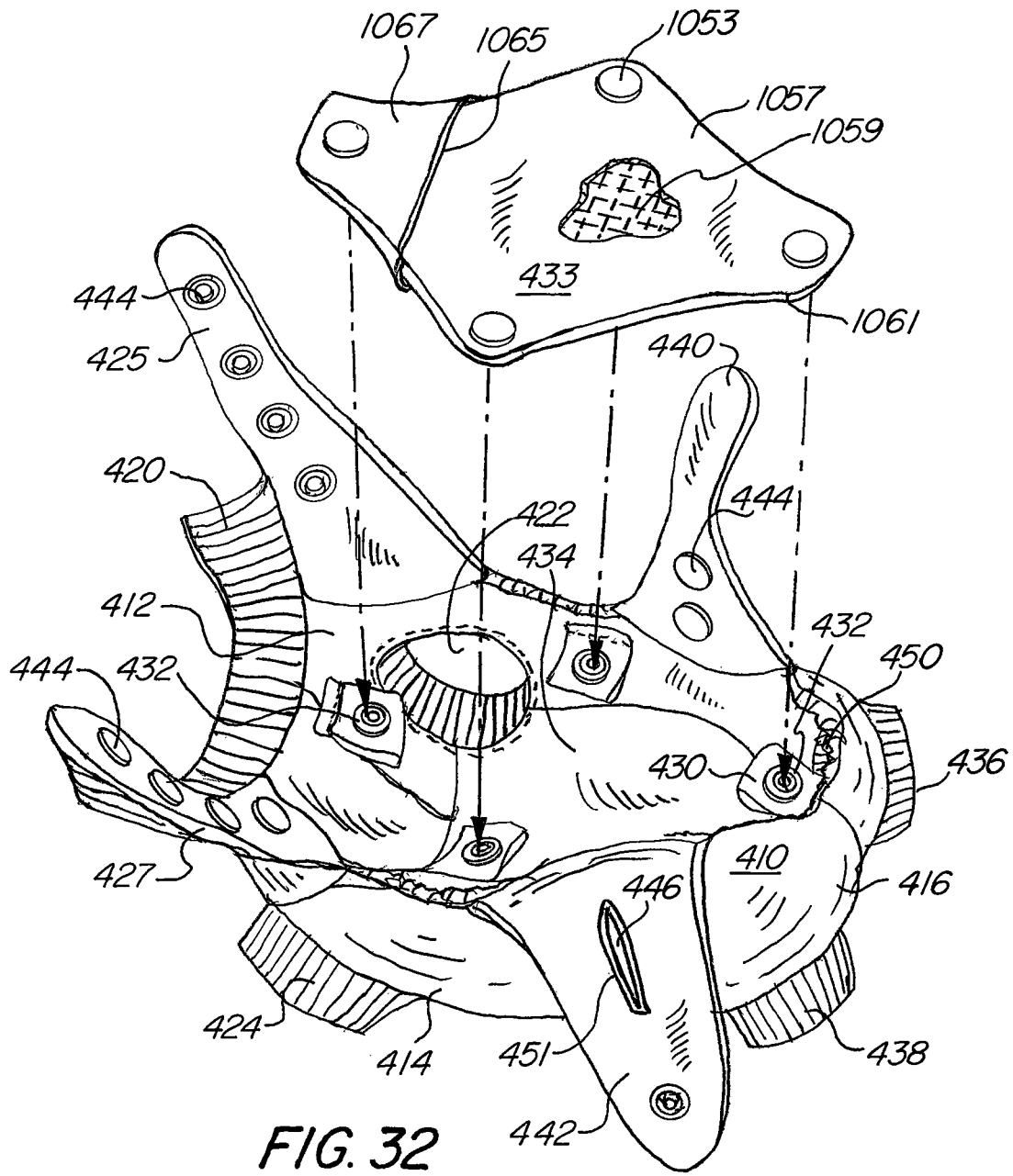
FIG. 32 is perspective view showing how an exemplary pad may be attached to an exemplary canine garment according to the present invention.

Referring now to FIGS. 19A and 32, which show another exemplary canine garment 410 according to the present invention. The canine garment 410 according to the present invention is generally directed to the containment and/or control of fluids that may be excreted, secreted and/or expelled from a canine wearer 411. The canine garment 410 may include a front section 412 designed to be secured around the neck and/or front legs of the canine wearer 411. The canine garment 410 may also include a belly section 414 attached to the front section 412 and designed to at least partially cover the underside of the canine wearer's 411 torso. Attached to the belly section 414 is a hind section 416 that is designed to be secured to the hind quarters of the canine wearer 411. It is understood that while the canine garment 410 is depicted as having the front section 412, the belly section 414 and the hind section 416 as being made from separate pieces of material, the canine garment 410 may have two or more of these components formed from the same piece of material.

Still referring to FIGS. 19A and 32, the front section 412 of the canine garment 410 may include a neck hole 418 that is configured and dimensioned to go around the canine wearer's 411 neck. The neck hole 418 may be surrounded by stretch ribbing 420 that allows the neck hole 418 to be expanded and contracted in order to meet the needs of placing the canine garment 410 on the canine wearer 411, and permit comfortable fit of the canine garment 410 on the canine wearer 411. The front section 412 may also include a pair of front leg holes 422, and each of the front leg holes 422 may be surrounded by stretch ribbing 424. Each of the front leg holes 422 is configured and dimensioned so that the front legs of the canine wearer 411 may be placed through the appropriate front leg hole 422, and the stretch ribbing 424 around each of the front leg holes 422 facilitates placing the canine garment 410 on the canine wearer 411, and permits comfortable fitment of the canine garment 410. The front section 412 of the canine garment 410 may also include a first neck tab 425 and a second neck tab 427 extending from the front section 412, and allowing the front section 412 to be wrapped around the neck of a canine wearer 411 in order to facilitate putting on and taking off of the canine garment 410 from the canine wearer 411.

Still referring to FIGS. 19A and 32, the belly section 414 of the canine garment 410 may include one or more tabs 430 positioned on the inside region, i.e. the region facing the canine wearer 411, of the canine garment 410, and each of the one or more tabs 430 may have a fastener 432, for example a snap fastener, positioned thereon. The one of more tabs 430 on the belly section 414 are positioned so as to allow a removable pad 433 to be removably secured to the canine garment 410. The belly section 414 may also include a belly liner 434 positioned on the interior side of the belly section 414 that will face towards the canine wearer 411. The belly liner 434 may be made from a suitable waterproof or water resistant material, such as polyurethane laminate. Exemplary embodiments of the removable pad, including but not limited to removable pad 433, that may be used with the exemplary embodiments of the canine garment according to the present invention will be discussed further below. It is understood that while the belly section 414 of the canine garment 410 may include one or more tabs 430 with fasteners 432 positioned thereon, it is also contemplated that the fasteners may be positioned directly on the belly section 414. Furthermore, it is also understood that instead of having the removable pad 433, a fixed pad (not shown) may be attached directly to the belly section 414 by sewing the fixed pad to the belly section 414 or by other appropriate attachment mechanisms. If the fixed pad (not shown) is attached to the belly section 414, the fixed pad may have substantially the same shape as the belly section 414 in order to create a cupped, well-like shape that prevents the canine fluids from flowing into other portions of the canine garment 410 and onto other surfaces that the canine wearer 411 may come into contact with. If the fixed pad (not shown) is attached to the belly section 414, it may have a number of layers, for example a top layer (not shown) positioned on the interior side of the belly section 414 that may be made from the same material as the belly section 414. The fixed pad (not shown) may also include a second layer (not shown) positioned between the first layer (not shown) and the belly section 414 made from a moisture wicking material, such as micro-fleece fabric, a third layer (not shown) positioned between the second layer (not shown) and the belly section 414 made from an absorbent material, such as a hybrid fabric made from bamboo, cotton, viscose and polymicrofibers. The fixed pad (not shown) may also include a fourth layer (not shown) positioned between the third layer (not shown) and the belly section 414 made of water proof or water resistant material, such as polyurethane laminate. It is understood that if the belly section 414 already includes a belly liner (not shown) then it may not be necessary that the sewn in pad (not shown) to also include a fourth layer (not shown) made of water proof or water resistant material.

Still referring to FIGS. 19A and 32, the hind section 416 of the canine garment 410 may include a pair of hind leg holes 436, and each of the hind leg holes 436 may be surrounded by stretch ribbing 438. The hind section 416 may also include a first fastening tab 440 and a second fastening tab 442 that are configured to operatively engage with each other in order to allow the canine garment 410 to be removably fastened to the canine wearer 411. The first fastening tab 440 and the second fastening tab 442 include fastening elements 444 that are each configured to removably secure the first fastening tab 440 and/or the second fastening tab 442 to the canine garment 410 and/or to each other. The fastening elements 444 may be for example snaps. Likewise, the first neck tab 425 and the second neck tab 427 may also include fastening elements 444 that are positioned and configured to engage with fastening elements 444 positioned on either the corresponding neck tab or the front section 412, or both. The first fastening tab 440 may include a pass-through hole 446 that is configured to allow the second fastening tab 442 to be passed through the first fastening tab 440. It is understood that the pass-through hole 446 may also be positioned in the second fastening tab 442, as shown for example in FIG. 32. Likewise, the first neck tab 425 or the second neck tab 427 may also include a pass-through hole (not shown). The hind section 416 also includes a hind-quarters opening 448 positioned so that the canine wearer 411 may pass feces while wearing the canine garment 410 without staining or soiling the canine garment 410. The hind-quarters opening 448 may be at least partially surrounded by an elastic 450 in order to permit a snug fit of the canine garment 410 on the canine wearer 411. Furthermore, the pass-through hole 446 positioned on either the first fastening tab 440, the second fastening tab 442, the first neck tab 425 and/or the second neck tab 427 may be formed as a result of a hole in the material that forms the hind section 416 or the front section 412 and may include a grommet (not shown) or created as a result of button-hole stitching 451.

The canine garment 410 may be made from any suitable fabric, preferably a stretchable, form-fitting fabric, and even more preferably a fabric that is lightweight and breathable in order to ensure that the canine wearer 411 of the canine garment 410 remains cool in temperature. The canine garment 410 made from a suitable fabric allows the canine wearer to change positions in a comfortable manner without being restricted by the canine garment 410. For example, the canine garment 410 can be made from such fabrics as cotton knit, nylon, mesh and/or fleece. It is understood that the canine garment 410 may be made from any combination of suitable fabrics.

Referring now to FIG. 19B, which shows another exemplary canine garment 510 according to the present invention. The canine garment 510 according to the present invention is generally directed to the containment and/or control of fluids that may be excreted, secreted and/or expelled from a canine wearer 511. The canine garment 510 may include a front section 512 designed to be secured around the neck and/or front legs of the canine wearer 511. The canine garment 510 may also include a belly section 514 attached to the front section 512 and designed to at least partially cover the underside of the canine wearer's 511 torso. Attached to the belly section 514 is a hind section 516 that is designed to be secured to the hind quarters of the canine wearer 511. It is understood that while the canine garment 510 is depicted as having the front section 512, the belly section 514 and the hind section 516 as being made from separate pieces of material, the canine garment 510 may have two or more of these components formed from the same piece of material.

Still referring to FIG. 19B, the front section 512 of the canine garment 510 may include a neck hole 518 that is configured and dimensioned to go around the canine wearer's 511 neck. The neck hole 518 may be surrounded by stretch ribbing 520 that allows the neck hole 518 to be expanded and contracted in order to meet the needs of placing the canine garment 510 on the canine wearer 511, and permit comfortable fit of the canine garment 510 on the canine wearer 511. The front section 512 may also include a pair of front leg holes 522, and each of the front leg holes 522 may be surrounded by stretch ribbing 524. Each of the front leg holes 522 is configured and dimensioned so that the front legs of the canine wearer 511 may be placed through the appropriate front leg hole 522, and the stretch ribbing 524 around each of the front leg holes 522 facilitates placing the canine garment 510 on the canine wearer 511, and permits comfortable fitment of the canine garment 510. The front section 512 of the canine garment 510 may also include a first neck tab (not shown) and a second neck tab 527 extending from the front section 512, and allowing the front section 512 to be wrapped around the neck of a canine wearer 511 in order to facilitate putting on and taking off of the canine garment 510 from the canine wearer 511.

Still referring to FIG. 19B, the belly section 514 of the canine garment 510 may include one or more tabs (not shown) positioned on the inside region, i.e. the region facing the canine wearer 511, of the canine garment 510, and each of the one or more tabs may have a fastener (not shown), for example a snap fastener, positioned thereon. The one of more tabs (not shown) on the belly section 514 are positioned so as to allow a removable pad (not shown) to be removably secured to the canine garment 510. The belly section 514 may also include a belly liner (not shown) positioned on the interior side of the belly section 514 that will face towards the canine wearer 511. The belly liner (not shown) may be made from a suitable waterproof or water resistant material, such as polyurethane laminate. Exemplary embodiments of the removable pad that may be used with the exemplary embodiments of the canine garment according to the present invention will be discussed further below. It is understood that while the belly section 514 of the canine garment 510 may include one or more tabs (not shown) with fasteners (not shown) positioned thereon, it is also contemplated that the fasteners may be positioned directly on the belly section 514. Furthermore, it is also understood that instead of having a removable pad (not shown), a pad may be attached directly to the belly section 514 by sewing the pad to the belly section 514 or by other appropriate attachment mechanisms. If the pad (not shown) is attached to the belly section 514, the pad may have substantially the same shape as the belly section 514 in order to create a cupped, well-like shape that prevents the canine fluids from flowing into other portions of the canine garment 510 and onto other surfaces that the canine wearer 511 may come into contact with. If the pad (not shown) is attached to the belly section 514, it may have a number of layers, for example a top layer (not shown) positioned on the interior side of the belly section 514 that may be made from the same material as the belly section 514. The sewn in pad (not shown) may also include a second layer (not shown) positioned between the first layer (not shown) and the belly section 514 made from a moisture wicking material, such as micro-fleece fabric, a third layer (not shown) positioned between the second layer (not shown) and the belly section 514 made from an absorbent material, such as a hybrid fabric made from bamboo, cotton, viscose and polymicrofibers. The sewn in pad (not shown) may also include a fourth layer (not shown) positioned between the third layer (not shown) and the belly section 514 made of water proof or water resistant material, such as polyurethane laminate. It is understood that if the belly section 514 already includes a belly liner (not shown) then it may not be necessary that the sewn in pad (not shown) to also include a fourth layer (not shown) made of water proof or water resistant material.

Still referring to FIG. 19B, the hind section 516 of the canine garment 510 may include a pair of hind leg holes 536, and each of the hind leg holes 536 may be surrounded by stretch ribbing 538. The hind section 516 may also include a first fastening tab 540 and a second fastening tab 542 that are configured to operatively engage with each other in order to allow the canine garment 510 to be removably fastened to the canine wearer 511. The first fastening tab 540 and the second fastening tab 542 include fastening elements 544 that are each configured to removably secure the first fastening tab 540 and/or the second fastening tab 542 to the canine garment 510. The fastening elements 544 may be for example snaps. Likewise, the first neck tab (not shown) and the second neck tab 527 may also include fastening elements 544 that are positioned and configured to engage with fastening elements 544 positioned on either the corresponding neck tab or the front section 512, or both. The first fastening tab 540 may include a pass-through hole 546 that is configured to allow the second fastening tab 542 to be passed through the first fastening tab 540. It is understood that the pass-through hole 546 may also be positioned in the second fastening tab 542. Likewise, the first neck tab (not shown) or the second neck tab 527 may also include a pass-through hole (not shown). The pass-through hole 546 may be formed as a result of a hole in the material that forms the hind section 516 or the front section 512 and may include a grommet (not shown) or created as a result of button-hole stitching (not shown). The hind section 516 also includes a hind-quarters opening 548 positioned so that the canine wearer 511 may pass feces while wearing the canine garment 510 without staining or soiling the canine garment 510. The hind-quarters opening 548 may be at least partially surrounded by an elastic 550 in order to permit a snug fit of the canine garment 510 on the canine wearer 511.

The canine garment 510 may be made from any suitable fabric, preferably a stretchable, form-fitting fabric, and even more preferably a fabric that is lightweight and breathable in order to ensure that the canine wearer 511 of the canine garment 510 remains cool in temperature. The canine garment 510 made from a suitable fabric allows the canine wearer to change positions in a comfortable manner without being restricted by the canine garment 510. For example, the canine garment 510 can be made from such fabrics as cotton knit, nylon, mesh and/or fleece. It is understood that the canine garment 510 may be made from any combination of suitable fabrics.

Referring now to FIG. 20C, which shows another exemplary canine garment 610 according to the present invention. The canine garment 610 according to the present invention is generally directed to the containment and/or control of fluids that may be excreted, secreted and/or expelled from a canine wearer 611. The canine garment 610 may include a front section 612 designed to be secured around the neck and/or front legs of the canine wearer 611. The canine garment 610 may also include a belly section 614 attached to the front section 612 and designed to at least partially cover the underside of the canine wearer's 611 torso. Attached to the belly section 614 is a hind section 616 that is designed to be secured to the hind quarters of the canine wearer 611. It is understood that while the canine garment 610 is depicted as having the front section 612, the belly section 614 and the hind section 616 as being made from separate pieces of material, the canine garment 610 may have two or more of these components formed from the same piece of material.

Still referring to FIG. 20C, the front section 612 of the canine garment 610 may include a neck hole 618 that is configured and dimensioned to go around the canine wearer's 611 neck. The neck hole 618 may be surrounded by an elastic 619 that allows the neck hole 618 to be expanded and contracted in order to meet the needs of placing the canine garment 610 on the canine wearer 611, and permit comfortable fit of the canine garment 610 on the canine wearer 611. The front section 612 may further include a bifurcated collar 621 positioned on either side of the neck hole 618 and extending from the front section 612. The front section 612 may also include a pair of front leg holes 622, and each of the front leg holes 622 may be surrounded by stretch ribbing 624. Each of the front leg holes 622 is configured and dimensioned so that the front legs of the canine wearer 611 may be placed through the appropriate front leg hole 622, and the stretch ribbing 624 around each of the front leg holes 622 facilitates placing the canine garment 610 on the canine wearer 611, and permits comfortable fitment of the canine garment 610. The front section 612 of the canine garment 610 may also include a first neck tab 625 and a second neck tab 627 extending from the front section 612, and allowing the front section 612 to be wrapped around the neck of a canine wearer 611 in order to facilitate putting on and taking off of the canine garment 610 from the canine wearer 611.

Still referring to FIG. 20C, the belly section 614 of the canine garment 610 may include one or more tabs (not shown) positioned on the inside region, i.e. the region facing the canine wearer 611, of the canine garment 610, and each of the one or more tabs may have a fastener (not shown), for example a snap fastener, positioned thereon. The one or more tabs (not shown) on the belly section 614 are positioned so as to allow a removable pad (not shown) to be removably secured to the canine garment 610. The belly section 614 may also include a belly liner (not shown) positioned on the interior side of the belly section 614 that will face towards the canine wearer 611. The belly liner (not shown) may be made from a suitable waterproof or water resistant material, such as polyurethane laminate. Exemplary embodiments of the removable pad that may be used with the exemplary embodiments of the canine garment according to the present invention will be discussed further below. It is understood that while the belly section 614 of the canine garment 610 may include one or more tabs (not shown) with fasteners (not shown) positioned thereon, it is also contemplated that the fasteners may be positioned directly on the belly section 614. Furthermore, it is also understood that instead of having a removable pad (not shown), a pad may be attached directly to the belly section 614 by sewing the pad to the belly section 614 or by other appropriate attachment mechanisms. If the pad (not shown) is attached to the belly section 614, the pad may have substantially the same shape as the belly section 614 in order to create a cupped, well-like shape that prevents the canine fluids from flowing into other portions of the canine garment 610 and onto other surfaces that the canine wearer 611 may come into contact with. If the pad (not shown) is attached to the belly section 614, it may have a number of layers, for example a top layer (not shown) positioned on the interior side of the belly section 614 that may be made from the same material as the belly section 614. The sewn in pad (not shown) may also include a second layer (not shown) positioned between the first layer (not shown) and the belly section 614 made from a moisture wicking material, such as micro-fleece fabric, a third layer (not shown) positioned between the second layer (not shown) and the belly section 614 made from an absorbent material, such as a hybrid fabric made from bamboo, cotton, viscose and polymicrofibers. The sewn in pad (not shown) may also include a fourth layer (not shown) positioned between the third layer (not shown) and the belly section 614 made of water proof or water resistant material, such as polyurethane laminate. It is understood that if the belly section 614 already includes a belly liner (not shown) then it may not be necessary that the sewn in pad (not shown) to also include a fourth layer (not shown) made of water proof or water resistant material.

Still referring to FIG. 20C, the hind section 616 of the canine garment 610 may include a pair of hind leg holes 636, and each of the hind leg holes 636 may be surrounded by stretch ribbing 638. The hind section 616 may also include a first fastening tab 640 and a second fastening tab 642 that are configured to operatively engage with each other in order to allow the canine garment 610 to be removably fastened to the canine wearer 611. The first fastening tab 640 and/or the second fastening tab 642 may include fastening elements 644 that are each configured to removably secure the first fastening tab 640 and/or the second fastening tab 642 to the canine garment 610 and/or each other. The fastening elements 644 may be for example snaps. The first fastening tab 640 may include a pass-through hole 646 that is configured to allow the second fastening tab 642 to be passed through the first fastening tab 640. It is understood that the pass-through hole 646 may also be positioned in the second fastening tab 642. Likewise, the first neck tab 625 or the second neck tab 627 may also include a pass-through hole 646. The pass-through hole 646 may be formed as a result of a hole in the material that forms the hind section 616 or the front section 612 and may include a grommet 647 or created as a result of button-hole stitching (not shown). The hind section 616 also includes a hind-quarters opening 648 positioned so that the canine wearer 611 may pass feces while wearing the canine garment 610 without staining or soiling the canine garment 610. The hind-quarters opening 648 may be at least partially surrounded by an elastic 650 in order to permit a snug fit of the canine garment 610 on the canine wearer 611.

The canine garment 610 may be made from any suitable fabric, preferably a stretchable, form-fitting fabric, and even more preferably a fabric that is lightweight and breathable in order to ensure that the canine wearer 611 of the canine garment 610 remains cool in temperature. The canine garment 610 made from a suitable fabric allows the canine wearer to change positions in a comfortable manner without being restricted by the canine garment 610. For example, the canine garment 610 can be made from such fabrics as cotton knit, nylon, mesh and/or fleece. It is understood that the canine garment 610 may be made from any combination of suitable fabrics.

Figure 28:
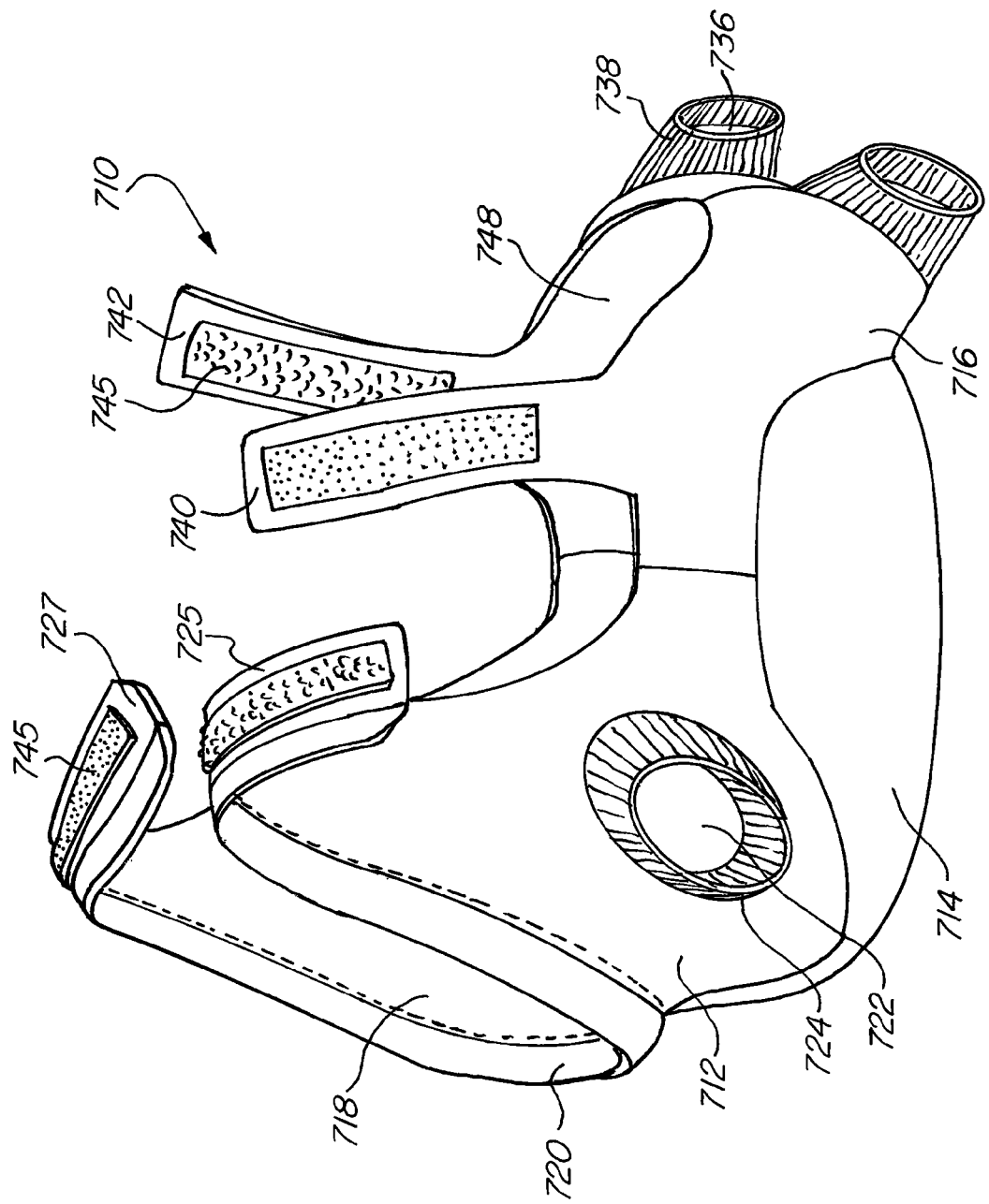
FIG. 28 is a left side view of an exemplary canine garment according to the present invention.

Referring now to FIG. 28, which shows another exemplary canine garment 710 according to the present invention. The canine garment 710 according to the present invention is generally directed to the containment and/or control of fluids that may be excreted, secreted and/or expelled from a canine wearer (not shown). The canine garment 710 may include a front section 712 designed to be secured around the neck and/or front legs of the canine wearer (not shown). The canine garment 710 may also include a belly section 714 attached to the front section 712 and designed to at least partially cover the underside of the canine wearer's (not shown) torso. Attached to the belly section 714 is a hind section 716 that is designed to be secured to the hind quarters of the canine wearer (not shown). It is understood that while the canine garment 710 is depicted as having the front section 712, the belly section 714 and the hind section 716 as being made from separate pieces of material, the canine garment 710 may have two or more of these components formed from the same piece of material.

Still referring to FIG. 28, the front section 712 of the canine garment 710 may include a neck hole 718 that is configured and dimensioned to go around the canine wearer's (not shown) neck. The neck hole 718 may be surrounded by stretch ribbing 720 that allows the neck hole 718 to be expanded and contracted in order to meet the needs of placing the canine garment 710 on the canine wearer, and permit comfortable fit of the canine garment 710 on the canine wearer (not shown). The front section 712 may also include a pair of front leg holes 722, and each of the front leg holes 722 may be surrounded by stretch ribbing 724. Each of the front leg holes 722 is configured and dimensioned so that the front legs of the canine wearer (not shown) may be placed through the appropriate front leg hole 722, and the stretch ribbing 724 around each of the front leg holes 722 facilitates placing the canine garment 710 on the canine wearer, and permits comfortable fitment of the canine garment 710. The front section 712 of the canine garment 710 may also include a first neck tab 725 and a second neck tab 727 extending from the front section 712, and allowing the front section 712 to be wrapped around the neck of a canine wearer (not shown) in order to facilitate putting on and taking off of the canine garment 710 from the canine wearer.

Still referring to FIG. 28, the belly section 714 of the canine garment 710 may include one or more tabs (not shown) positioned on the inside region, i.e. the region facing the canine wearer (not shown), of the canine garment 710, and each of the one or more tabs may have a fastener (not shown), for example a snap fastener, positioned thereon. The one of more tabs (not shown) on the belly section 714 are positioned so as to allow a removable pad (not shown) to be removably secured to the canine garment 710. The belly section 714 may also include a belly liner (not shown) positioned on the interior side of the belly section 714 that will face towards the canine wearer. The belly liner (not shown) may be made from a suitable waterproof or water resistant material, such as polyurethane laminate. Exemplary embodiments of the removable pad that may be used with the exemplary embodiments of the canine garment according to the present invention will be discussed further below. It is understood that while the belly section 714 of the canine garment 710 may include one or more tabs (not shown) with fasteners (not shown) positioned thereon, it is also contemplated that the fasteners may be positioned directly on the belly section 714. Furthermore, it is also understood that instead of having a removable pad (not shown), a pad may be attached directly to the belly section 714 by sewing the pad to the belly section 714 or by other appropriate attachment mechanisms. If the pad (not shown) is attached to the belly section 714, the pad may have substantially the same shape as the belly section 714 in order to create a cupped, well-like shape that prevents the canine fluids from flowing into other portions of the canine garment 710 and onto other surfaces that the canine wearer (not shown) may come into contact with. If the pad (not shown) is attached to the belly section 714, it may have a number of layers, for example a top layer (not shown) positioned on the interior side of the belly section 714 that may be made from the same material as the belly section 714. The sewn in pad (not shown) may also include a second layer (not shown) positioned between the first layer (not shown) and the belly section 714 made from a moisture wicking material, such as micro-fleece fabric, a third layer (not shown) positioned between the second layer (not shown) and the belly section 714 made from an absorbent material, such as a hybrid fabric made from bamboo, cotton, viscose and polymicrofibers. The sewn in pad (not shown) may also include a fourth layer (not shown) positioned between the third layer (not shown) and the belly section 714 made of water proof or water resistant material, such as polyurethane laminate. It is understood that if the belly section 714 already includes a belly liner (not shown) then it may not be necessary that the sewn in pad (not shown) to also include a fourth layer (not shown) made of water proof or water resistant material.

Still referring to FIG. 28, the hind section 716 of the canine garment 710 may include a pair of hind leg holes 736, and each of the hind leg holes 736 may be surrounded by stretch ribbing 738. The hind section 716 may also include a first fastening tab 740 and a second fastening tab 742 that are configured to operatively engage with each other in order to allow the canine garment 710 to be removably fastened to the canine wearer (not shown). The first fastening tab 740 and the second fastening tab 742 include fastening elements 745 that are each configured to removably secure the first fastening tab 740 and/or the second fastening tab 742 to the canine garment 710 and/or to each other. The fastening elements 745 may be for example hook-and-loop fasteners. Likewise, the first neck tab 725 and the second neck tab 727 may also include fastening elements 747 that are positioned and configured to engage with fastening elements 744 positioned on either the corresponding neck tab or the front section 712, or both. The hind section 716 also includes a hind-quarters opening 748 positioned so that the canine wearer (not shown) may pass feces while wearing the canine garment 710 without staining or soiling the canine garment 710. The hind-quarters opening 748 may be at least partially surrounded by an elastic (not shown) in order to permit a snug fit of the canine garment 710 on the canine wearer.

The canine garment 710 may be made from any suitable fabric, preferably a stretchable, form-fitting fabric, and even more preferably a fabric that is lightweight and breathable in order to ensure that the canine wearer (not shown) of the canine garment 710 remains cool in temperature. The canine garment 710 made from a suitable fabric allows the canine wearer to change positions in a comfortable manner without being restricted by the canine garment 710. For example, the canine garment 710 can be made from such fabrics as cotton knit, nylon, mesh and/or fleece. It is understood that the canine garment 710 may be made from any combination of suitable fabrics.

Figure 29:
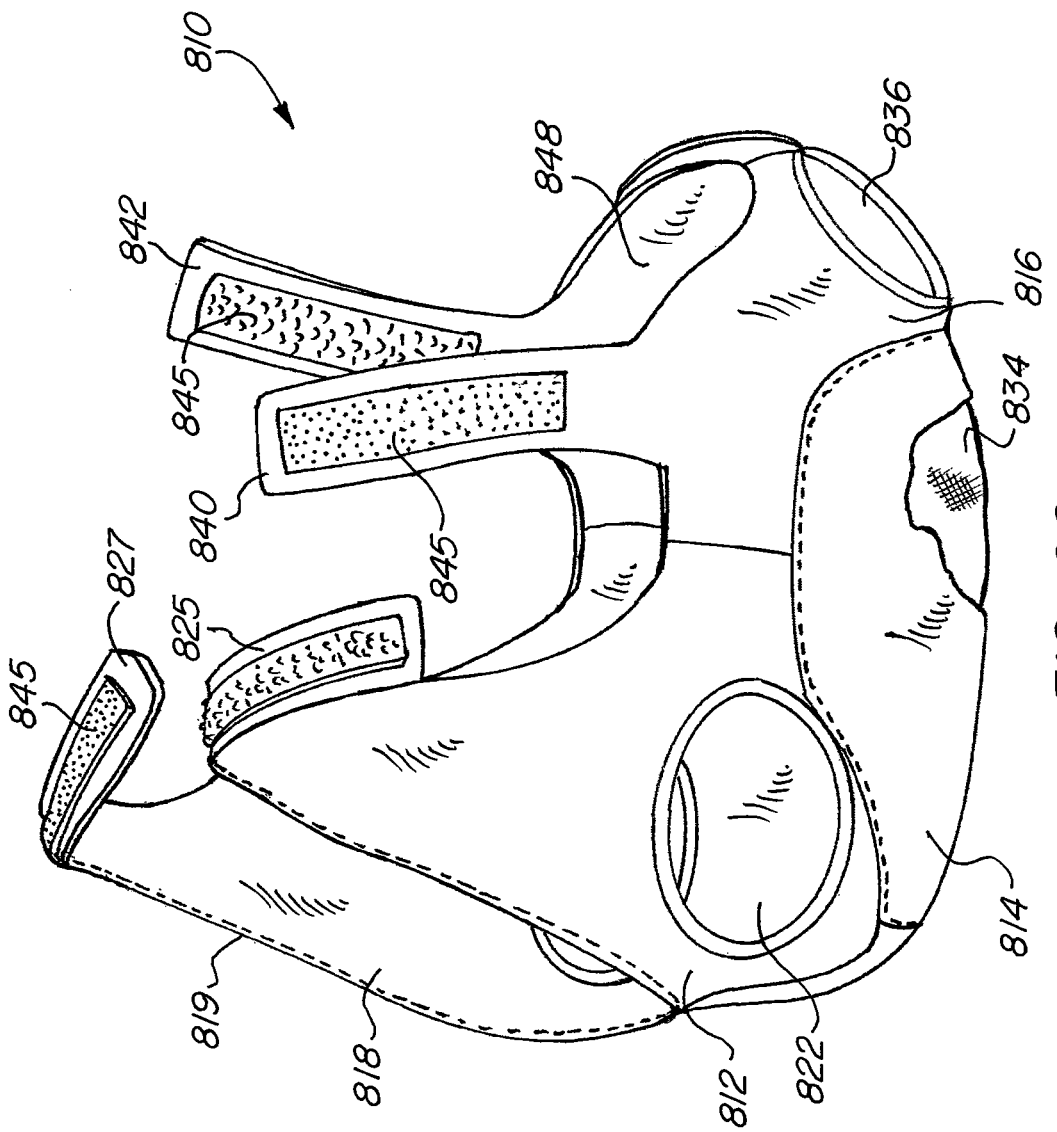
FIG. 29 is a left side view of an exemplary canine garment according to the present invention.

Referring now to FIG. 29, which shows another exemplary canine garment 810 according to the present invention. The canine garment 810 according to the present invention is generally directed to the containment and/or control of fluids that may be excreted, secreted and/or expelled from a canine wearer (not shown). The canine garment 810 may include a front section 812 designed to be secured around the neck and/or front legs of the canine wearer (not shown). The canine garment 810 may also include a belly section 814 attached to the front section 812 and designed to at least partially cover the underside of the canine wearer's (not shown) torso. Attached to the belly section 814 is a hind section 816 that is designed to be secured to the hind quarters of the canine wearer (not shown). It is understood that while the canine garment 810 is depicted as having the front section 812, the belly section 814 and the hind section 816 as being made from separate pieces of material, the canine garment 810 may have two or more of these components formed from the same piece of material.

Still referring to FIG. 29, the front section 812 of the canine garment 810 may include a neck hole 818 that is configured and dimensioned to go around the canine wearer's (not shown) neck. The neck hole 818 may be surrounded by an elastic 819 that allows the neck hole 818 to be expanded and contracted in order to meet the needs of placing the canine garment 810 on the canine wearer (not shown), and permit comfortable fit of the canine garment 810 on the canine wearer (not shown). The front section 812 may also include a pair of front leg holes 822. Each of the front leg holes 822 is configured and dimensioned so that the front legs of the canine wearer (not shown) may be placed through the appropriate front leg hole 822. The front section 812 of the canine garment 810 may also include a first neck tab 825 and a second neck tab 827 extending from the front section 812, and allowing the front section 812 to be wrapped around the neck of a canine wearer (not shown) in order to facilitate putting on and taking off of the canine garment 810 from the canine wearer.

Still referring to FIG. 29, the belly section 814 of the canine garment 810 may include one or more tabs (not shown) positioned on the inside region, i.e. the region facing the canine wearer (not shown), of the canine garment 810, and each of the one or more tabs may have a fastener (not shown), for example a snap fastener, positioned thereon. The one of more tabs (not shown) on the belly section 814 are positioned so as to allow a removable pad (not shown) to be removably secured to the canine garment 810. The belly section 814 may also include a belly liner 834 positioned on the interior side of the belly section 814 that will face towards the canine wearer. The belly liner 834 may be made from a suitable waterproof or water resistant material, such as polyurethane laminate. Exemplary embodiments of the removable pad that may be used with the exemplary embodiments of the canine garment according to the present invention will be discussed further below. It is understood that while the belly section 814 of the canine garment 810 may include one or more tabs (not shown) with fasteners (not shown) positioned thereon, it is also contemplated that the fasteners may be positioned directly on the belly section 814. Furthermore, it is also understood that instead of having a removable pad (not shown), a pad may be attached directly to the belly section 814 by sewing the pad to the belly section 814 or by other appropriate attachment mechanisms. If the pad (not shown) is attached to the belly section 814, the pad may have substantially the same shape as the belly section 814 in order to create a cupped, well-like shape that prevents the canine fluids from flowing into other portions of the canine garment 810 and onto other surfaces that the canine wearer (not shown) may come into contact with. If the pad (not shown) is attached to the belly section 814, it may have a number of layers, for example a top layer (not shown) positioned on the interior side of the belly section 814 that may be made from the same material as the belly section 814. The sewn in pad (not shown) may also include a second layer (not shown) positioned between the first layer (not shown) and the belly section 814 made from a moisture wicking material, such as micro-fleece fabric, a third layer (not shown) positioned between the second layer (not shown) and the belly section 814 made from an absorbent material, such as a hybrid fabric made from bamboo, cotton, viscose and polymicrofibers. The sewn in pad (not shown) may also include a fourth layer (not shown) positioned between the third layer (not shown) and the belly section 814 made of water proof or water resistant material, such as polyurethane laminate. It is understood that if the belly section 814 already includes a belly liner 834 then it may not be necessary that the sewn in pad (not shown) to also include a fourth layer (not shown) made of water proof or water resistant material.

Still referring to FIG. 29, the hind section 816 of the canine garment 810 may include a pair of hind leg holes 836. The hind section 816 may also include a first fastening tab 840 and a second fastening tab 842 that are configured to operatively engage with each other in order to allow the canine garment 810 to be removably fastened to the canine wearer (not shown). The first fastening tab 840 and the second fastening tab 842 include fastening elements 845 that are each configured to removably secure the first fastening tab 840 and/or the second fastening tab 842 to the canine garment 810 and/or to each other. The fastening elements 845 may be for example hook-and-loop fasteners. Likewise, the first neck tab 825 and the second neck tab 827 may also include fastening elements 844 that are positioned and configured to engage with fastening elements 844 positioned on either the corresponding neck tab or the front section 812, or both. The hind section 816 also includes a hind-quarters opening 848 positioned so that the canine wearer (not shown) may pass feces while wearing the canine garment 810 without staining or soiling the canine garment 810. The hind-quarters opening 848 may be at least partially surrounded by an elastic (not shown) in order to permit a snug fit of the canine garment 810 on the canine wearer.

The canine garment 810 may be made from any suitable fabric, preferably a stretchable, form-fitting fabric, and even more preferably a fabric that is lightweight and breathable in order to ensure that the canine wearer (not shown) of the canine garment 810 remains cool in temperature. The canine garment 810 made from a suitable fabric allows the canine wearer to change positions in a comfortable manner without being restricted by the canine garment 810. For example, the canine garment 810 can be made from such fabrics as cotton knit, nylon, mesh and/or fleece. It is understood that the canine garment 810 may be made from any combination of suitable fabrics.

Figure 30:
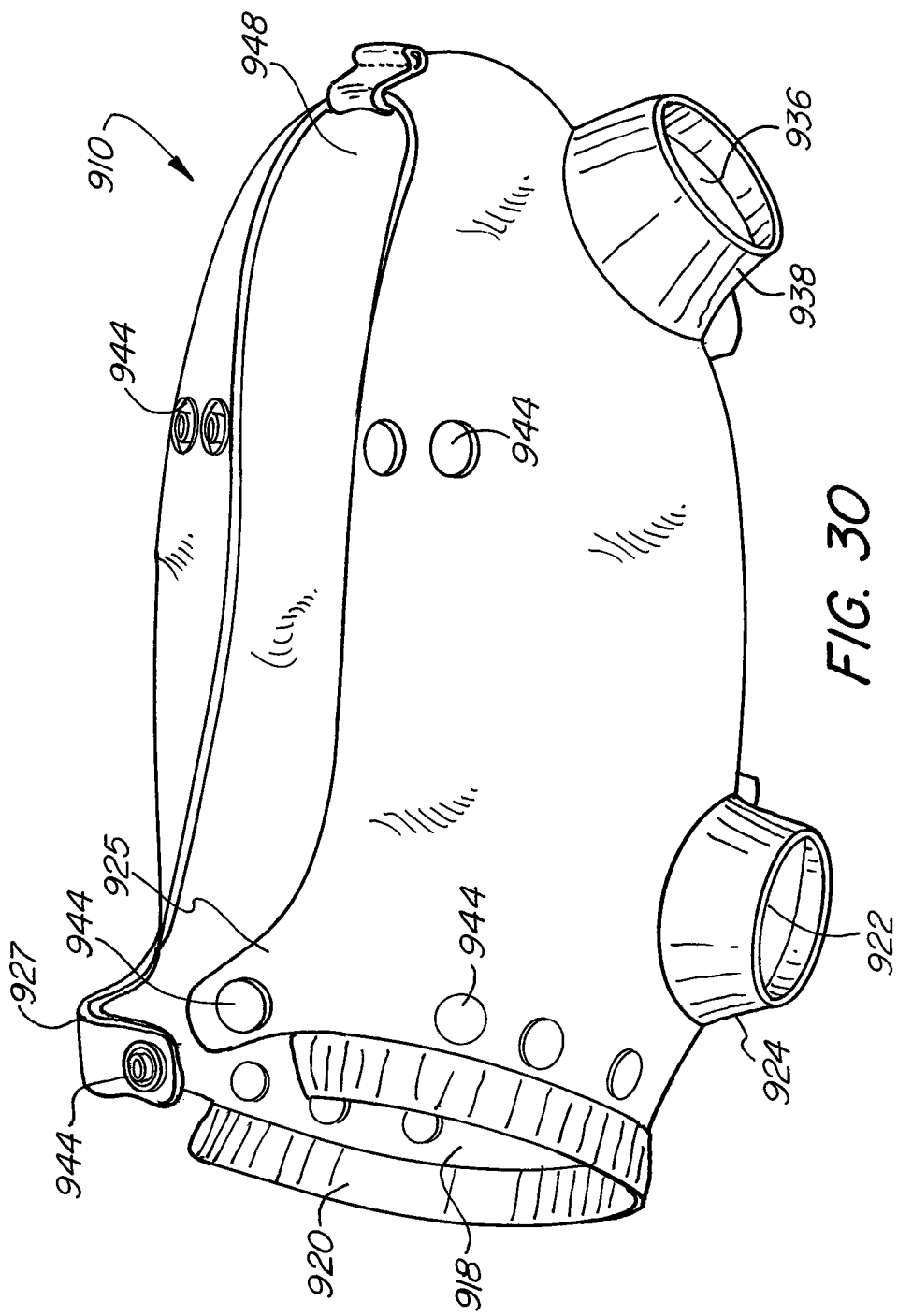
FIG. 30 is a left side view of an exemplary canine garment according to the present invention.

Referring now to FIG. 30, which shows another exemplary canine garment 910 according to the present invention. The canine garment 910 according to the present invention is generally directed to the containment and/or control of fluids that may be excreted, secreted and/or expelled from a canine wearer (not shown). The canine garment 910 may include a neck hole 918 that is configured and dimensioned to go around the canine wearer's (not shown) neck. The neck hole 918 may be surrounded by stretch ribbing 920 that allows the neck hole 918 to be expanded and contracted in order to meet the needs of placing the canine garment 910 on the canine wearer (not shown), and permit comfortable fit of the canine garment 910 on the canine wearer (not shown). The canine garment 910 may also include a pair of front leg holes 922. Each of the front leg holes 922 is configured and dimensioned so that the front legs of the canine wearer (not shown) may be placed through the appropriate front leg hole 922. Each of the front leg holes 922 may be surrounded by stretch ribbing 924 in order to permit expansion and contraction of the front leg holes 922 and facilitate in proper fitment of the canine garment 910 on the canine wearer (not shown). The canine garment 910 may also include a first neck tab 925 and a second neck tab 927 extending from the front portion of the canine garment 910 adjacent to the neck hole 918, and allowing the front portion of the canine garment 910 to be wrapped around the neck of a canine wearer (not shown) in order to facilitate putting on and taking off of the canine garment 910 from the canine wearer.

Still referring to FIG. 30, the interior region of the canine garment 910 may include one or more tabs (not shown) positioned thereon, of the canine garment 910, and each of the one or more tabs may have a fastener (not shown), for example a snap fastener, positioned thereon. The one of more tabs (not shown) are positioned so as to allow a removable pad (not shown) to be removably secured to the canine garment 910. The interior region of the canine garment 910 may also include a belly liner (not shown) positioned thereon. The belly liner may be made from a suitable waterproof or water resistant material, such as polyurethane laminate. Exemplary embodiments of the removable pad that may be used with the exemplary embodiments of the canine garment according to the present invention will be discussed further below. It is understood that while the interior region of the canine garment 910 may include one or more tabs (not shown) with fasteners (not shown) positioned thereon, it is also contemplated that the fasteners may be positioned directly on the canine garment 910. Furthermore, it is also understood that instead of having a removable pad (not shown), a pad may be attached directly to the canine garment 910. If the pad (not shown) is attached to the canine garment 910, the pad may have a substantially cupped, well-like shape that prevents the canine fluids from flowing into other portions of the canine garment 910 and onto other surfaces that the canine wearer (not shown) may come into contact with. If the pad (not shown) is attached to the canine garment 910, it may have a number of layers, for example a top layer (not shown) positioned on the interior side of the canine garment 910 that may be made from the same material as the canine garment 910. The sewn in pad (not shown) may also include a second layer (not shown) positioned between the first layer (not shown) and the canine garment 910 made from a moisture wicking material, such as micro-fleece fabric, a third layer (not shown) positioned between the second layer (not shown) and the canine garment made from an absorbent material, such as a hybrid fabric made from bamboo, cotton, viscose and polymicrofibers. The sewn in pad (not shown) may also include a fourth layer (not shown) positioned between the third layer (not shown) and the canine garment made of water proof or water resistant material, such as polyurethane laminate. It is understood that if the canine garment 910 already includes a belly liner (not shown) then it may not be necessary that the sewn in pad (not shown) to also include a fourth layer (not shown) made of water proof or water resistant material.

Still referring to FIG. 30, the canine garment 910 may also include a pair of hind leg holes 936. Each of the hind leg holes 936 may be surrounded by stretch ribbing 938. The canine garment 910 may also include one or more fastening elements 944 that are each configured to removably secure one side of the canine garment 910 to the other side of the canine garment 910 after the canine garment 910 has been placed on a canine wearer (not shown) in order to secure the canine garment 910 to the canine wearer. The fastening elements 944 may be for example snaps. Likewise, the first neck tab 925 and the second neck tab 927 may also include fastening elements 944 that are positioned and configured to engage with fastening elements 944 positioned on either the corresponding neck tab or the canine garment 910, or both. The canine garment 910 may also include a hind-quarters opening 948 positioned so that the canine wearer (not shown) may pass feces while wearing the canine garment 910 without staining or soiling the canine garment 910. The hind-quarters opening 948 may be at least partially surrounded by an elastic (not shown) in order to permit a snug fit of the canine garment 910 on the canine wearer.

The canine garment 910 may be made from any suitable fabric, preferably a stretchable, form-fitting fabric, and even more preferably a fabric that is lightweight and breathable in order to ensure that the canine wearer (not shown) of the canine garment 910 remains cool in temperature. The canine garment 910 made from a suitable fabric allows the canine wearer to change positions in a comfortable manner without being restricted by the canine garment 910. For example, the canine garment 910 can be made from such fabrics as cotton knit, nylon, mesh and/or fleece. It is understood that the canine garment 910 may be made from any combination of suitable fabrics.

Figure 31:
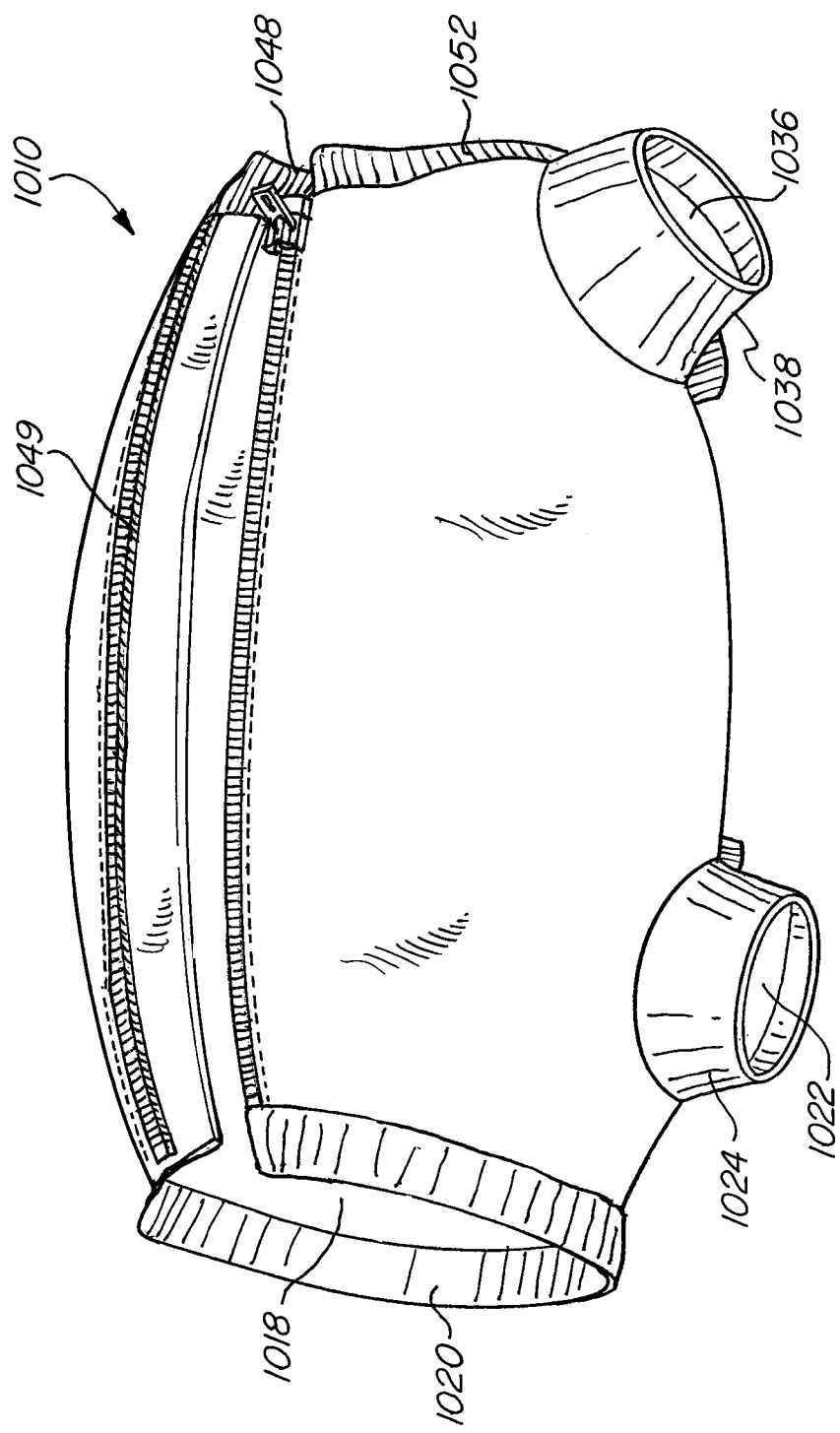
FIG. 31 is a left side view of an exemplary canine garment according to the present invention.

Referring now to FIG. 31, which shows another exemplary canine garment 1010 according to the present invention. The canine garment 1010 according to the present invention is generally directed to the containment and/or control of fluids that may be excreted, secreted and/or expelled from a canine wearer (not shown). The canine garment 1010 may include a neck hole 1018 that is configured and dimensioned to go around the canine wearer's (not shown) neck. The neck hole 1018 may be surrounded by stretch ribbing 1020 that allows the neck hole 1018 to be expanded and contracted in order to meet the needs of placing the canine garment 1010 on the canine wearer (not shown), and permit comfortable fit of the canine garment 1010 on the canine wearer (not shown). The canine garment 1010 may also include a pair of front leg holes 1022. Each of the front leg holes 1022 is configured and dimensioned so that the front legs of the canine wearer (not shown) may be placed through the appropriate front leg hole 1022. Each of the front leg holes 1022 may be surrounded by stretch ribbing 1024 in order to permit expansion and contraction of the front leg holes 1022 and facilitate in proper fitment of the canine garment 1010 on the canine wearer (not shown).

Still referring to FIG. 31, the interior region of the canine garment 1010 may include one or more tabs (not shown) positioned thereon, of the canine garment 1010, and each of the one or more tabs may have a fastener (not shown), for example a snap fastener, positioned thereon. The one of more tabs (not shown) are positioned so as to allow a removable pad (not shown) to be removably secured to the canine garment 1010. The interior region of the canine garment 1010 may also include a belly liner (not shown) positioned thereon. The belly liner may be made from a suitable waterproof or water resistant material, such as polyurethane laminate. Exemplary embodiments of the removable pad that may be used with the exemplary embodiments of the canine garment according to the present invention will be discussed further below. It is understood that while the interior region of the canine garment 1010 may include one or more tabs (not shown) with fasteners (not shown) positioned thereon, it is also contemplated that the fasteners may be positioned directly on the canine garment 1010. Furthermore, it is also understood that instead of having a removable pad (not shown), a pad may be attached directly to the canine garment 1010. If the pad (not shown) is attached to the canine garment 1010, the pad may have a substantially cupped, well-like shape that prevents the canine fluids from flowing into other portions of the canine garment 1010 and onto other surfaces that the canine wearer (not shown) may come into contact with. If the pad (not shown) is attached to the canine garment 1010, it may have a number of layers, for example a top layer (not shown) positioned on the interior side of the canine garment 1010 that may be made from the same material as the canine garment 1010. The sewn in pad (not shown) may also include a second layer (not shown) positioned between the first layer (not shown) and the canine garment 1010 made from a moisture wicking material, such as micro-fleece fabric, a third layer (not shown) positioned between the second layer (not shown) and the canine garment made from an absorbent material, such as a hybrid fabric made from bamboo, cotton, viscose and polymicrofibers. The sewn in pad (not shown) may also include a fourth layer (not shown) positioned between the third layer (not shown) and the canine garment made of water proof or water resistant material, such as polyurethane laminate. It is understood that if the canine garment 1010 already includes a belly liner (not shown) then it may not be necessary that the sewn in pad (not shown) to also include a fourth layer (not shown) made of water proof or water resistant material.

Still referring to FIG. 31, the canine garment 1010 may also include a pair of hind leg holes 1036. Each of the hind leg holes 1036 may be surrounded by stretch ribbing 1038. The canine garment 1010 may also include a fastening device 1049, for example a zipper or zipper-like device, running at least partially along the back of the canine garment 1010 in order to permit securing one side of the canine garment 1010 to the other side. The fastening device 1049 permits removal of the canine garment 1010 from the canine wearer (not shown). The canine garment 1010 may also include a hindquarters opening 1048 positioned so that the canine wearer (not shown) may pass feces while wearing the canine garment 1010 without staining or soiling the canine garment 1010. The hind-quarters opening 1048 may be at least partially surrounded by stretch ribbing 1052 in order to permit a snug fit of the canine garment 1010 on the canine wearer.

The canine garment 1010 may be made from any suitable fabric, preferably a stretchable, form-fitting fabric, and even more preferably a fabric that is lightweight and breathable in order to ensure that the canine wearer (not shown) of the canine garment 1010 remains cool in temperature. The canine garment 1010 made from a suitable fabric allows the canine wearer to change positions in a comfortable manner without being restricted by the canine garment 1010. For example, the canine garment 1010 can be made from such fabrics as cotton knit, nylon, mesh and/or fleece. It is understood that the canine garment 1010 may be made from any combination of suitable fabrics.

As mentioned above, each of the various exemplary embodiments of the canine garment discussed above according to the present invention is configured for use with a removable and/or fixed pad that is configured to assist in the containment and/or control of canine fluids from a canine wearer. The various exemplary embodiments of the pads that may be used with the various exemplary embodiments of the canine garment will now be discussed in greater detail below.

Referring now to FIGS. 32, 33A and 33B, therein illustrated is an exemplary embodiment of a removable pad, generally indicated by the numeral 433, according to the present invention that is configured for use with the various exemplary embodiments of the canine garments according to the present invention that were previously discussed. The removable pad 433 includes one or more fastening elements 1053 that are configured to allow removable attachment of the removable pad 433 to an exemplary canine garment. As shown for example in FIG. 32, the one or more fastening elements 1053 are positioned on the removable pad 433 so as to be substantially aligned with the appropriate corresponding fastening elements 432 positioned on the canine garment 410. When oriented in the position in which the removable pad 433 will be installed in the canine garment 410, the removable pad 433 has a substantially diamond shape, which promotes the formation of a cup-like, well configuration of the removable pad 433 when installed in the canine garment 410 and worn by a canine wearer (not shown). This is as a result of the corners 1055 on which the one or more fastening elements 1053 have been positioned being raised up relative to the rest of the removable pad 433 when the removable pad 433 is in use in the canine garment 410.

Still referring to FIGS. 32, 33A and 33A, the removable pad 433 may include a first layer 1057 that is configured to be positioned closest to the canine wearer (not shown) when the removable pad 433 is installed on a canine garment. The first layer 1057 may preferably be made at least partially from a moisture wicking material, for example a micro-fleece fabric, but it is understood that any suitable material may be used for the first layer 1057. Preferably the material used for the first layer 1057 should be stretchable in at least one direction, and even more preferably stretchable in two directions. The removable pad 433 may also include a second layer 1059 positioned underneath the first layer 1057, and preferably made from an absorbent material, such as a hybrid fabric made from bamboo, cotton, viscose and polymicrofibers. The removable pad 433 may also include a third layer 1061 positioned underneath the first layer 1057, and oriented so that the second layer 1059 is at least partially surrounded by both the first layer 1057 and the third layer 1061. Preferably, the third layer 1061 should be made from a water resistant and/or water proof material, such as a polyurethane laminate. Preferably the material used for the third layer 1061 should be stretchable in at least one direction, and even more preferably stretchable in two directions. The third layer 1061 may include a slit 1063 so that the second layer 1059 may be removed from the removable pad 433 if the second layer 1059 becomes saturated and/or soiled, or so that additional absorbent material (not shown) can be added to the removable pad 433. The removable pad 433 may also include a front pocket 1065 formed from the material of the first layer 1057. The front pocket 1065 may be formed by folding a portion 1067 of the first layer 1057 over itself, and attaching the sides of the portion 1067 to the sides of the first layer 1057 so that the enclosed front pocket 1065 is formed on the removable pad 433. The front pocket 1065 provides additional protection from leaks of canine fluids from the removable pad 433, since the front pocket provides at least a partial barrier to the flow of canine fluids from the removable pad 433. The removable pad 433 may also include an internal pocket 1069 formed in the third layer 1061, and positioned on the opposite side of the removable pad 433 as the front pocket 1065. The internal pocket 1069 permits the collection of any additional canine fluids that may be retained in the front pocket 1065 and soak through the first layer 1057 and the second layer 1059, and allows for additional area of the third layer 1061 in order to facilitate retention and/or control of the additional canine fluids.

Figure 34A:
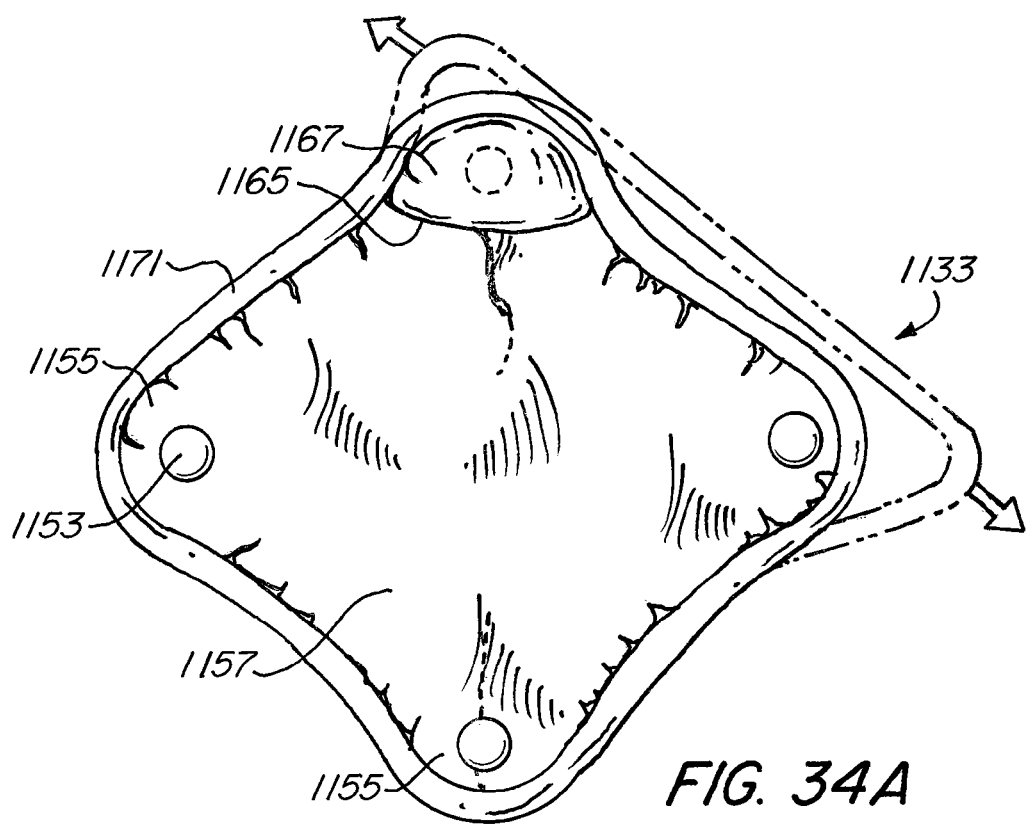
FIG. 34A is a top plan view of an exemplary pad that may be used with a canine garment according to the present invention.
Figure 34B:
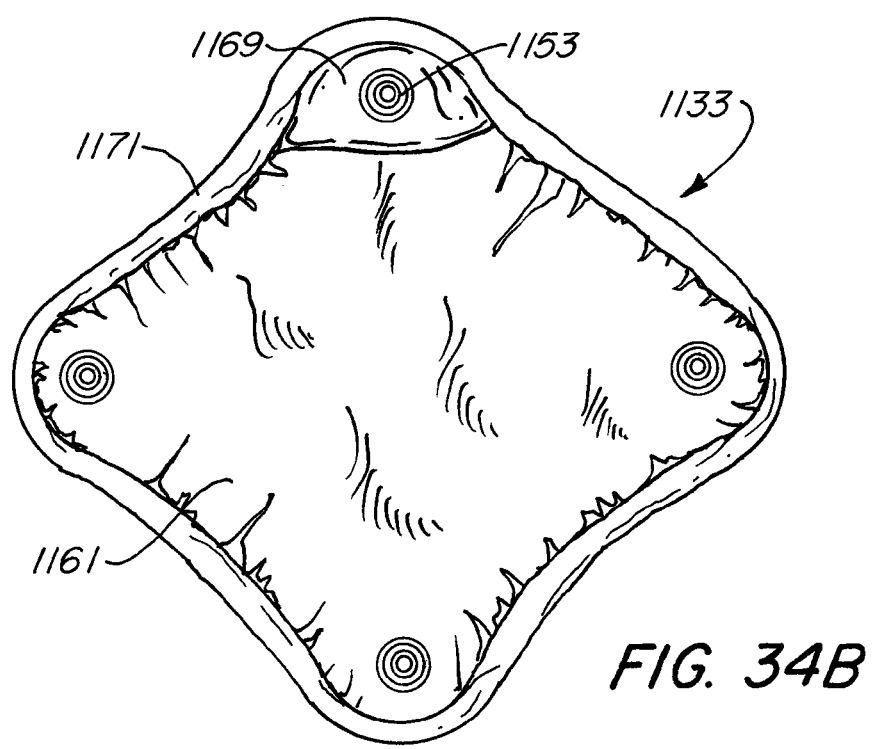
FIG. 34B is a bottom plan view of the exemplary pad from FIG. 34A that may be used with a canine garment according to the present invention.
Figure 35A:
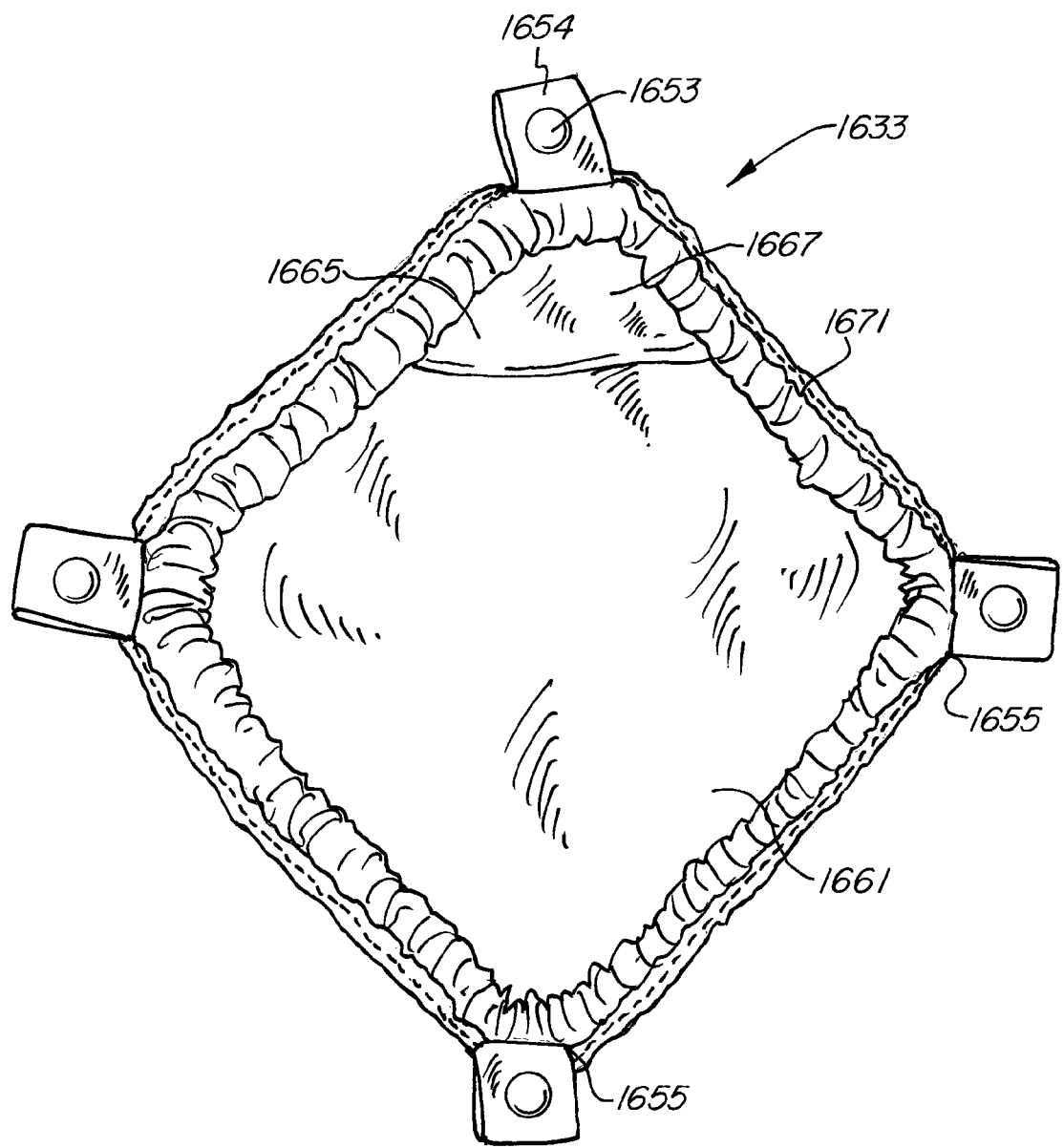
FIG. 35A is a top plan view of an exemplary pad that may be used with a canine garment according to the present invention.
Figure 35B:
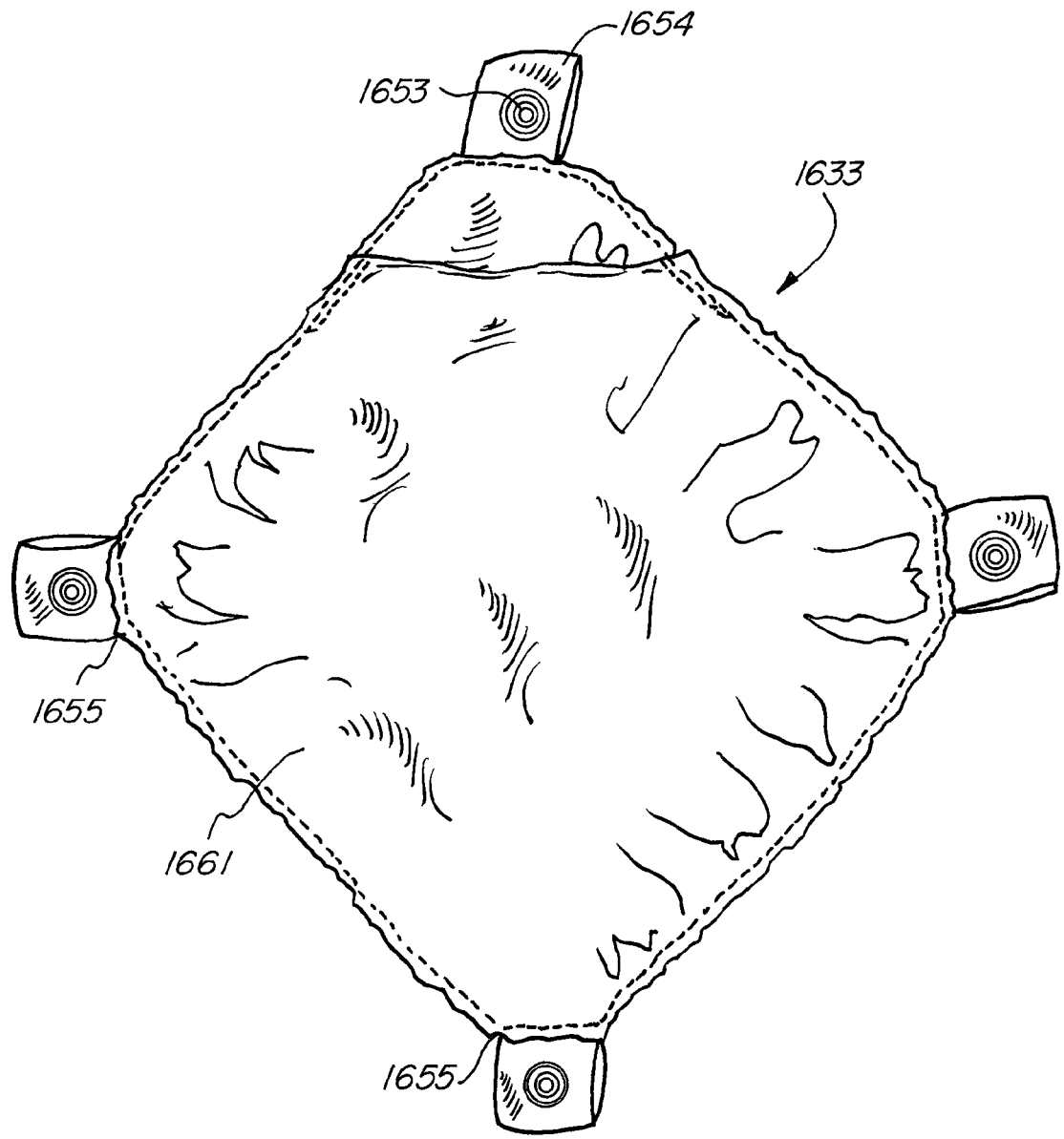
FIG. 35B is a bottom plan view of the exemplary pad from FIG. 35A that may be used with a canine garment according to the present invention.
Figure 36A:
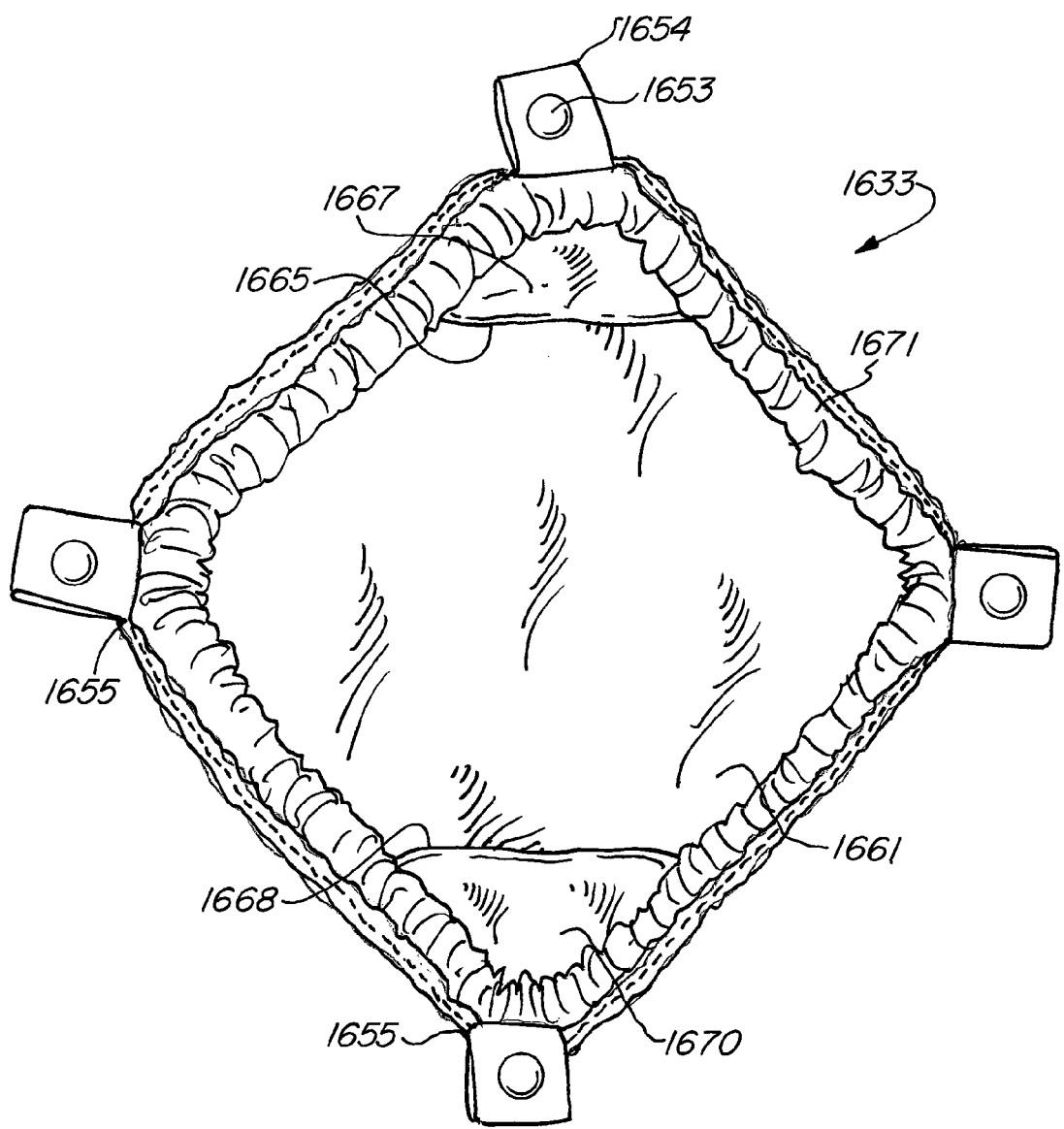
FIG. 36A is a top plan view of an exemplary pad that may be used with a canine garment according to the present invention.
Figure 36B:
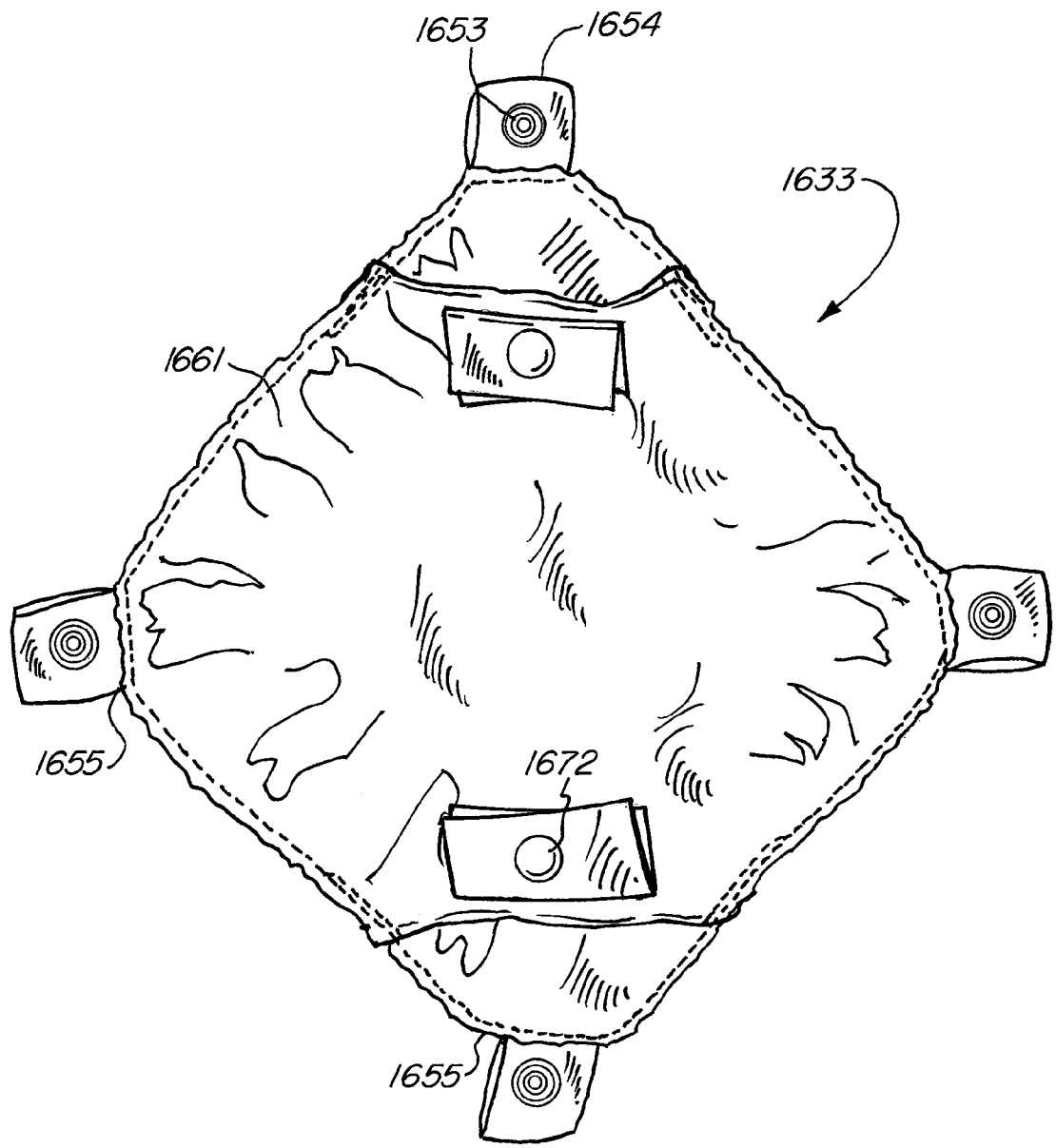
FIG. 36B is a bottom plan view of the exemplary pad from FIG. 36A that may be used with a canine garment according to the present invention.

Referring now to FIGS. 34A and 34B, therein illustrated is another exemplary embodiment of a removable pad, generally indicated by the numeral 1133, according to the present invention that is configured for use with the various exemplary embodiments of the canine garments according to the present invention that were previously discussed. The removable pad 1133 includes one or more fastening elements 1153 that are configured to allow removable attachment of the removable pad 1133 to an exemplary canine garment. When oriented in the position in which the removable pad 1133 will be installed on an exemplary canine garment (not shown), the removable pad 1133 has a substantially diamond shape, which promotes the formation of a cup-like, well configuration of the removable pad 1133 when installed in the canine garment and worn by a canine wearer (not shown). This is as a result of the corners 1155 on which the one or more fastening elements 1153 have been positioned being raised up relative to the rest of the removable pad 1133 when the removable pad 1133 is in use in the canine garment.

Still referring to FIGS. 34A and 34A, the removable pad 1133 may include a first layer 1157 that is configured to be positioned closest to the canine wearer (not shown) when the removable pad 1133 is installed on a canine garment (not shown). The first layer 1157 may preferably be made at least partially from a moisture wicking material, for example a micro-fleece fabric, but it is understood that any suitable material may be used for the first layer 1157. Preferably the material used for the first layer 1157 should be stretchable in at least one direction, and even more preferably stretchable in two directions. The removable pad 1133 may also include a second layer (not shown) positioned underneath the first layer 1157, and preferably made from an absorbent material, such as a hybrid fabric made from bamboo, cotton, viscose and polymicrofibers. The removable pad 1133 may also include a third layer 1161 positioned underneath the first layer 1157, and oriented so that the second layer (not shown) is at least partially surrounded by both the first layer 1157 and the third layer 1161. Preferably, the third layer 1161 should be made from a water resistant and/or water proof material, such as a polyurethane laminate. Preferably the material used for the third layer 1161 should be stretchable in at least one direction, and even more preferably stretchable in two directions. The removable pad 1133 may also include a front pocket 1165 formed from the material of the first layer 1157. The front pocket 1165 may be formed by folding a portion 1167 of the first layer 1157 over itself, and attaching the sides of the portion 1167 to the sides of the first layer 1157 so that the enclosed front pocket 1165 is formed on the removable pad 1133. The front pocket 1165 provides additional protection from leaks of canine fluids from the removable pad 1133, since the front pocket provides at least a partial barrier to the flow of canine fluids from the removable pad 1133. The removable pad 1133 may also include an internal pocket 1169 formed in the third layer 1161, and positioned on the opposite side of the removable pad 1133 as the front pocket 1165. The internal pocket 1169 permits the collection of any additional canine fluids that may be retained in the front pocket 1165 and soak through the first layer 1157 and the second layer 1159, and allows for additional area of the third layer 1161 in order to facilitate retention and/or control of the additional canine fluids. The removable pad 1133 may also include an elastic perimeter 1171 formed from a substantially elastic and/or stretchable material. As shown for example in FIG. 34A, the elastic perimeter 1171 permits the removable pad 1133 to be expanded and/or stretched along at least one direction, and this facilitates ensuring that the removable pad 1133 stays in the proper location when installed on an exemplary canine garment (not shown) worn by the canine wearer (not shown). Furthermore, it may be desirable that the elastic perimeter 1171 has a rest position, i.e. a position in which the elastic perimeter 1171 is not being stretched and/or urged in any direction, that is at least somewhat smaller than the size of at least the first layer 1157 of the removable pad 1133. In this manner, the elastic perimeter 1171 causes a slight upward urging of the corners 1155 of the removable pad 1133 in order to produce a cup-like, well formation of the removable pad 1133.

Referring now to FIGS. 1-2, 2A, 14, 21 and 27, therein illustrated is another exemplary embodiment of a removable pad, generally indicated by the numeral 1233, according to the present invention that is configured for use with the various exemplary embodiments of the canine garments according to the present invention that were previously discussed. The removable pad 1233 includes one or more fastening elements 1253 that are configured to allow removable attachment of the removable pad 1233 to an exemplary canine garment. Each of the one or more fastening elements 1253 may be disposed on a tab 1254 extending from the removable pad 1233 as shown for example in FIGS. 1-2. As shown for example in FIG. 2, the tabs 1254 may be folded under the removable pad 1233 in order to operationally engage the fastening elements 1253 of the removable pad 1233 with the fasteners 32 from the belly section 14 of the exemplary canine garment 10 shown in FIGS. 3 and 5-6. However, it is understood that the fastening elements 1253 may be disposed directly on the removable pad 1233, as shown for example in FIGS. 14, 21 and 27.

Referring again to FIGS. 1-2, 14, 21 and 27, the removable pad 1233 may include a first layer 1257 that is configured to be positioned closest to the canine wearer (not shown) when the removable pad 1233 is installed on a canine garment (not shown). The first layer 1257 may preferably be made at least partially from a moisture wicking material, for example a micro-fleece fabric, but it is understood that any suitable material may be used for the first layer 1257. Preferably the material used for the first layer 1257 should be stretchable in at least one direction, and even more preferably stretchable in two directions. The removable pad 1233 may also include a second layer 1259 positioned underneath the first layer 1257, and preferably made from an absorbent material, such as a hybrid fabric made from bamboo, cotton, viscose and polymicrofibers. The removable pad 1233 may also include a third layer 1261 positioned underneath the first layer 1257, and oriented so that the second layer 1259 is at least partially surrounded by both the first layer 1257 and the third layer 1261. Preferably, the third layer 1261 should be made from a water resistant and/or water proof material, such as a polyurethane laminate. Preferably the material used for the third layer 1261 should be stretchable in at least one direction, and even more preferably stretchable in two directions.

Figure 2:
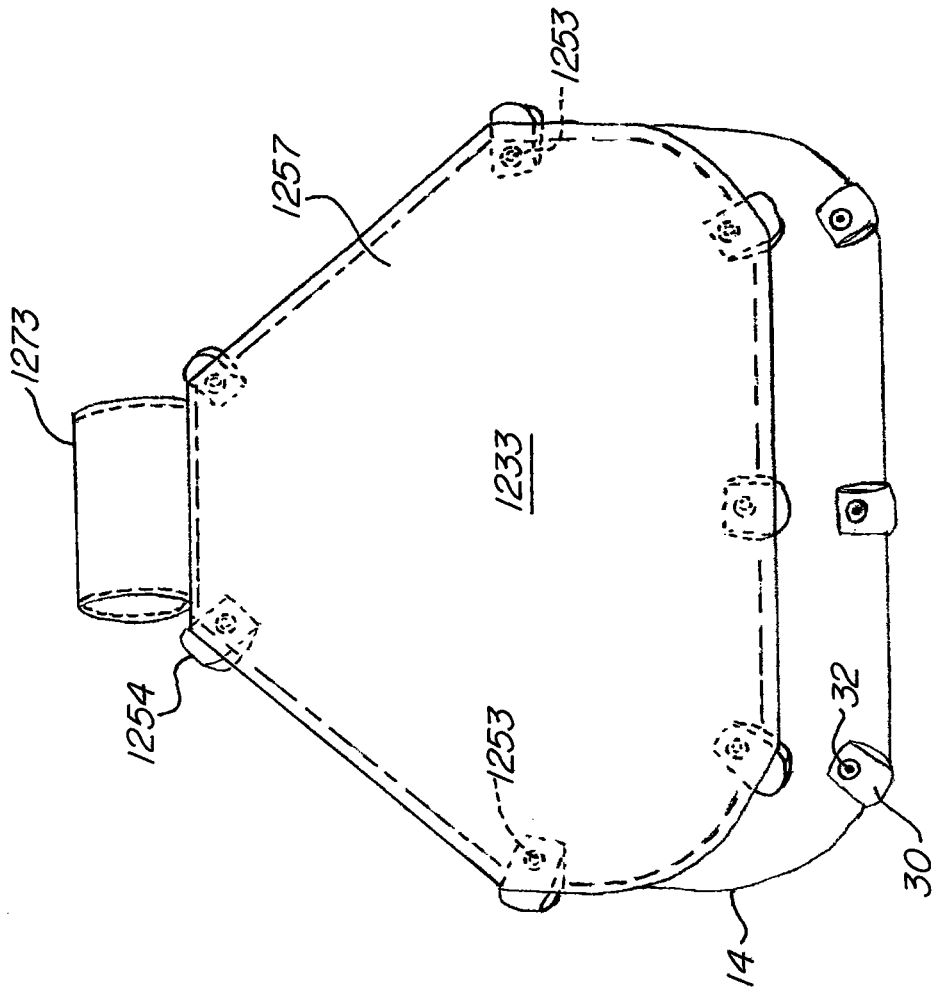
FIG. 2 is a top plan view showing how the exemplary pad from FIG. 1 may be attached to a portion of a canine garment according to the present invention.
Figure 2A:
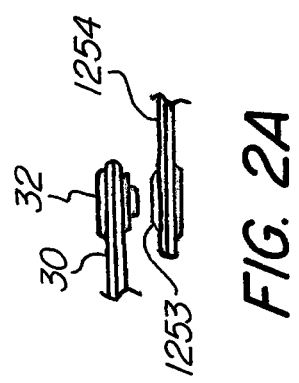
FIG. 2A is a close-up side view of exemplary fasteners that may be used to secure an exemplary pad to a canine garment according to the present invention.
Figure 5:
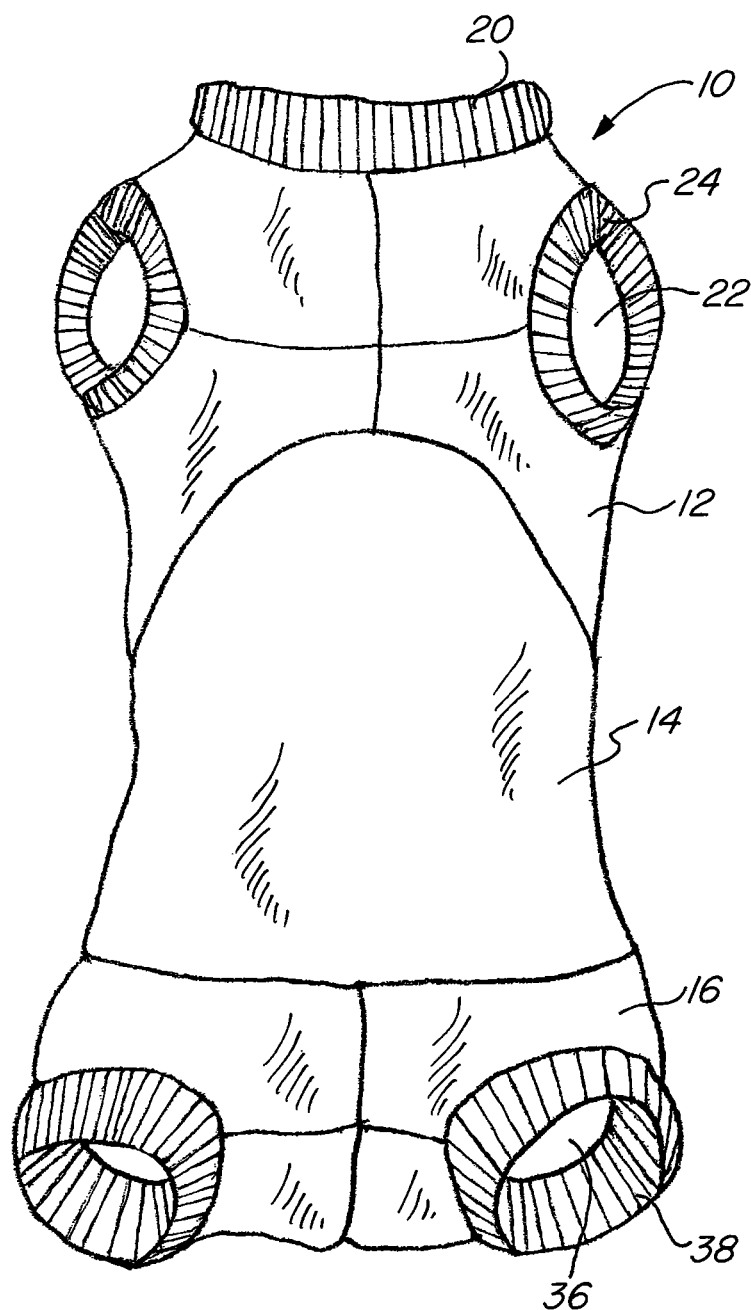
FIG. 5 is a bottom plan view of an exemplary canine garment according to the present invention.
Figure 6:
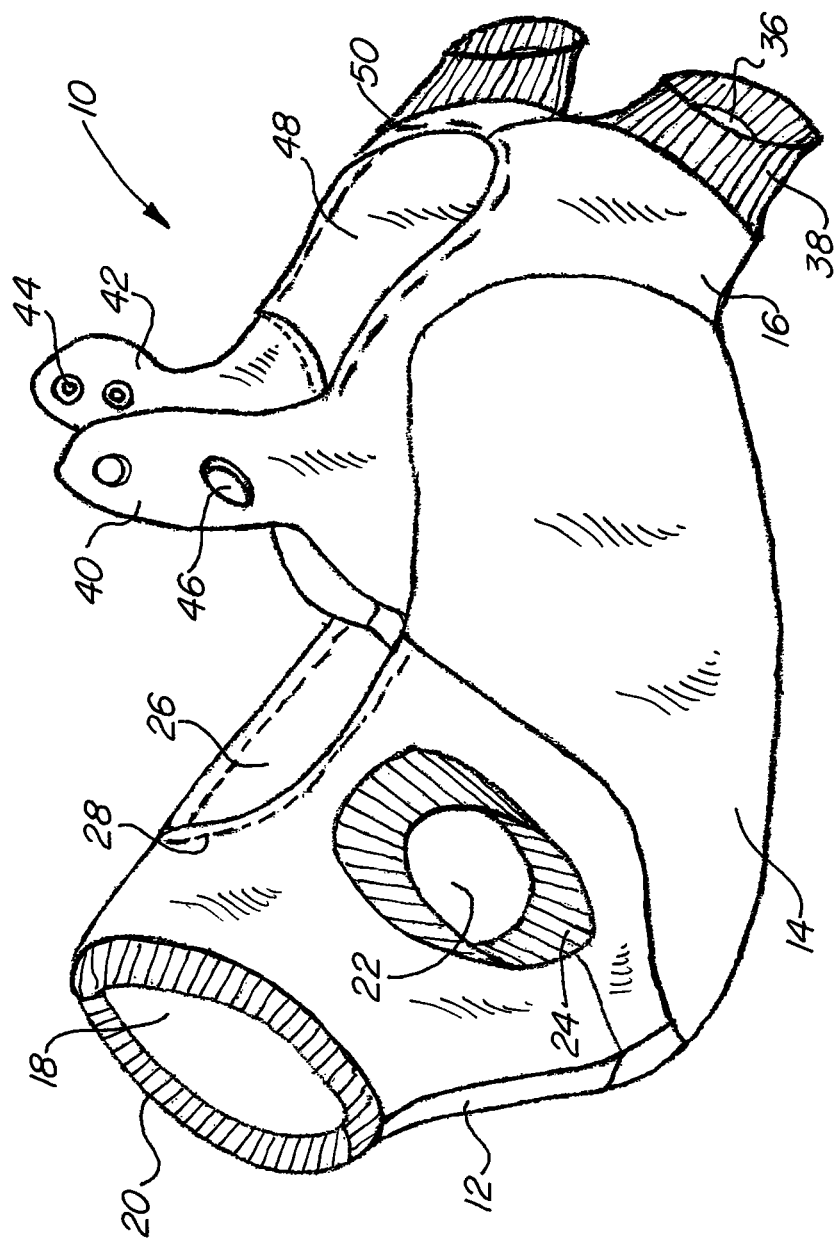
FIG. 6 is a left side view of an exemplary canine garment according to the present invention.
Figure 7:
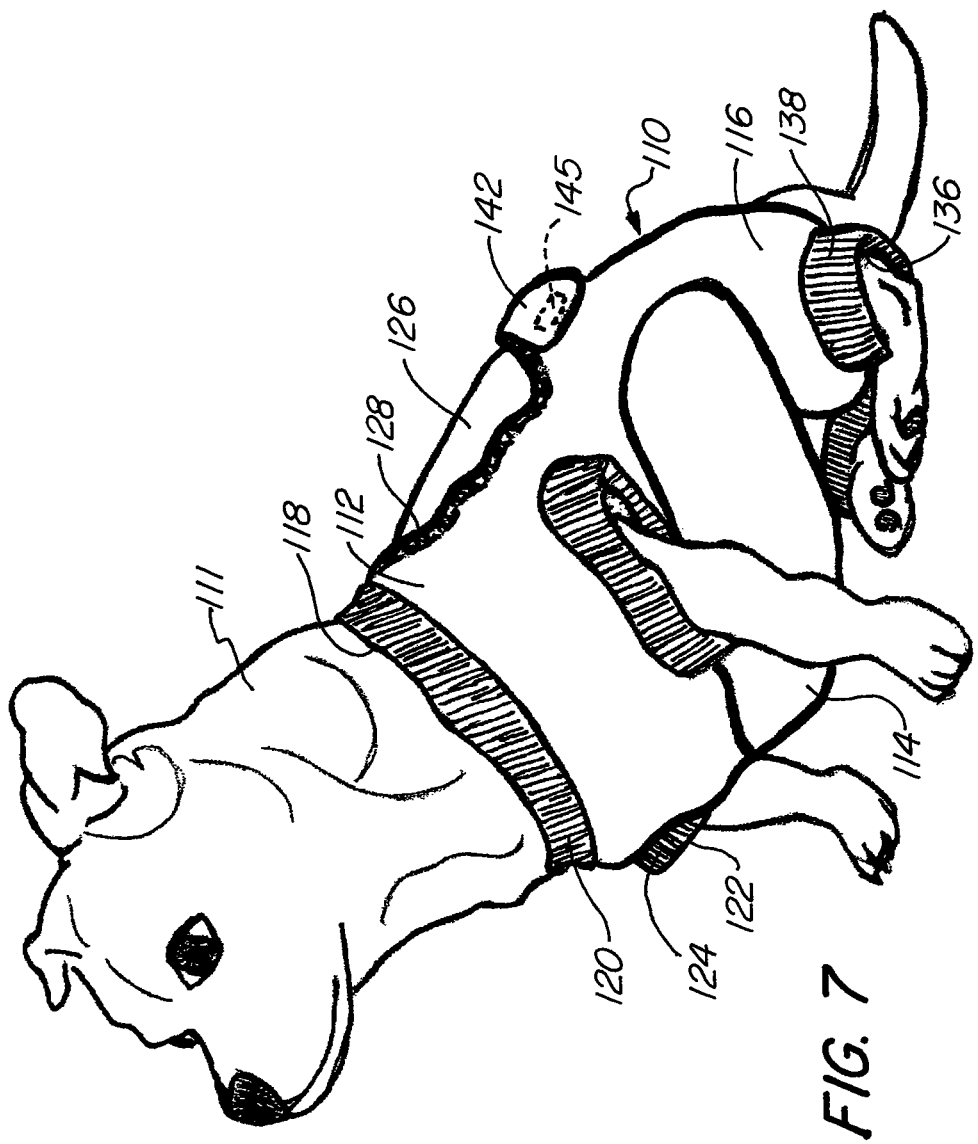
FIG. 7 is a left side of a canine adorned with an exemplary canine garment according to the present invention.
Figure 8:
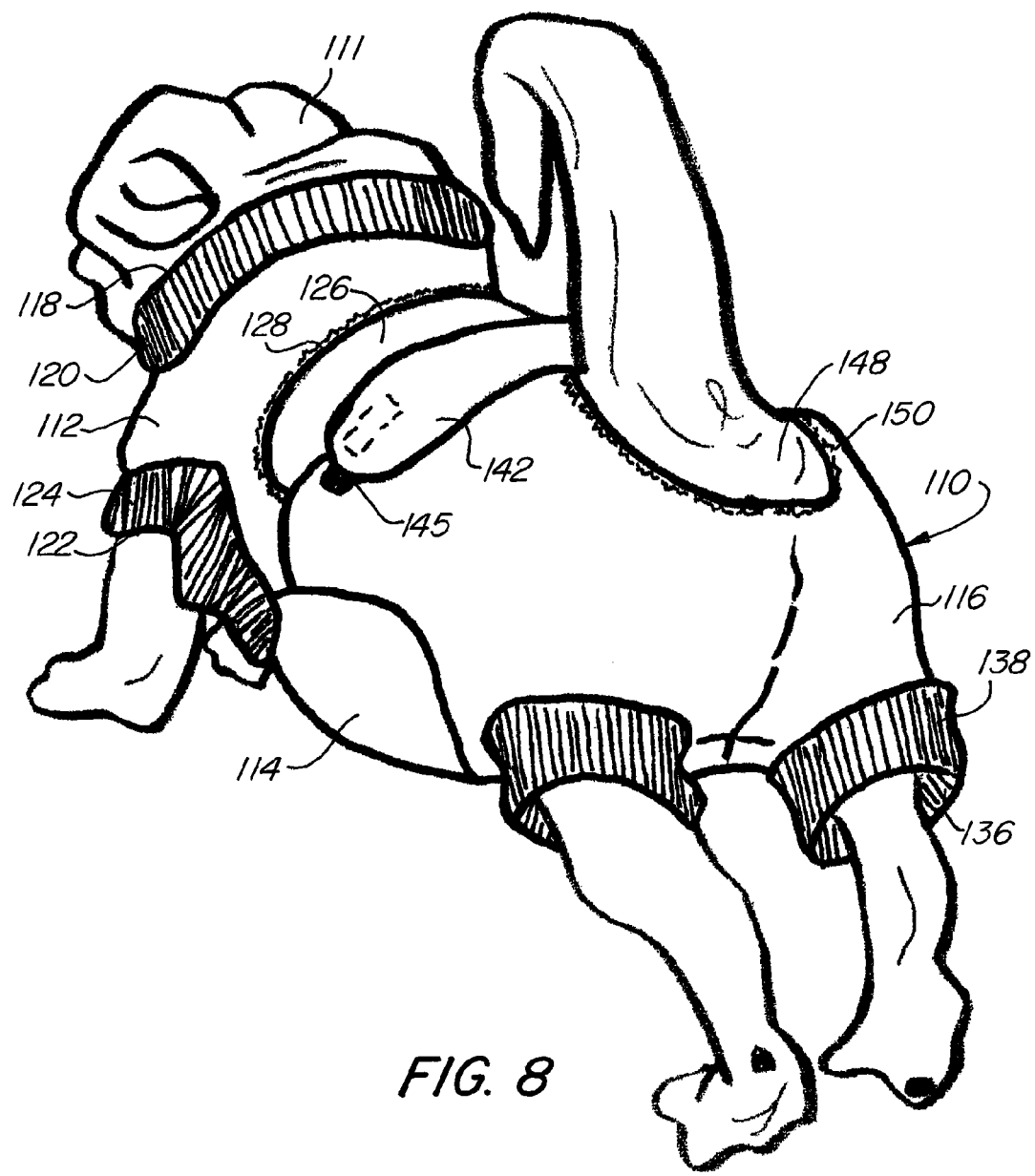
FIG. 8 is a rear perspective view of a canine adorned with an exemplary canine garment according to the present invention.
Figure 9:
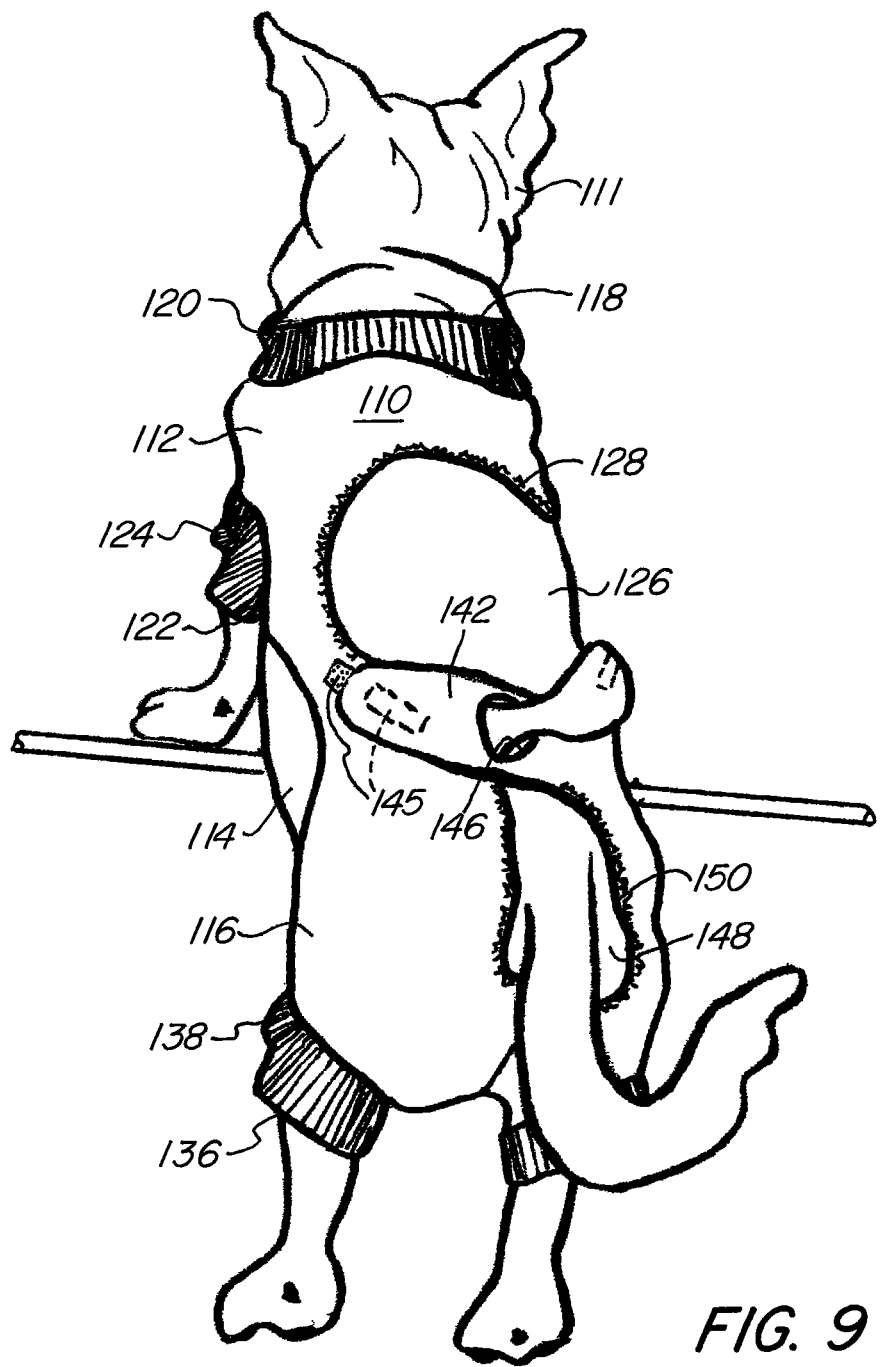
FIG. 9 is a rear view of a canine adorned with an exemplary canine garment according to the present invention.
Figure 10:
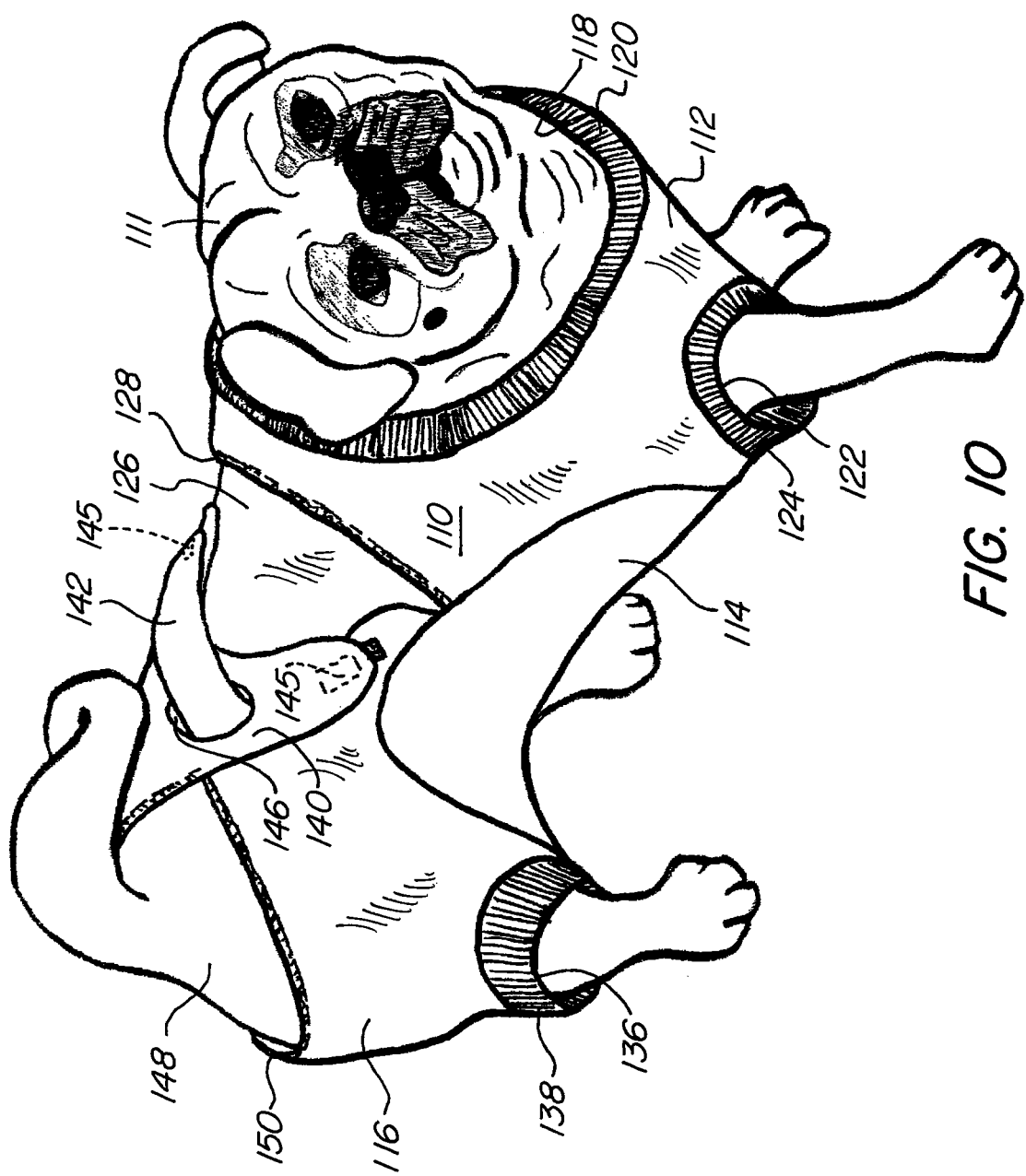
FIG. 10 is a right side view of a canine adorned with an exemplary canine garment according to the present invention.
Figure 11:
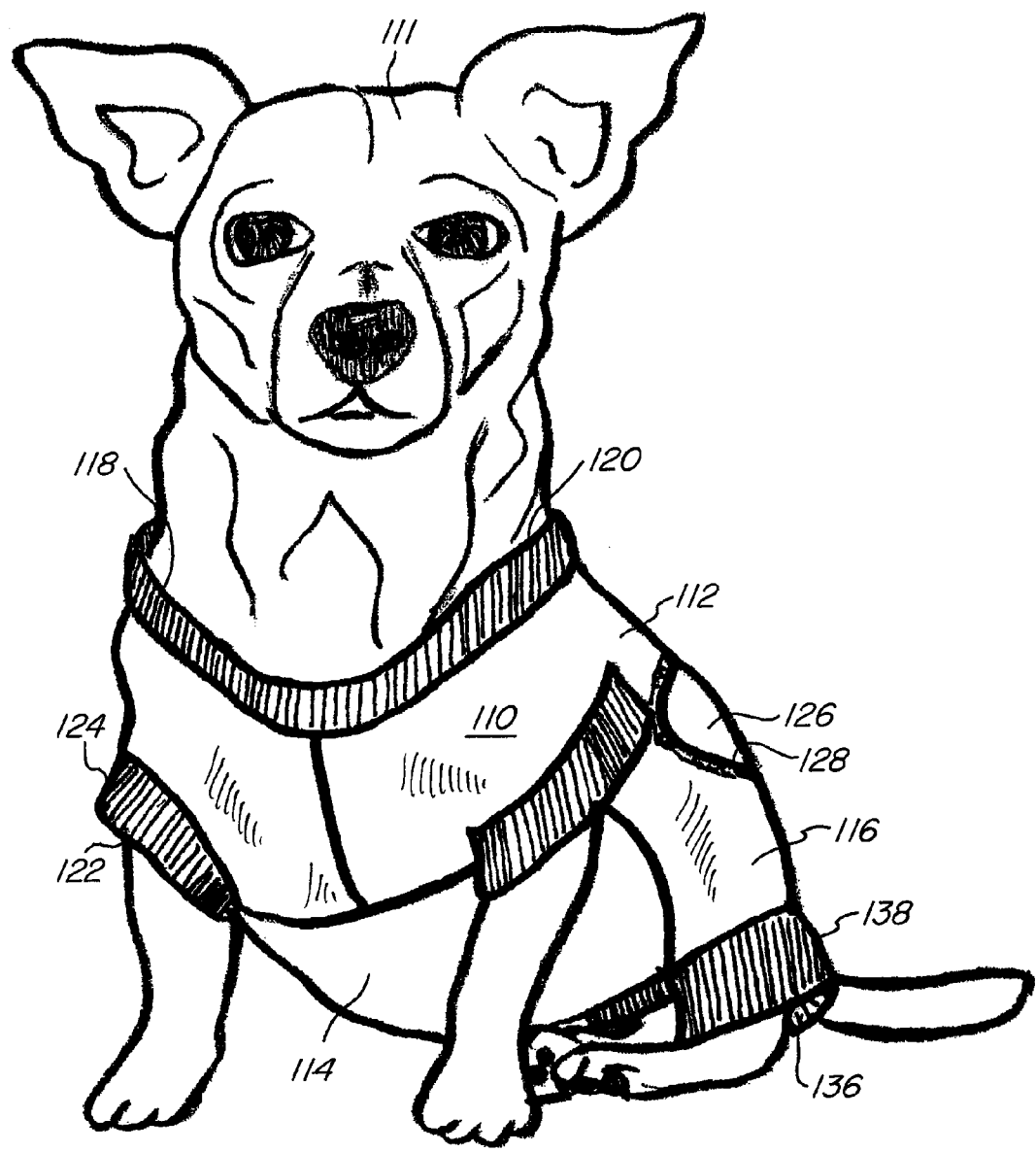
FIG. 11 is a front view of a canine adorned with an exemplary canine garment according to the present invention.
Figure 13:
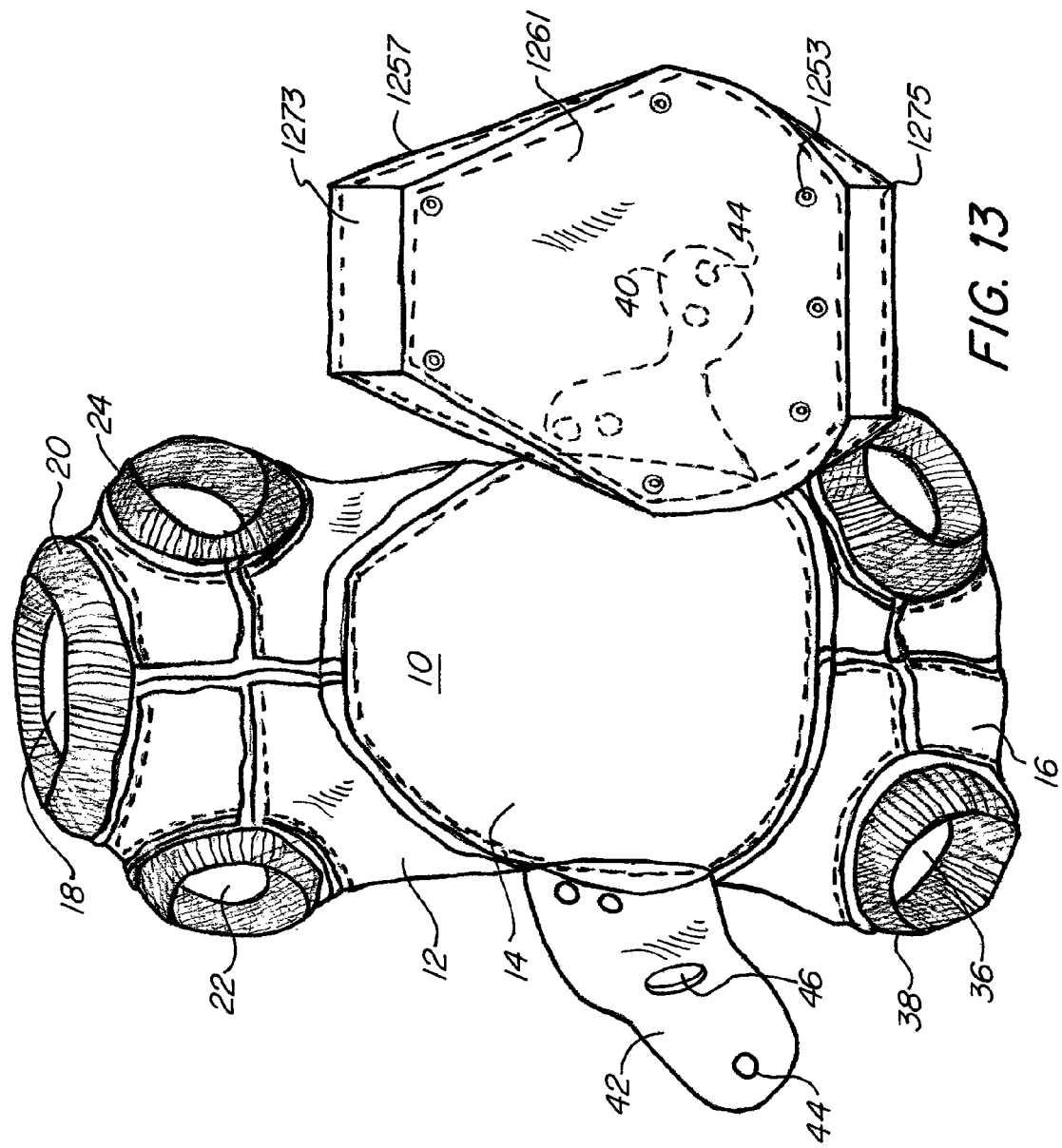
FIG. 13 is a bottom plan view of an exemplary canine garment according to the present invention showing how an exemplary pad may be oriented relative to the canine garment when the pad is secured to the canine garment.
Figure 14:
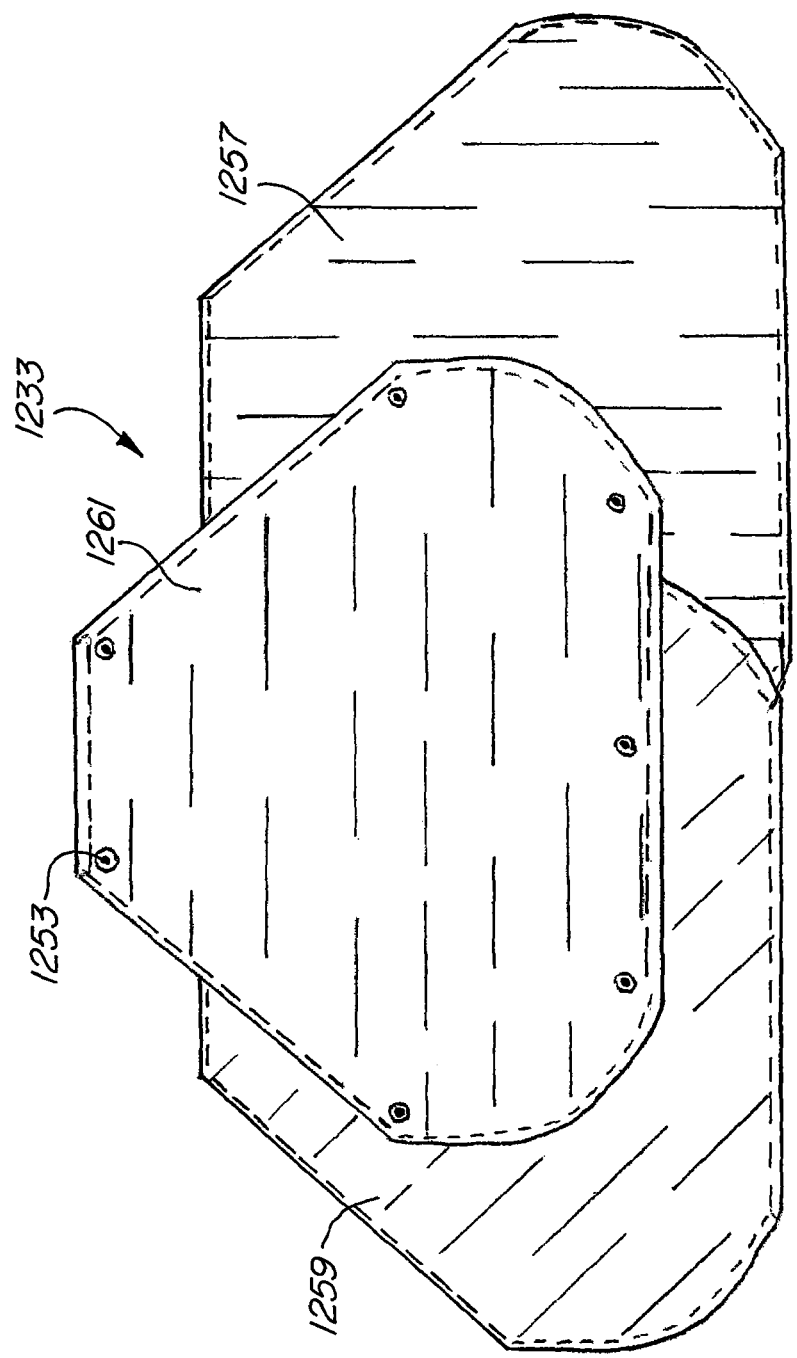
FIG. 14 is a bottom plan exploded view showing the layers in an offset manner of an exemplary pad that may be used with an exemplary canine garment according to the present invention.
Figure 21:
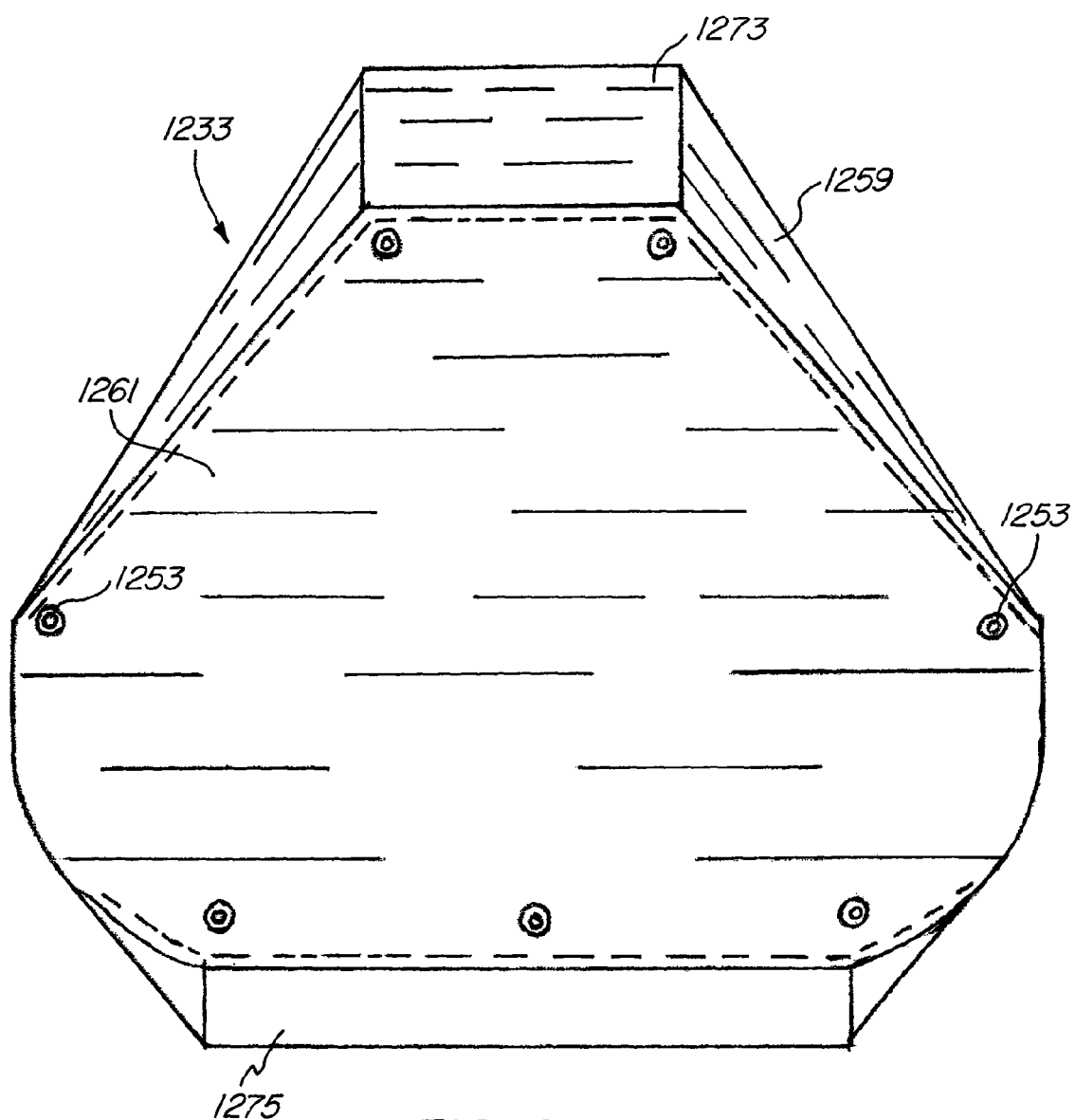
FIG. 21 is a bottom plan view of an exemplary pad that may be used with a canine garment according to the present invention.
Figure 27:
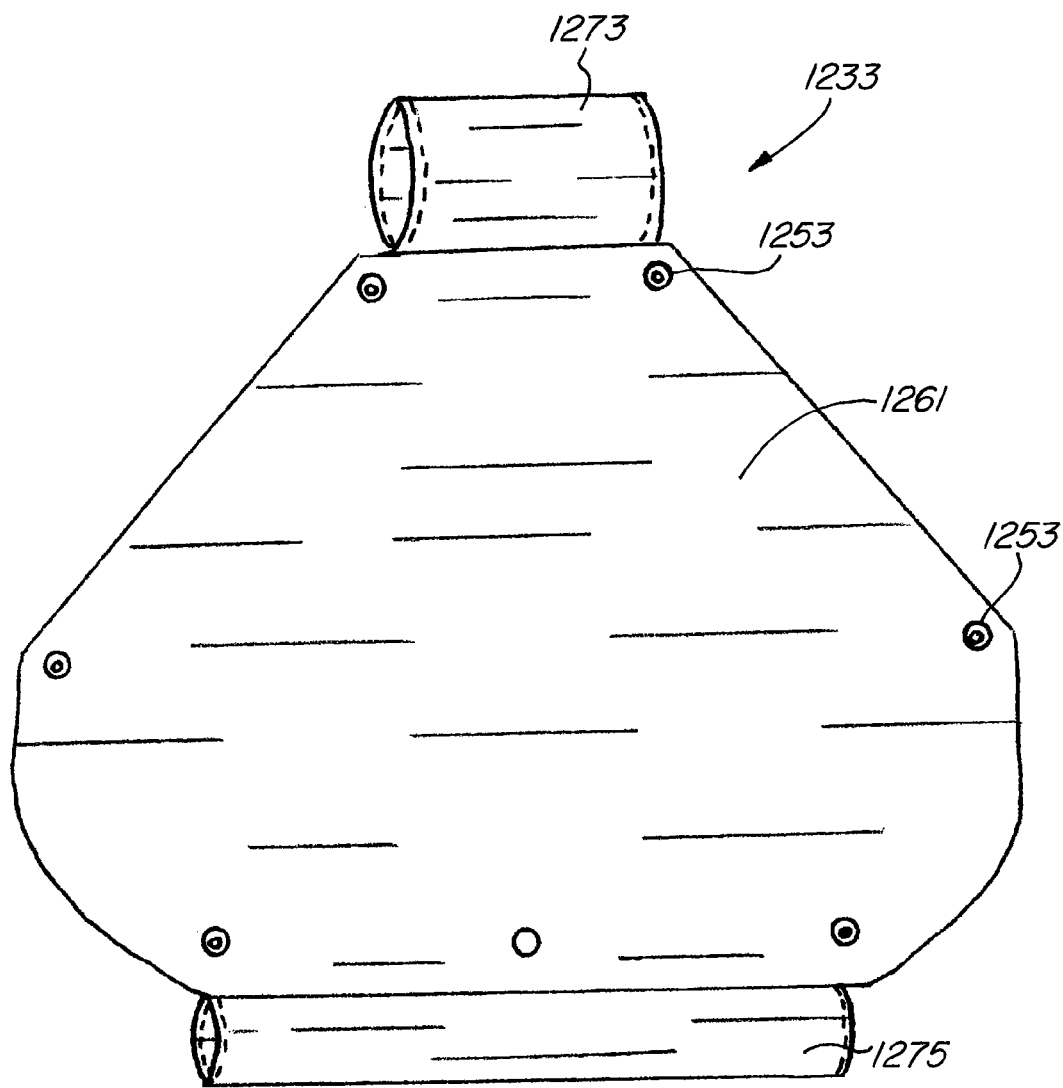
FIG. 27 is a top plan view of an exemplary pad that may be used with an exemplary canine garment according to the present invention.

Referring to FIGS. 1-2, 21 and 27, the removable pad 1233 may include a front loop 1273 and a back loop 1275. It is understood that for exemplary purposes, FIGS. 1 and 2 show the removable pad 1233 with only the front loop 1273, and FIGS. 21 and 27 shows the removable pad with both the front loop 1273 and the back loop 1275. It is further understood that the removable pad 1233 may include both the front loop 1273 and the back loop 1275, one of either or neither. Furthermore, as shown for example in FIG. 1, the front loop 1273 may be made from the same material as the first layer 1257, while as shown for example in FIG. 27, the front loop 1273 and/or back loop 1275 may be made from the same material as the third layer 1261. The front loop 1273 and/or the back loop 1275 provide additional functionality to the removable pad 1233 by causing the sides of the removable pad 1233 to lift when the canine garment (not shown) in which the removable pad 1233 has been installed is worn by the canine wearer (not shown). This lifting forms a cupped, well-like formation of the removable pad 1233 that helps to prevent canine fluids from flowing onto the canine garment (not shown) and/or other surface that the canine wearer (not shown) may come into contact with. As shown for example in FIG. 13, the removable pad 1233 may be oriented relative to the canine garment 10 so that the front loop 1273 faces towards the front section 12 of the canine garment 10, and the back loop 1275 faces towards the hind section 16 of the canine garment 10. FIG. 13 further shows how the removable pad 1233 may be positioned for installation on the belly section 14 of the canine garment 10. While the canine garment 10 from FIGS. 3 and 5-6 is discussed and shown in FIG. 13, it is understood that the removable pad 1233 is suitable for use with any of the other exemplary canine garments discussed above and/or hereinafter.

Figure 15:
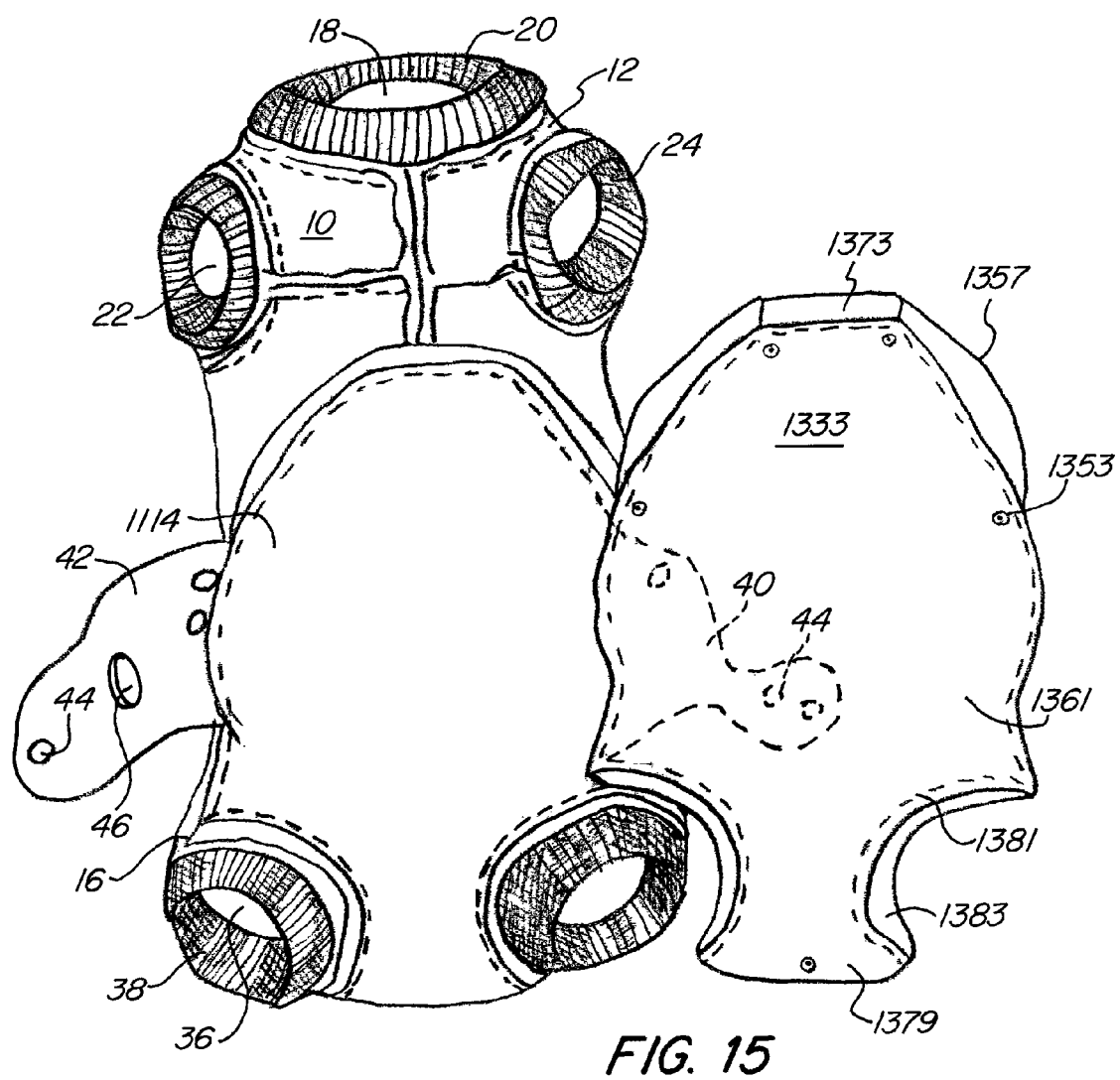
FIG. 15 is a bottom plan view of an exemplary canine garment according to the present invention showing how an exemplary pad may be oriented relative to the canine garment when the pad is secured to the canine garment.
Figure 16:
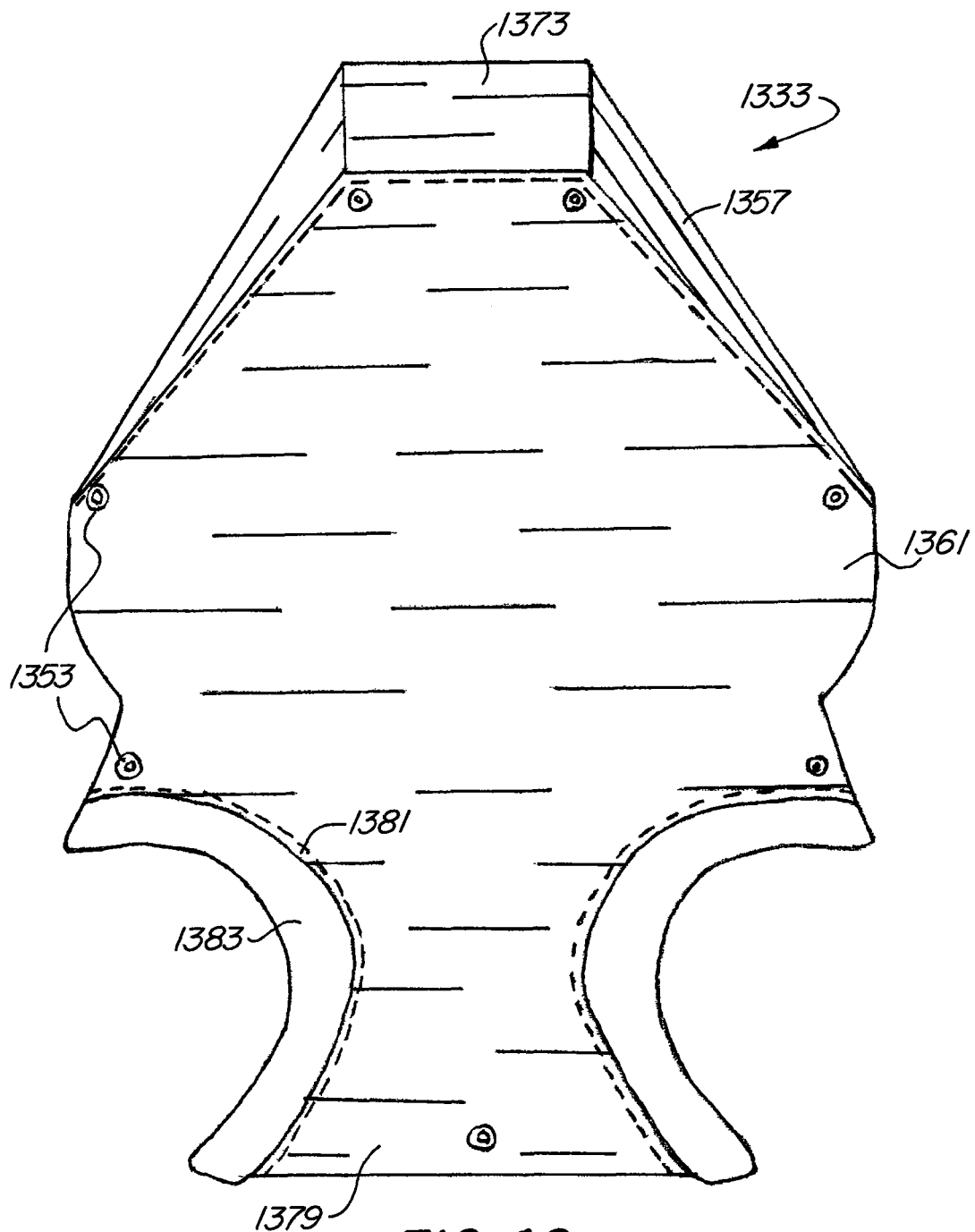
FIG. 16 is a bottom plan view of an exemplary pad that may be used with an exemplary canine garment according to the present invention.
Figure 17:
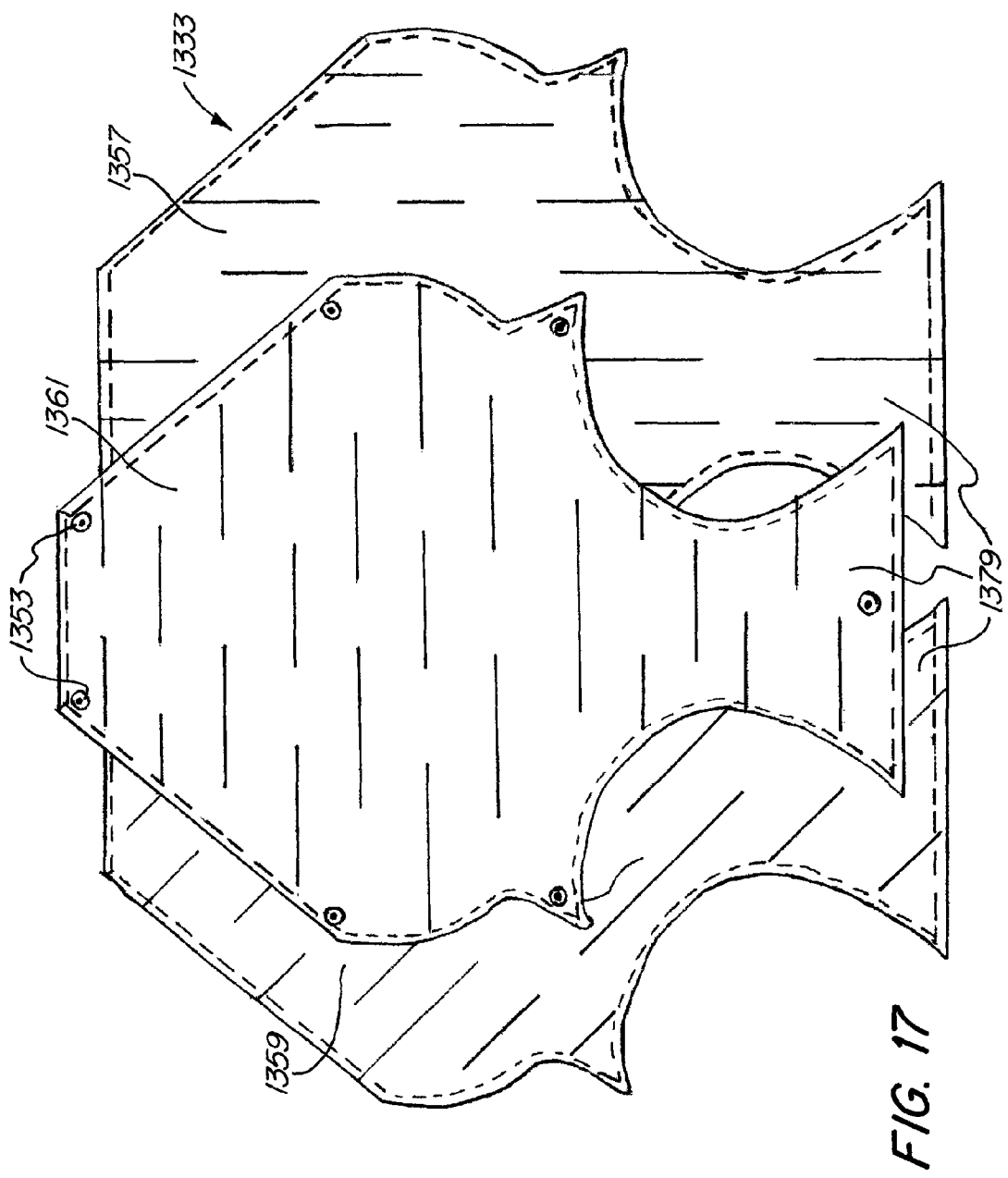
FIG. 17 is a bottom plan exploded view showing the layers in an offset manner of an exemplary pad that may be used with an exemplary canine garment according to the present invention.

Referring now to FIGS. 15-17, therein illustrated is another exemplary embodiment of a removable pad, generally indicated by the numeral 1333, according to the present invention that is configured for use with the various exemplary embodiments of the canine garments according to the present invention that were previously discussed. The removable pad 1333 may be particularly suitable for use with female canine wearers (not shown). The removable pad 1333 includes one or more fastening elements 1353 that are configured to allow removable attachment of the removable pad 1333 to an exemplary canine garment. The removable pad 1333 may include a first layer 1357 that is configured to be positioned closest to the canine wearer (not shown) when the removable pad 1333 is installed on a canine garment, for example the exemplary canine garment 10. The first layer 1357 may preferably be made at least partially from a moisture wicking material, for example a micro-fleece fabric, but it is understood that any suitable material may be used for the first layer 1357. Preferably the material used for the first layer 1357 should be stretchable in at least one direction, and even more preferably stretchable in two directions. The removable pad 1333 may also include a second layer 1359 positioned underneath the first layer 1357, and preferably made from an absorbent material, such as a hybrid fabric made from bamboo, cotton, viscose and polymicrofibers. The removable pad 1333 may also include a third layer 1361 positioned underneath the first layer 1357, and oriented so that the second layer 1359 is at least partially surrounded by both the first layer 1357 and the third layer 1361. Preferably, the third layer 1361 should be made from a water resistant and/or water proof material, such as a polyurethane laminate. Preferably the material used for the third layer 1361 should be stretchable in at least one direction, and even more preferably stretchable in two directions.

Still referring to FIGS. 15-17, the removable pad 1333 may also include a front loop 1373. The front loop 1373 provides additional functionality to the removable pad 1333 by causing the sides of the removable pad 1333 to lift when the canine garment (not shown) in which the removable pad 1333 has been installed is worn by the canine wearer (not shown). This lifting forms a cupped, well-like formation of the removable pad 1333 that helps to prevent canine fluids from flowing onto the canine garment 10 and/or other surface that the canine wearer (not shown) may come into contact with. The removable pad 1333 may also include an extended rear section 1379 that is configured and dimensioned to extend around the legs and up the hind quarters of a canine wearer (not shown), for example a female canine wearer (not shown). The extended section 1379 may contain two substantially semi-circular cutouts 1381 that are configured to extend around the legs of the canine wearer (not shown). Each of the substantially semi-circular cutouts 1381 may include an elastic material 1383 along its perimeter in order to permit a secure and snug fit of the removable pad 1333 around the legs of the canine wearer (not shown). As shown for example in FIG. 15, the removable pad 1333 may be oriented relative to the canine garment 10 so that the front loop 1373 faces towards the front section 12 of the canine garment 10, and the extended rear section 1379 faces towards the hind section 16 of the canine garment 10. The canine garment 10 depicted in FIG. 15 is similar to the canine garment 10 depicted in FIGS. 3 and 5-6, except that an alternative belly section 1114 is used so that the belly section 1114 have a shape and configuration similar to the removable pad 1333. FIG. 15 further shows how the removable pad 1333 may be positioned for installation on the belly section 1114 of the canine garment 10. While the canine garment 10 from FIGS. 3 and 5-6 with an alternative belly section 1114 is discussed and shown in FIG. 15, it is understood that the removable pad 1333 is suitable for use with any of the other exemplary canine garments discussed above and/or hereinafter.

Figure 22:
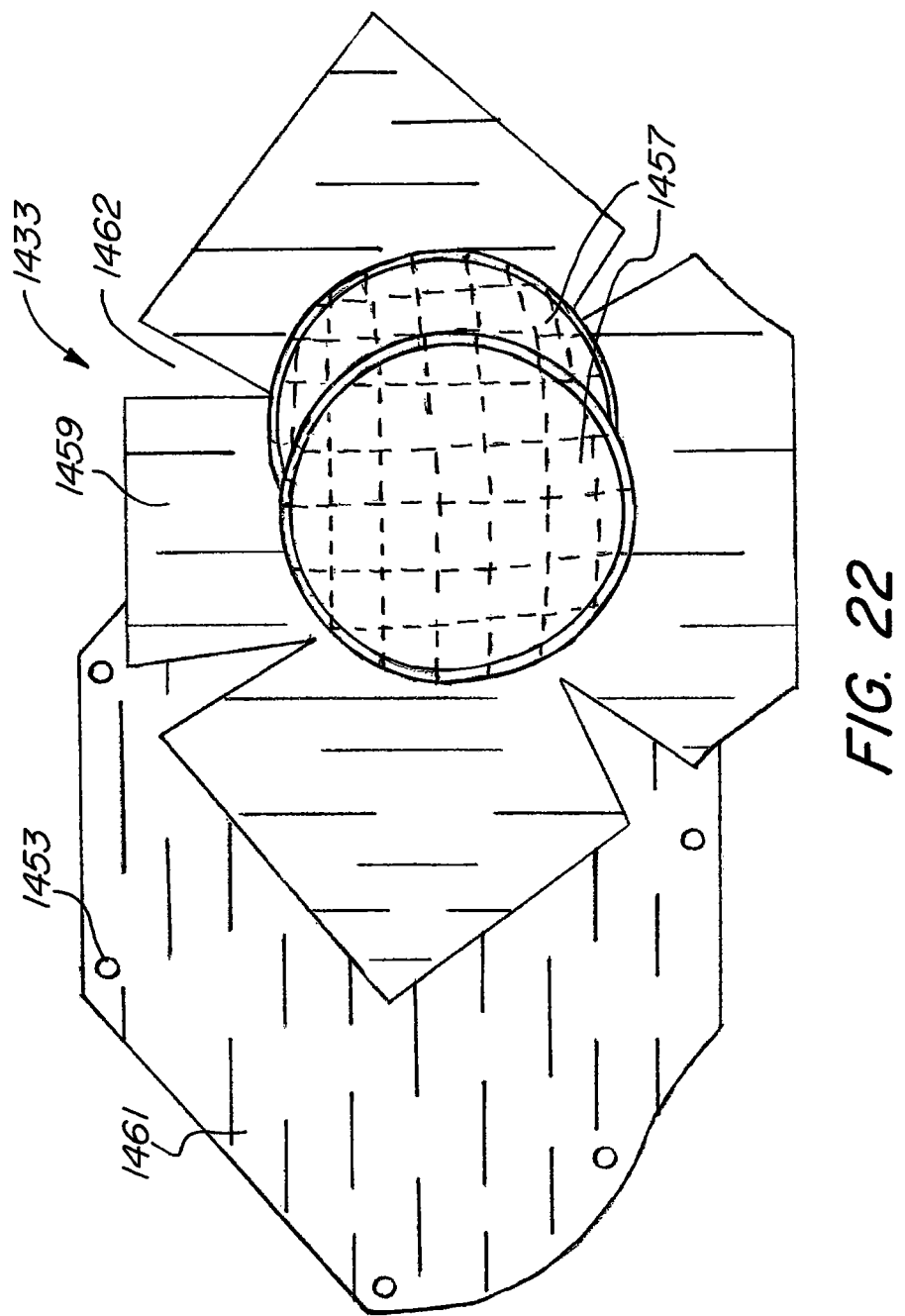
FIG. 22 is a top plan exploded view showing the layers in an offset manner of an exemplary pad that may be used with an exemplary canine garment according to the present invention.
Figure 23:
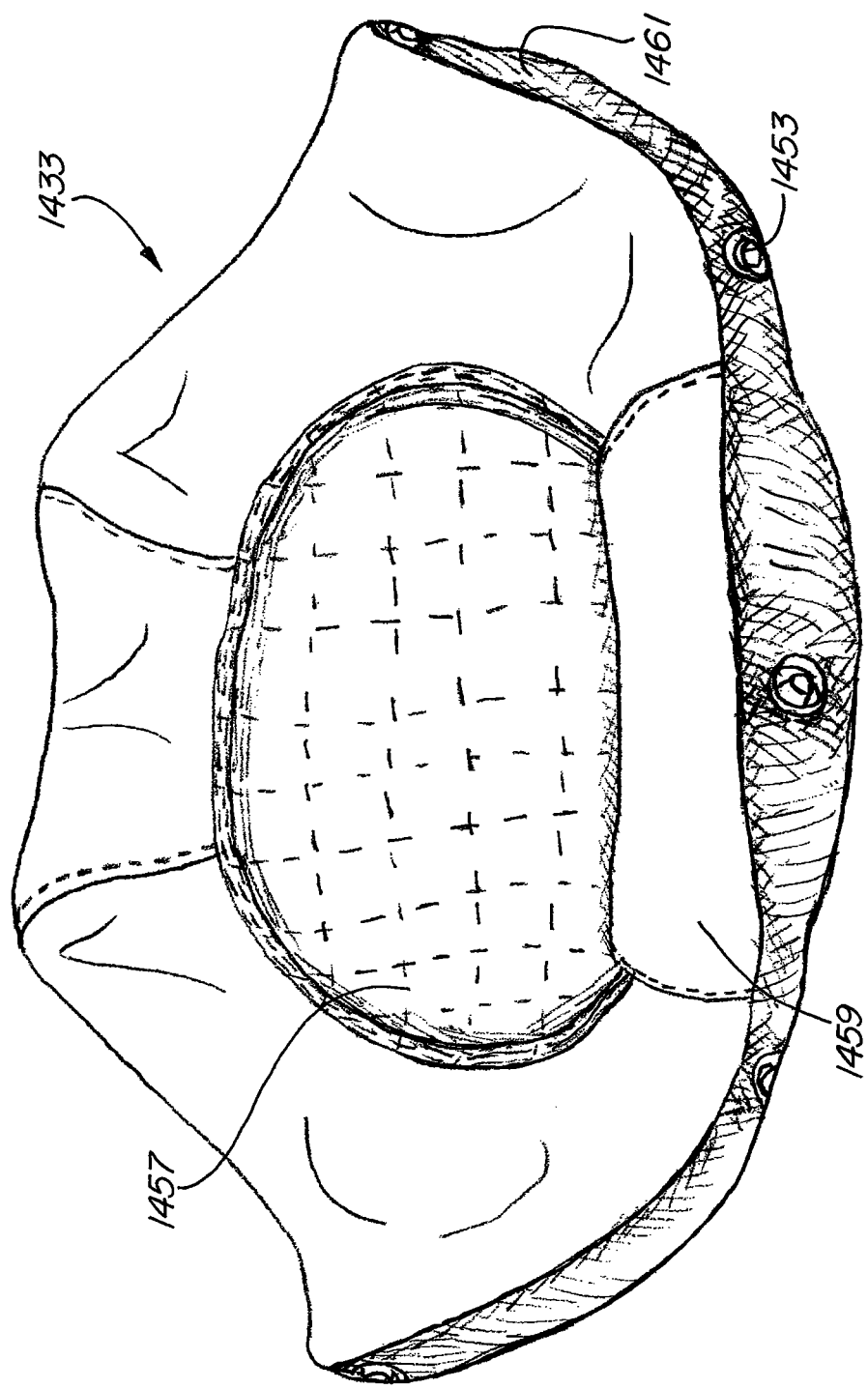
FIG. 23 is a perspective view of an exemplary pad that may be used with an exemplary canine garment according to the present invention.

Referring now to FIGS. 22-23, therein illustrated is another exemplary embodiment of a removable pad, generally indicated by the numeral 1433, according to the present invention that is configured for use with the various exemplary embodiments of the canine garments according to the present invention that were previously discussed. The removable pad 1433 includes one or more fastening elements 1453 that are configured to allow removable attachment of the removable pad 1433 to an exemplary canine garment. The removable pad 1433 may include a first layer 1457 that is configured to be positioned closest to the canine wearer (not shown) when the removable pad 1433 is installed on a canine garment (not shown). The first layer 1457 may preferably be made at least partially from an absorbent material, such as a hybrid fabric made from bamboo, cotton, viscose and polymicrofibers. As shown for example in FIG. 22, the first layer 1457 may be made from more than one layer of the absorbent material. The removable pad 1433 may also include a second layer 1459 positioned underneath the first layer 1457, and preferably made from a moisture wicking material, for example a micro-fleece fabric, but it is understood that any suitable material may be used for the second layer 1459. Preferably the material used for the second layer 1459 should be stretchable in at least one direction, and even more preferably stretchable in two directions. The removable pad 1433 may also include a third layer 1461 positioned underneath the first layer 1457 and the second layer 1459. Preferably, the third layer 1461 should be made from a water resistant and/or water proof material, such as a polyurethane laminate. Preferably the material used for the third layer 1461 should be stretchable in at least one direction, and even more preferably stretchable in two directions. One or more darts 1462 may be formed in the second layer 1459 of the removable pad 1433 in order to create a cupped, well-like shape of the removable pad 1433, as shown for example in FIG. 23. It is understood that the removable pad 1433 is suitable for use with any of the other exemplary canine garments discussed above and/or hereinafter.

Figure 24:
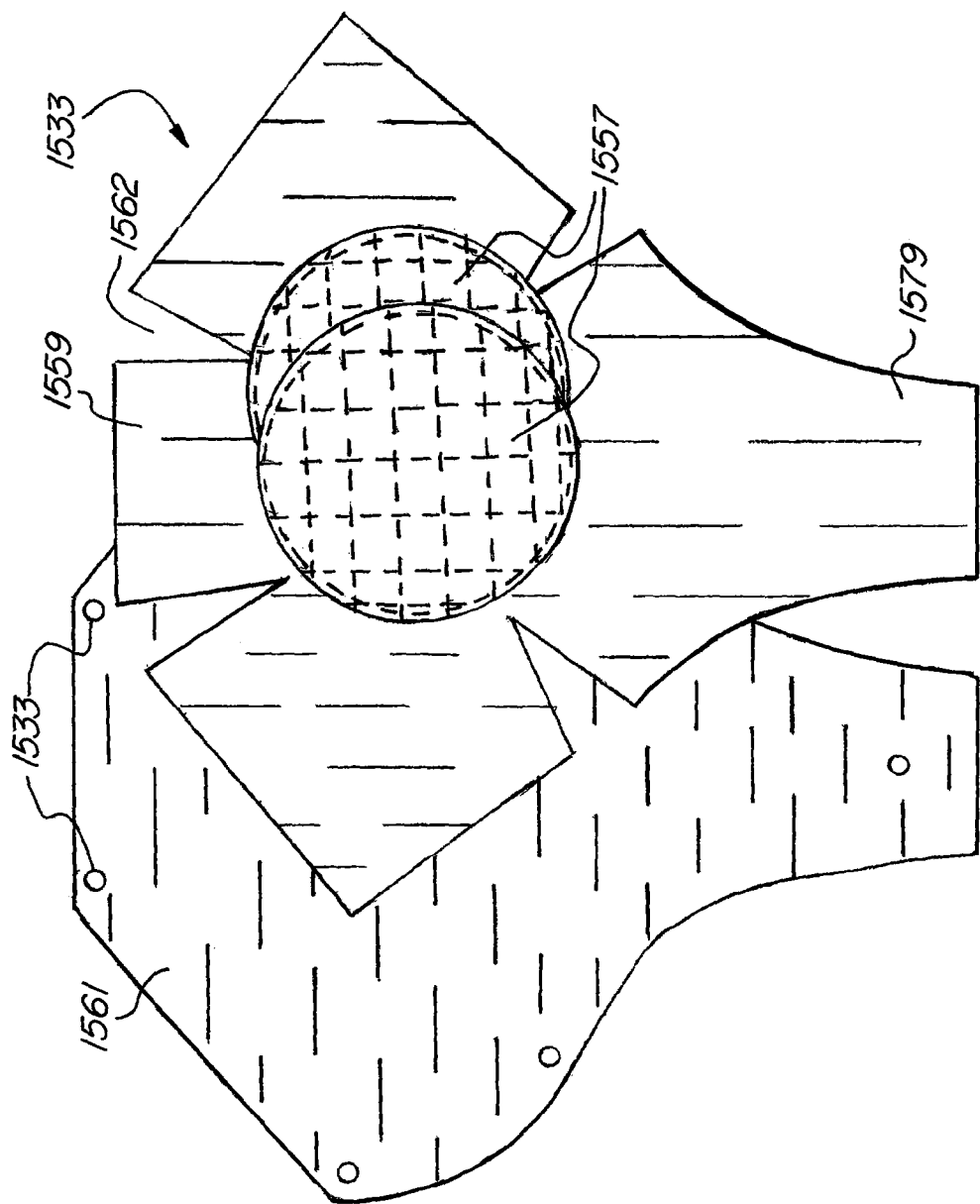
FIG. 24 is a top plan exploded view showing the layers in an offset manner of an exemplary pad that may be used with an exemplary canine garment according to the present invention.
Figure 25:
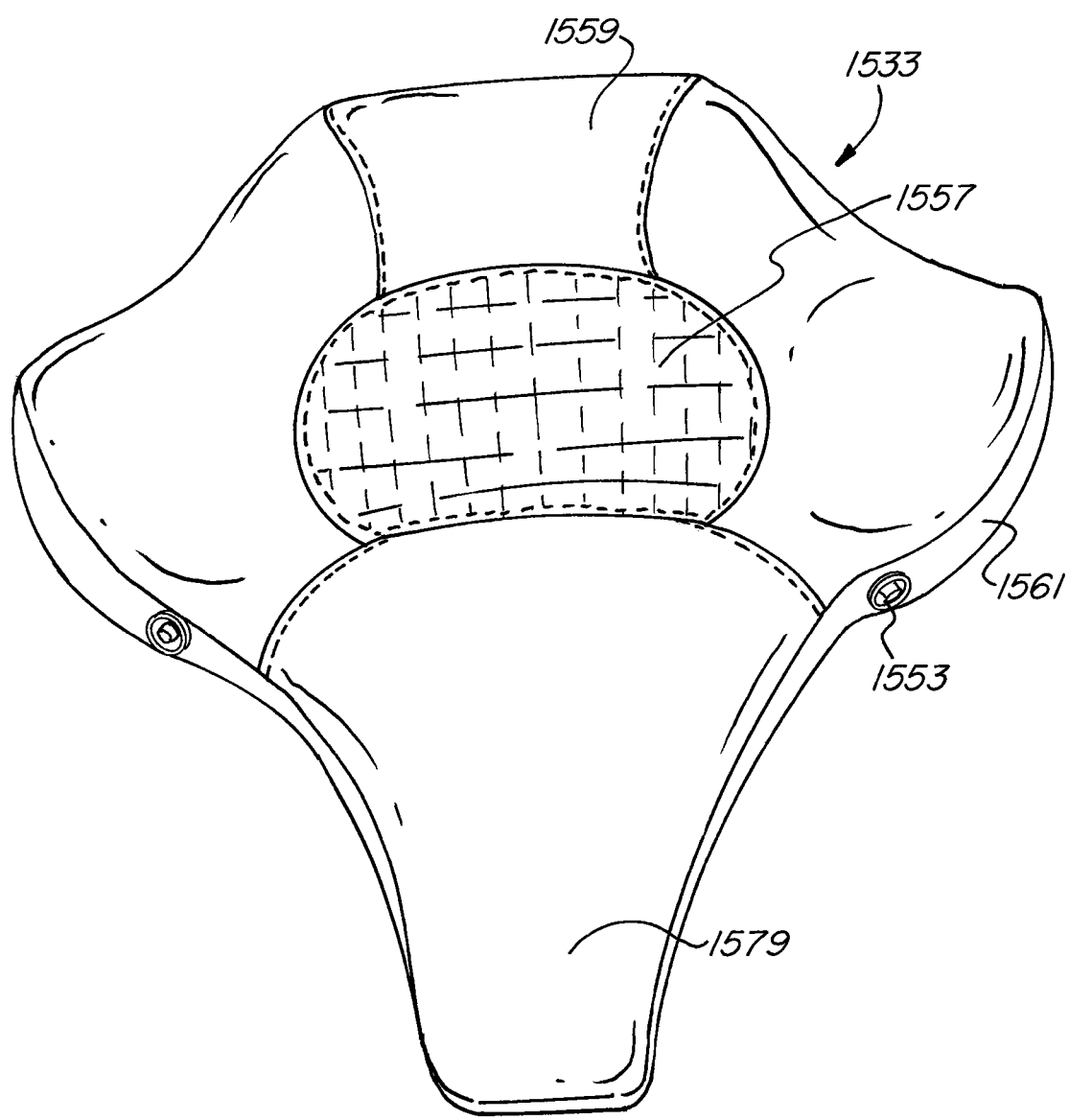
FIG. 25 is a perspective view of an exemplary pad that may be used with an exemplary canine garment according to the present invention.
Figure 26:
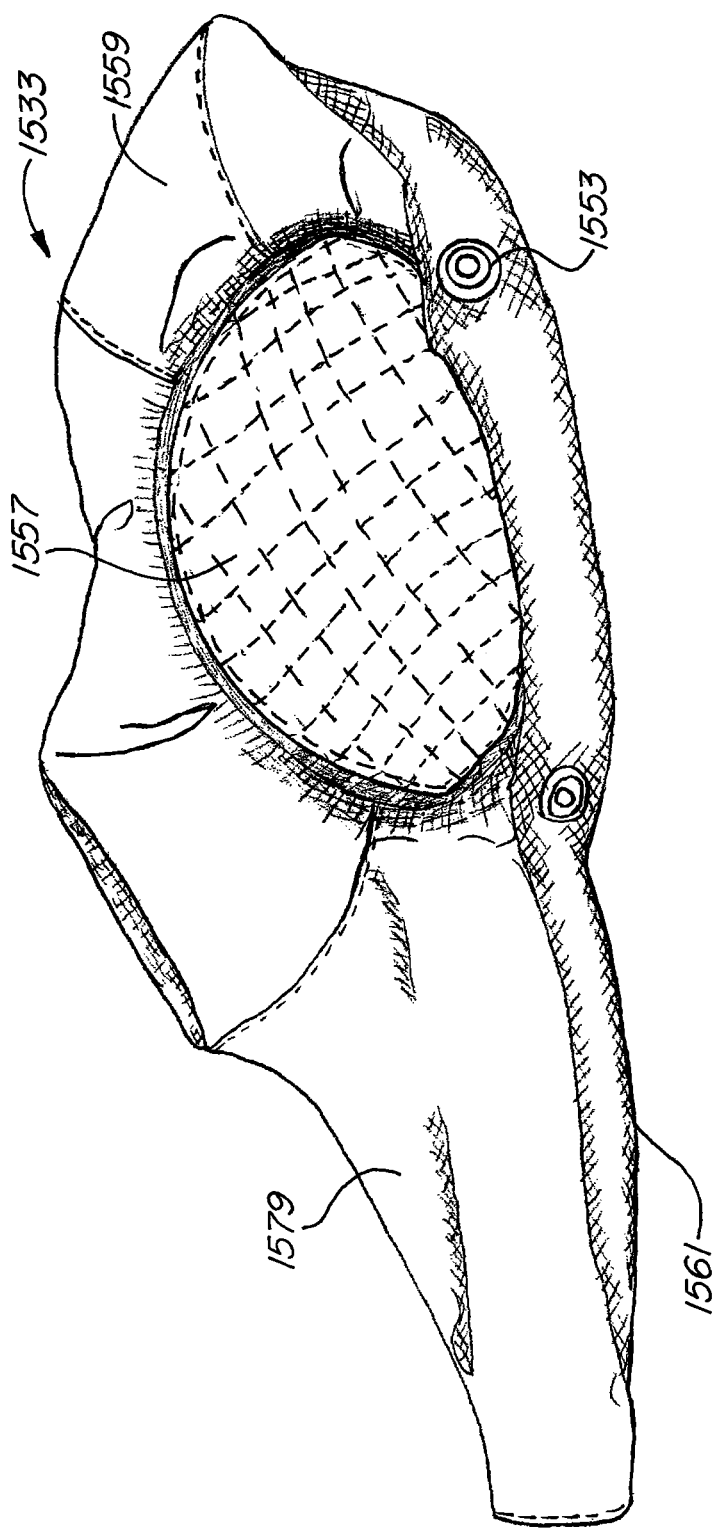
FIG. 26 is a side perspective view of an exemplary pad that may be used with an exemplary canine garment according to the present invention.

Referring now to FIGS. 24-26, therein illustrated is another exemplary embodiment of a removable pad, generally indicated by the numeral 1533, according to the present invention that is configured for use with the various exemplary embodiments of the canine garments according to the present invention that were previously discussed. The removable pad 1533 may be particularly suitable for use with female canine wearers (not shown). The removable pad 1533 includes one or more fastening elements 1553 that are configured to allow removable attachment of the removable pad 1533 to an exemplary canine garment. The removable pad 1533 may include a first layer 1557 that is configured to be positioned closest to the canine wearer (not shown) when the removable pad 1533 is installed on a canine garment (not shown). The first layer 1557 may preferably be made at least partially from an absorbent material, such as a hybrid fabric made from bamboo, cotton, viscose and polymicrofibers. As shown for example in FIG. 24, the first layer 1557 may be made from more than one layer of the absorbent material. The removable pad 1533 may also include a second layer 1559 positioned underneath the first layer 1557, and preferably made from a moisture wicking material, for example a micro-fleece fabric, but it is understood that any suitable material may be used for the second layer 1559. Preferably the material used for the second layer 1559 should be stretchable in at least one direction, and even more preferably stretchable in two directions. The removable pad 1533 may also include a third layer 1561 positioned underneath the first layer 1557 and the second layer 1559. Preferably, the third layer 1561 should be made from a water resistant and/or water proof material, such as a polyurethane laminate. Preferably the material used for the third layer 1561 should be stretchable in at least one direction, and even more preferably stretchable in two directions. One or more darts 1562 may be formed in the second layer 1559 of the removable pad 1533 in order to create a cupped, well-like shape of the removable pad 1533, as shown for example in FIG. 25. The removable pad 1533 may also include an extended rear section 1579 that is configured and dimensioned to extend around the legs and up the hind quarters of a canine wearer (not shown), for example a female canine wearer (not shown). It is understood that the removable pad 1533 is suitable for use with any of the other exemplary canine garments discussed above and/or hereinafter.

Referring now to FIGS. 35A, 35B, 36A and 36B, therein illustrated is another exemplary embodiment of a removable pad, generally indicated by the numeral 1633, according to the present invention that is configured for use with the various exemplary embodiments of the canine garments according to the present invention that were previously discussed. The removable pad 1633 includes one or more fastening elements 1653 that are configured to allow removable attachment of the removable pad 1633 to an exemplary canine garment. Each of the one or more fastening elements 1653 may be positioned on a tab 1654 extending from the removable pad 1633. When oriented in the position in which the removable pad 1633 will be installed on an exemplary canine garment (not shown), the removable pad 1633 has a substantially diamond shape, which promotes the formation of a cup-like, well configuration of the removable pad 1633 when installed in the canine garment and worn by a canine wearer (not shown). This is as a result of the corners 1655 on which the one or more tabs 1655 extend from are positioned to be raised up relative to the rest of the removable pad 1633 when the removable pad 1633 is in use in the canine garment.

Still referring to FIGS. 35A, 35B, 36A and 36B, the removable pad 1633 may include a layer 1661 forming the removable pad 1633. Preferably, the layer 1661 should be made from a water resistant and/or water proof material, such as a polyurethane laminate. Preferably the material used for the layer 1661 should be stretchable in at least one direction, and even more preferably stretchable in two directions. The removable pad 1633 may also include a front pocket 1665 formed from the material of the layer 1661. The front pocket 1665 may be formed by folding a portion 1667 of the layer 1661 over itself, and attaching the sides of the portion 1667 to the sides of the layer 1661 so that the enclosed front pocket 1665 is formed on the removable pad 1633. The front pocket 1665 provides additional protection from leaks of canine fluids from the removable pad 1633, since the front pocket 1665 provides at least a partial barrier to the flow of canine fluids from the removable pad 1633. Referring specifically to the embodiment of the removable pad 1633 shown in FIGS. 36A and 36B, the removable pad 1633 may also include a rear pocket 1668 formed from the material of the layer 1661. The rear pocket 1668 may be formed by folding a portion 1670 of the layer 1661 over itself, and attaching the sides of the portion 1670 to the sides of the layer 1661 so that the enclosed rear pocket 1668 is formed on the removable pad 1633. The rear pocket 1668 provides additional protection from leaks of canine fluids from the removable pad 1633, since the rear pocket 1668 provides at least a partial barrier to the flow of canine fluids from the removable pad 1633. Referring again to FIGS. 35A, 35B, 35A and 36B, the removable pad 1633 may also include an elastic perimeter 1671 formed from a substantially elastic and/or stretchable material. It may be desirable that the elastic perimeter 1671 has a rest position, i.e. a position in which the elastic perimeter 1671 is not being stretched and/or urged in any direction, which is at least somewhat smaller than the size of at least the layer 1661 of the removable pad 1633. In this manner, the elastic perimeter 1671 causes a slight upward urging of the corners 1655 of the removable pad 1633 in order to produce a cup-like, well formation of the removable pad 1633. An absorbent pad (not shown) may be placed in and/or attached to the removable pad 1633 in order to assist in the control and/or containment of canine fluids. The absorbent pad (not shown) may be either disposable, for example a conventional sanitary napkin, or reusable and washable. The absorbent pad (not shown) may be configured for attachment to the removable pad 1633 by operative engagement with at least one fastener 1672, for example a snap.

Figure 37:
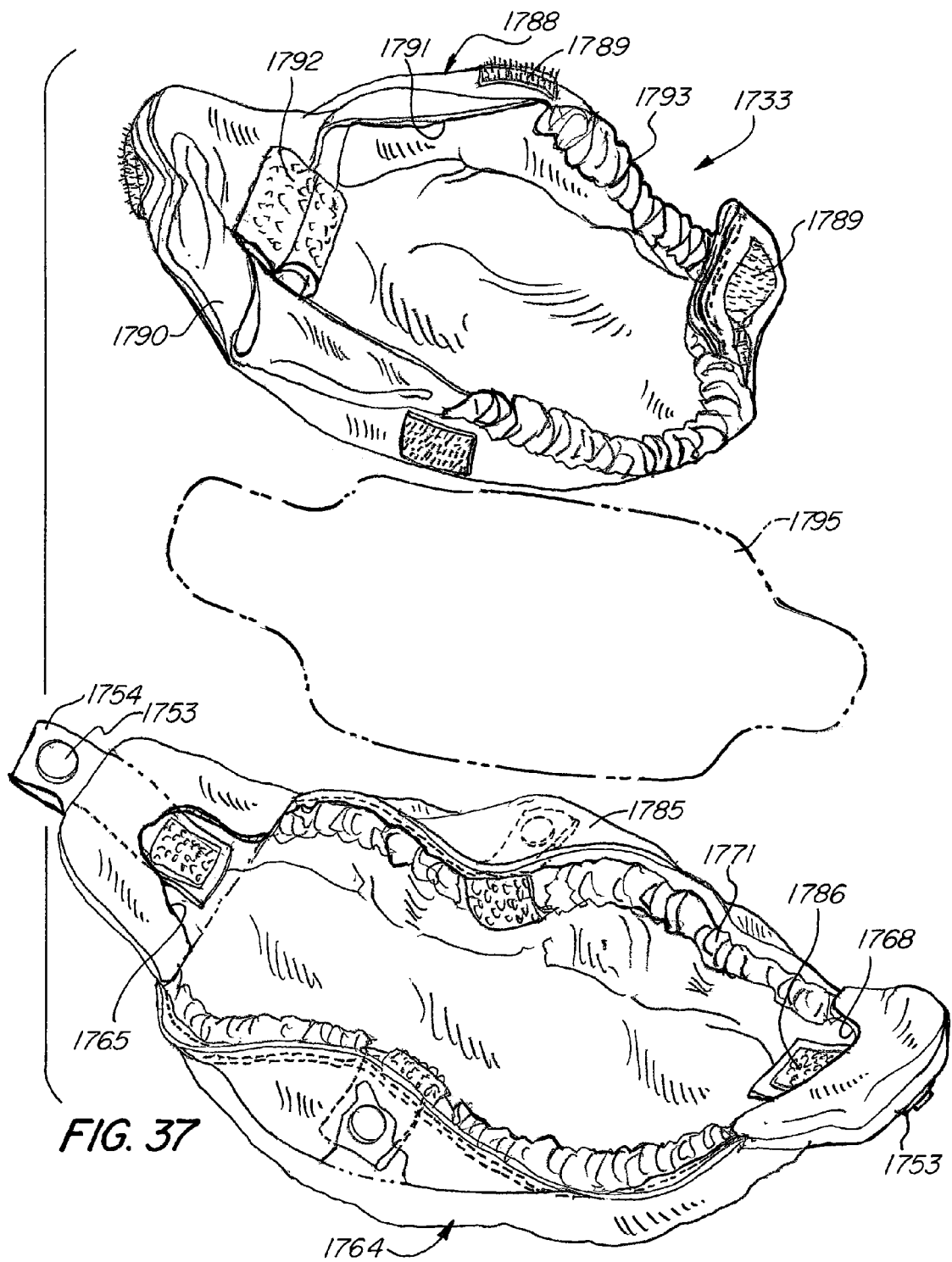
FIG. 37 is an exploded view of an exemplary pad that may be used with a canine garment according to the present invention.
Figure 37A:
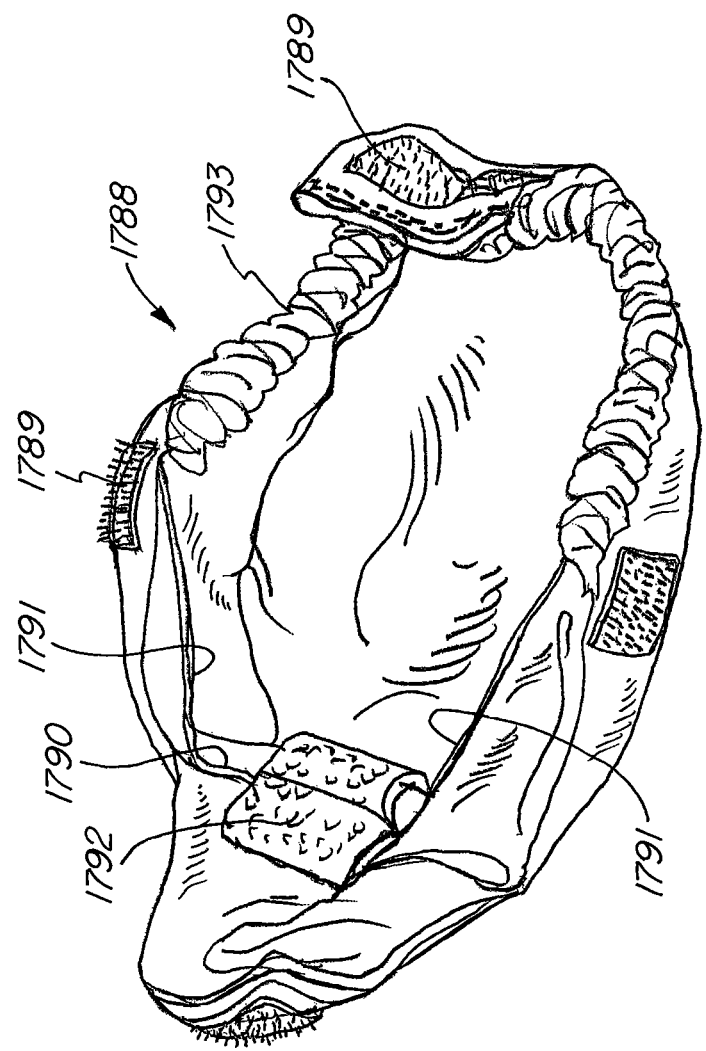
FIG. 37A is a perspective view of a liner portion of the exemplary pad from FIG. 37.
Figure 37B:
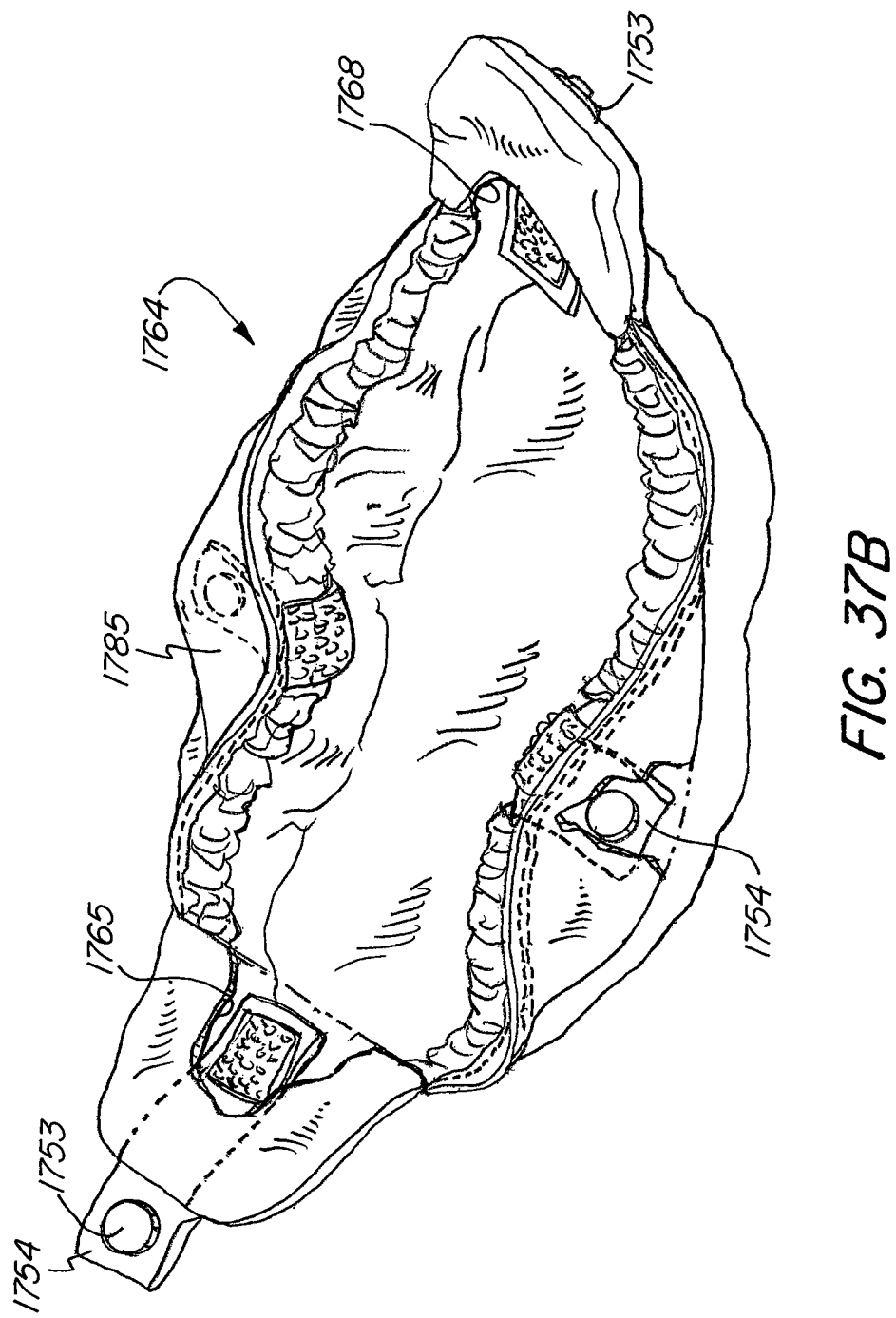
FIG. 37B is a perspective view of a portion of the exemplary pad from FIG. 37.

Referring now to FIGS. 37, 37A and 37B, therein illustrated is another exemplary embodiment of a removable pad, generally indicated by the numeral 1733, according to the present invention that is configured for use with the various exemplary embodiments of the canine garments according to the present invention that were previously discussed. The removable pad 1733 includes one or more fastening elements 1753 that are configured to allow removable attachment of the removable pad 1733 to an exemplary canine garment. Each of the one or more fastening elements 1753 may be positioned on a tab 1754 extending from the removable pad 1733. When oriented in the position in which the removable pad 1733 will be installed on an exemplary canine garment (not shown), the removable pad 1733 has a substantially diamond shape, which promotes the formation of a cup-like, well configuration of the removable pad 1733 when installed in the canine garment and worn by a canine wearer (not shown).

Still referring to FIGS. 37, 37A and 37B, the removable pad 1733 may include a liner 1764 forming a base portion of the removable pad 1733. Preferably, the liner 1764 should be made from a water resistant and/or water proof material, such as a polyurethane laminate. Preferably the material used for the liner 1764 should be stretchable in at least one direction, and even more preferably stretchable in two directions. The liner 1764 may include a front pocket 1765 formed from the material of the liner 1764. The front pocket 1765 provides additional protection from leaks of canine fluids from the removable pad 1733, since the front pocket 1765 provides at least a partial barrier to the flow of canine fluids from the removable pad 1733. The liner 1764 may also include a rear pocket 1768. The rear pocket 1768 provides additional protection from leaks of canine fluids from the removable pad 1733, since the rear pocket 1768 provides at least a partial barrier to the flow of canine fluids from the removable pad 1733. The liner 1764 may also include an elastic perimeter 1771 formed from a substantially elastic and/or stretchable material. It may be desirable that the elastic perimeter 1771 has a rest position, i.e. a position in which the elastic perimeter 1771 is not being stretched and/or urged in any direction, which is at least somewhat smaller than the size of at least the liner 1764 of the removable pad 1733. In this manner, the elastic perimeter 1771 causes a slight upward urging of the liner 1764 in order to produce a cup-like, well formation of the liner 1764. The liner 1764 may also include at least one side pocket 1785 that provides additional protection from leaks of canine fluids from the removable pad 1733, since the side pocket 1785 provides at least a partial barrier to the flow of canine fluids from the removable pad 1733. The liner 1764 may also include at least one fastening mechanism 1786 positioned so as to removable affix an absorbent pad 1788 of the removable pad 1733 to the liner 1764. The absorbent pad 1788 may also include at least one corresponding fastening mechanism 1789. The absorbent pad 1788 may be made from any suitable absorbent material, and may preferably be made at least partially from an absorbent material, such as a hybrid fabric made from bamboo, cotton, viscose and polymicrofibers. The absorbent pad 1788 may also include material that promotes wicking of moisture. The absorbent pad 1788 may include a front pocket 1790 that has pocket extensions 1791 extending on each side thereof. Furthermore, the absorbent pad 1788 may further include an absorbent swatch 1792 that is positioned on the absorbent pad 1788 so as to be able to absorb any extra fluids that may be released from the canine wearer (not shown). The absorbent pad 1788 may also include an elastic material 1793 surrounding at least a portion of the perimeter of the absorbent pad 1788.

The interaction and engagement of the liner 1764 and the absorbent pad 1788 of the removable pad 1733 is shown in FIG. 37. As also demonstrated in FIG. 37, a disposable pad 1795 may be placed between the liner 1764 and the absorbent pad 1788. The disposable pad 1795 may be for example a conventional sanitary napkin or the like.

The operation and use of the canine garment according to the present invention will now be discussed with reference to FIG. 32. FIG. 32 provides an illustration of how an exemplary removable pad 433 may be configured for placement with and attachment to an exemplary canine garment 410. While removable pad 433 and canine garment 410 are illustrated in FIG. 32, it is understood that any of the exemplary removable pads and canine garments discussed herein function and interact in substantially the same manner, and that any of the removable pads are suitable for use with any of the canine garments discussed herein. It is further understood that removable pad 433 and canine garment 410 are merely discussed for exemplary purposes, and that other removable pads and canine garments are not discussed in detail for purposes of brevity.

As shown in FIG. 32, the removable pad 433 is configured for removable attachment to the canine garment 410 by attaching the one or more fastening elements 1053 to each of the corresponding fasteners 432 on the canine garment 410. Once the removable pad 433 has been attached to the canine garment 410 in the appropriate manner, the canine garment 410 is configured for use by placing the canine garment 410 on an appropriately sized canine wearer (not shown). One exemplary manner to place the canine garment 410 on the canine wearer (not shown) is to stand the canine wearer up on its hind legs, and slip each one of the front leg holes 422 over the appropriate front legs of the canine wearer. Next, each one of the hind leg holes 436 may be slide over the appropriate hind legs of the canine wearer (not shown). Once the canine wearer's hind legs have been secured in each of the hind leg holes 436 the canine garment 410 may be secured to the canine wearer by securing the first neck tab 425 to the second neck tab 427 by at least one of the fastening elements 444 in order to wrap the front section 412 of the canine garment 410 around the canine wearer's neck. Now the first fastening tab 440 may be inserted through the pass-through hole 446 in the second fastening tab 442, and first fastening tab 440 may be secured to the second fastening tab 442 by at least one of the fastening elements 444 in order to wrap the hind section 416 of the canine garment 410 at least partially around the canine wearer (not shown).

In order to remove the canine garment 410 the fastening elements 444 on both the first neck tab 425 and second neck tab 427 and on the first fastening tab 440 and the second fastening tab 442 are released from each other, and the canine garment 410 is removed from the canine wearer. The removable pad 433 may be removed from the canine garment 410 for washing and/or replacement, for example if the removable pad 433 has become soiled and/or saturated by canine fluids, by releasing the fastening elements 1053 on the removable pad 433 from the fasteners 432 on the canine garment 410. It is understood that in embodiments of the canine garment that do not include neck tabs, the canine garment may be merely slipped over the head and neck of the canine wearer and the hind quarters portion of the canine garment may be secured as discussed above.

It will thus be seen that the objects set forth above, among those made apparent from the preceding description, are efficiently attained and, since certain changes may be made in the above article without departing from the scope of this invention, it is intended that all matter contained in this disclosure or shown in the accompanying drawings, shall be interpreted, as illustrative and not in a limiting sense.

It is to be understood that all of the present figures, and the accompanying narrative discussions of corresponding embodiments, do not purport to be completely rigorous treatments of the invention under consideration. It is to be understood that the above-described arrangements are only illustrative of the application of the principles of the present invention. Numerous modifications and alternative arrangements may be devised by those skilled in the art without departing from the scope of the present invention.

What is claimed is:

1. A garment configured for use by a canine having a pair of front legs and a pair of hind legs, the garment comprising:
   a piece of material dimensioned to at least partially cover at least a portion of the canine; and
   a pad configured for attachment to the piece of material, and configured to absorb a quantity of fluid released from the canine;
   wherein the piece of material comprises:
   at least a pair of first openings positioned in the piece of material so as to be configured to receive the pair of front legs of the canine;
   a pair of second openings positioned relative to the pair of first openings in the piece of material so as to be configured to receive the pair of hind legs of the canine; and
   at least one securing mechanism having a first part and a second part, wherein the first part and the second part of the securing mechanism are configured to operatively engage in order to secure the piece of material to the portion of the canine; and
   wherein the pad comprises:
   a first layer comprised of waterproof or water resistant material, and having an upper surface and a lower surface and a periphery around the upper surface and the lower surface; and
   a second layer comprised of an absorbent material, and having a top surface and a bottom surface and a perimeter around the top surface and the bottom surface;

wherein the first layer of the pad is a liner configured to substantially contain the second layer of the pad by covering the bottom surface of the second layer and extending around the perimeter of the second layer;

wherein the second layer of the pad comprises at least one pocket formed from the absorbent material by folding the top surface of the second layer towards itself; and wherein the first layer of the pad comprises at least one pocket formed in the waterproof or water resistant material by folding the upper surface of the first layer towards itself, and the at least one pocket of the first layer is positioned so as to receive the at least one pocket formed in the absorbent material of the second layer.

2. The garment according to claim 1, wherein the piece of material comprises a belly section configured to at least partially cover a belly section of the canine, and wherein the pad is configured for attachment to the belly section of the piece of material.

3. The garment according to claim 1, wherein the piece of material is configured to form a neck opening configured to extend around a neck of the canine, and dimensioned so as to allow a head of the canine to be inserted through the neck opening.

4. The garment according to claim 1, wherein when the piece of material at least partially covers the portion of the canine at least a part of a hind portion of the canine is exposed.

5. The garment according to claim 1, wherein the at least one securing mechanism is a zipper, and the first part is a first half of the zipper and the second part is a second half of the zipper.

6. The garment according to claim 1, wherein the first part of the at least one securing mechanism is a first fastening tab, and the second part of the at least one securing mechanism is a second fastening tab configured for operative engagement with the first fastening tab.

7. The garment according to claim 6, wherein the first fastening tab comprises at least one fastening device, and the second fastening tab comprises at least one fastening device corresponding to the at least one fastening device of the first fastening tab and configured for operative engagement with the at least one fastening device on the first fastening tab; and wherein the first fastening tab comprises a pass-though hole configured to receive the second fastening tab and permit securing of the garment to the canine.

8. The garment according to claim 1, wherein the at least one securing mechanism comprises two securing mechanisms, and the first part of each of the two securing mechanisms is a first fastening tab, and the second part of each of the two securing mechanisms is a second fastening tab configured for operative engagement with the first fastening tab.

9. The garment according to claim 8, wherein the first fastening tab comprises at least one fastening device, and the second fastening tab comprises at least one fastening device corresponding to the at least one fastening device of the first fastening tab and configured for operative engagement with the at least one fastening device on the first fastening tab; and wherein the first fastening tab comprises a pass-though hole configured to receive the second fastening tab and permit securing of the garment to the canine.

10. The garment according to claim 1, wherein the garment further comprises a waterproof or water resistant liner covering at least a portion of the piece of material.

11. The garment according to claim 1, wherein the piece of material comprises a stretchable fabric.

12. The garment according to claim 1, wherein the pad further comprises a third layer comprised of a moisture-wicking material, and wherein the pad is configured so that the first layer is positioned closest to the piece of material, the second layer is positioned between the first layer and the third layer, and the third layer is positioned farthest away from the piece of material when the pad is attached to the piece of material.

13. The garment according to claim 1, wherein the pad is further configured for removable attachment to the piece of material by at least one fastening device, wherein the at least one fastening device is selected from a snap or hook-and-loop fasteners.

14. The garment according to claim 1, wherein the pad is further configured for substantially fixed attachment to the piece of material.

15. The garment according to claim 1, wherein the second layer of the pad is an absorbent pad configured for removable attachment to the first layer of the pad.

16. The garment according to claim 1, wherein at least a portion of the periphery of the first layer is surrounded by an elastic material.

17. The garment according to claim 1, wherein the at least a portion of the perimeter of the second layer is surrounded by an elastic material.

18. The garment according to claim 15, wherein the absorbent pad comprises at least one fastening device, and the liner comprises at least one corresponding fastening device, and the at least one fastening device of the absorbent pad is configured for removable attachment to the corresponding fastening device positioned on the liner.

19. The garment according to claim 1, wherein the periphery of the first layer comprises at least two corners, and a pocket of the at least one pocket of the first layer is positioned in each of the at least two corners of the periphery of the first layer; and wherein the perimeter of the second layer comprises at least two corners, and a pocket of the at least one pocket of the second layer is positioned in each of the at least two corners of the perimeter of the second layer.

20. The garment according to claim 3, wherein the at least one securing mechanism is positioned around the neck opening of the piece of material, and the at least one securing mechanism further comprises a third part and a fourth part configured to operatively engage with each other;

wherein the first part and the second part of the securing mechanism are operatively engaged by moving the first part clockwise towards the second part; and wherein the third part and the further part of the securing mechanism are operatively engaged by moving the third part counter-clockwise towards the fourth part.

* * * * *